US011609723B2

(12) United States Patent
Nuggehalli et al.

(10) Patent No.: US 11,609,723 B2
(45) Date of Patent: Mar. 21, 2023

(54) APPROACH FOR PROVIDING ACCESS TO CLOUD SERVICES ON END-USER DEVICES USING LOCAL MANAGEMENT OF THIRD-PARTY SERVICES

(71) Applicants: Jayasimha Nuggehalli, Cupertino, CA (US); Bhushan Nadkarni, Santa Clara, CA (US); Srikrishna Narasimhan, Sunnyvale, CA (US); Zhenyu Lu, Sunnyvale, CA (US)

(72) Inventors: Jayasimha Nuggehalli, Cupertino, CA (US); Bhushan Nadkarni, Santa Clara, CA (US); Srikrishna Narasimhan, Sunnyvale, CA (US); Zhenyu Lu, Sunnyvale, CA (US)

(73) Assignee: Ricoh Company, LTD., Tokyo (JP)

(*) Notice: Subject to any disclaimer, the term of this patent is extended or adjusted under 35 U.S.C. 154(b) by 0 days.

(21) Appl. No.: 15/942,415

(22) Filed: Mar. 30, 2018

(65) Prior Publication Data

US 2019/0303058 A1 Oct. 3, 2019

(51) Int. Cl.

| | |
|---|---|
| ***G06F 3/12*** | (2006.01) |
| ***G06F 9/54*** | (2006.01) |
| ***H04L 67/025*** | (2022.01) |

(52) U.S. Cl.

CPC .......... *G06F 3/1207* (2013.01); *G06F 3/1256* (2013.01); *G06F 3/1259* (2013.01); (Continued)

(58) Field of Classification Search

None

See application file for complete search history.

(56) References Cited

U.S. PATENT DOCUMENTS

| | | | |
|---|---|---|---|
| 6,453,356 | B1 | 9/2002 | Sheard |
| 7,483,994 | B1 | 1/2009 | Stephens |

(Continued)

FOREIGN PATENT DOCUMENTS

| | | | |
|---|---|---|---|
| JP | 2007323340 | A | 12/2007 |
| JP | 2008021095 | A | 1/2008 |

(Continued)

OTHER PUBLICATIONS

European Patent Office, "Search Report"in application No. 19164204. 0-1221, dated Jul. 22, 2019, 10 pages.

(Continued)

*Primary Examiner* — Benjamin O Dulaney

(74) *Attorney, Agent, or Firm* — Hickman Becker Bingham Ledesma LLP

(57) ABSTRACT

An approach provides access to cloud services that are impractical or difficult to implement on end-user devices without a high level of programming skill and customization. The approach uses a first set of cloud services, referred to herein as Integrated Cloud Environment (ICE) cloud services, to access to a second set of cloud services, referred to herein as Smart Integration (SI) cloud services, on end-user devices. The ICE cloud services provide a user-friendly user interface for accessing the SI cloud services via an end-user device, implement the Application Program Interfaces (APIs) of the SI cloud services, and also manage results generated by the SI cloud services. The ICE cloud services also manage user information, authorization credentials and tokens needed to access third-party services. According to another embodiment, the SI cloud and the ICE cloud are integrated using direct linking, i.e., directly linking an end-user device to the SI cloud.

20 Claims, 49 Drawing Sheets

(52) U.S. Cl.
CPC ............ *G06F 9/547* (2013.01); *H04L 67/025* (2013.01); *G06F 3/1288* (2013.01)

(56) References Cited

U.S. PATENT DOCUMENTS

| | | | | |
|---|---|---|---|---|
| 7,702,724 | B1 | 4/2010 | Brydon | |
| 9,001,370 | B1 | 4/2015 | Nuggehalli | |
| 10,776,434 | B1 * | 9/2020 | Blackman | G06F 16/3344 |
| 2006/0136601 | A1 | 6/2006 | Arora | |
| 2007/0174338 | A1 | 7/2007 | Liggett | |
| 2009/0113329 | A1 * | 4/2009 | Corona | G06F 3/0486 715/769 |
| 2009/0116686 | A1 | 5/2009 | Samtani | |
| 2010/0223385 | A1 * | 9/2010 | Gulley | G06F 9/5055 709/226 |
| 2011/0102827 | A1 * | 5/2011 | Nishino | H04N 1/00244 358/1.15 |
| 2011/0119729 | A1 | 5/2011 | Bergeson | |
| 2011/0321131 | A1 * | 12/2011 | Austel | G06F 21/6236 726/4 |
| 2012/0218589 | A1 * | 8/2012 | Watanabe | H04N 1/32438 358/1.15 |
| 2013/0021638 | A1 | 1/2013 | Hong | |
| 2014/0173694 | A1 | 6/2014 | Kranz | |
| 2015/0026174 | A1 | 1/2015 | Nuggehalli | |
| 2015/0026175 | A1 | 1/2015 | Nuggehalli | |
| 2015/0026772 | A1 | 1/2015 | Verma | |
| 2015/0067171 | A1 | 3/2015 | Yum et al. | |
| 2016/0057248 | A1 | 2/2016 | Tankha | |
| 2016/0124742 | A1 | 5/2016 | Rangasamy | |
| 2016/0182658 | A1 | 6/2016 | Allinson | |
| 2016/0259781 | A1 * | 9/2016 | Nuggehalli | G06F 40/45 |
| 2017/0046135 | A1 * | 2/2017 | Hazarika | G06F 9/541 |
| 2017/0070504 | A1 | 3/2017 | Ramachandran | |
| 2017/0177613 | A1 | 6/2017 | Sharma | |
| 2017/0339176 | A1 | 11/2017 | Backer | |
| 2018/0081739 | A1 * | 3/2018 | Gravenites | H04L 41/0856 |
| 2018/0083835 | A1 * | 3/2018 | Cole | G06F 3/0482 |
| 2018/0122034 | A1 | 5/2018 | Wang | |
| 2019/0102162 | A1 * | 4/2019 | Pitre | H04L 63/10 |
| 2019/0306223 | A1 * | 10/2019 | Nuggehalli | H04L 67/06 |
| 2019/0306224 | A1 | 10/2019 | Nuggehalli | |
| 2019/0306227 | A1 | 10/2019 | Nuggehalli | |

FOREIGN PATENT DOCUMENTS

| | | | |
|---|---|---|---|
| JP | 2015097088 | A | 5/2015 |
| WO | WO 2017/027868 | A1 | 2/2017 |

OTHER PUBLICATIONS

Nuggehalli, U.S. Appl. No. 15/942,417, filed Mar. 30, 2018, Office Action, dated Jan. 14, 2020.

Nuggehalli, U.S. Appl. No. 15/942,416, filed Mar. 30, 2018, Office Action, dated Dec. 16, 2019.

Nuggehalli, U.S. Appl. No. 15/942,214, filed Mar. 30, 2018, Final Office Action, dated Jan. 24, 2020.

Nuggehalli, U.S. Appl. No. 15/942,417, filed Mar. 20, 2018, Office Action, dated Aug. 10, 2020.

Nuggehalli, U.S. Appl. No. 15/942,417, filed Mar. 30, 2018, Final Office Action, dated May 12, 2020.

Nuggehalli, U.S. Appl. No. 15/942,416, filed Mar. 30, 2018, Office Action, dated Jun. 15, 2020.

Nuggehalli, U.S. Appl. No. 15/942,414, filed Mar. 30, 2018, Office Action, dated Jun. 23, 2020.

Nuggehalli, U.S. Appl. No. 15/942,417, filed Mar. 30, 2018, Advisory Action, dated Jul. 28, 2020.

Nuggehalli, U.S. Appl. No. 15/942,416, filed Mar. 30, 2018, Final Office Action, dated Nov. 3, 2020.

Nuggehalli, U.S. Appl. No. 15/942,414, filed Mar. 30, 2018, Final Office Action, dated Nov. 18, 2020.

Nuggehalli, U.S. Appl. No. 15/942,414, filed Mar. 30, 2018, Office Action, dated Oct. 3, 2019.

* cited by examiner

| Mapping Data 192 | |
|---|---|
| ICE Cloud User ID | SI Cloud User ID |
| | |
| | |
| | |
| | |
| | |

| User ID | User Login ID | Org ID | First Name | Last Name | Email | Fax |
|---|---|---|---|---|---|---|
| 1 | Joseph | 1 | Joseph | Span | jspan@org1.com | 4083338181 |
| 2 | jane | 1 | Jane | Do | jdoe@org1.com | 5104482281 |

| External App Token | Usage Count | Device IDs |
|---|---|---|
| "api_call_date":"2016-10-07"."expires_in":3984,"refresh token" | 10 | All |
| "api_call_date":"2016-10-07"."expires_in":4269,"refresh token" | 3 | All |

Organization(Customer) List

Registered Device List

Product Key List

Application Usage Report Views

ICE Application Portal Management

Sample Application Settings View (Scan to Email Address Book View)

Application Marketplace View

Packages View in Marketplace

Application Management

Add/Update Application

Package Management

Add/Update Packages

400

420

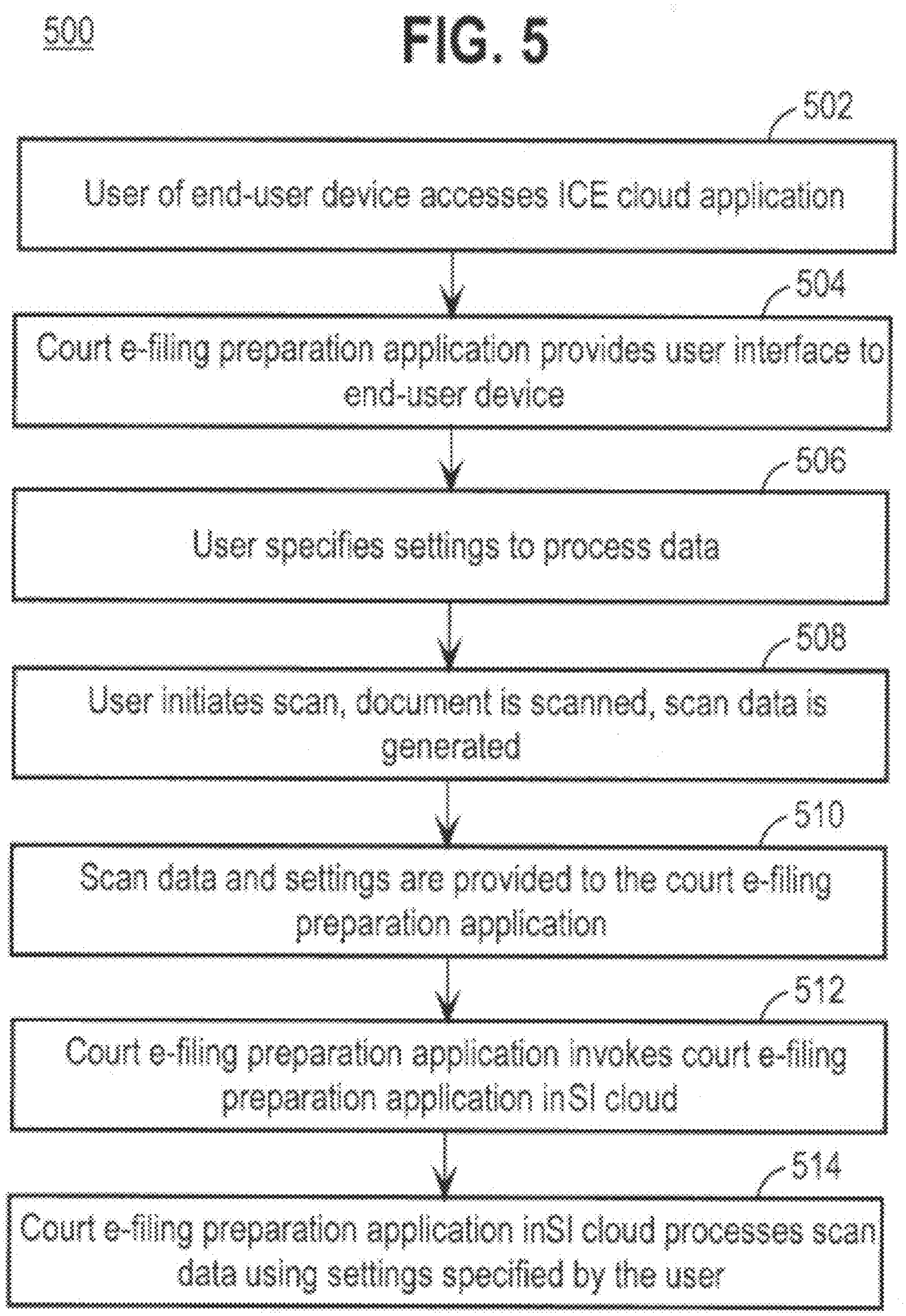
500
FIG. 5
502
User of end-user device accesses ICE cloud application
504
Court e-filing preparation application provides user interface to end-user device
506
User specifies settings to process data
508
User initiates scan, document is scanned, scan data is generated
510
Scan data and settings are provided to the court e-filing preparation application
512
Court e-filing preparation application invokes court e-filing preparation application inSI cloud
514
Court e-filing preparation application inSI cloud processes scan data using settings specified by the user

600

620

640

660

800

1000

1100

1200

1220

1240

1400

1420

1440

1460

1480

APPROACH FOR PROVIDING ACCESS TO CLOUD SERVICES ON END-USER DEVICES USING LOCAL MANAGEMENT OF THIRD-PARTY SERVICES

RELATED APPLICATION DATA AND CLAIM OF PRIORITY

This application is related to U.S. patent application Ser. No. 15/942,414 entitled "Approach for Providing Access to Cloud Services on End-User Devices Using End-to-End Integration", filed Mar. 30, 2018, U.S. patent application Ser. No. 15/942,416 entitled "Approach for Providing Access to Cloud Services on End-User Devices Using Local Management of Third-Party Services and Conflict Checking", filed Mar. 30, 2018, and U.S. patent application Ser. No. 15/942,417 entitled "Approach for Providing Access to Cloud Services on End-User Devices Using Direct Link Integration", filed Mar. 30, 2018, the contents all of which are incorporated by reference in their entirety for all purposes as if fully set forth herein.

FIELD

Embodiments relate generally to processing electronic documents. SUGGESTED GROUP ART UNIT: 2625; SUGGESTED CLASSIFICATION: 358.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted prior art by inclusion in this section.

The continued growth of network services, and in particular Internet-based services, provides access to an ever-increasing amount of functionality. Cloud services in particular continue to grow into new areas. One of the issues with cloud services is that they can be difficult to use with certain types of end-user devices, such as multi-function peripherals (MFPs) for several reasons. First, assuming that end-user devices have the requisite computing capability, some cloud services have interfaces that require a high level of programming skill and customization to implement on end-user devices. In addition, implementing a workflow that uses multiple cloud services requires an even higher level of skill and knowledge because each service has different settings requirements and the results of one cloud service have to be stored, reformatted, and provided to another cloud service. Further, some cloud services require that certain data, such as user authorization data, be maintained on the client side, e.g., at an MFP, which is unpractical and, in some situations, not possible.

SUMMARY

An apparatus provides an improvement in accessing cloud services over computer networks from end-user devices. The apparatus comprises one or more processors, and a Web application executing on the apparatus. The Web application is configured to receive, via one or more computer networks from an end-user device, a request to access the Web application. In response to receiving, over one or more computer networks from an end-user device, the request to access the Web application, the Web application generates and provides to the end-user device, via the one or more computer networks, one or more Web pages which, when processed by the end-user device, provide a user interface that allows a user of the end-user device to specify a plurality of settings for processing data generated by the end-user device at a cloud service that is external to be both the end-user device and the Web application. A request to process the data generated by the end-user device at the cloud service using the plurality of settings specified by the user of the end-user device is received, via the one or more computer networks from the end-user device. In response, a request to process the data using the plurality of settings specified by the user of the end-user device is generated and transmitted, via the one or more computer networks to a cloud application that implements the cloud service using two or more cloud components that each implement one or more functions. The request to process the data using the plurality of settings specified by the user conforms to an application program interface that is supported by the cloud application and not supported by the end-user device.

An apparatus provides an improvement in accessing cloud services over computer networks from end-user devices. The apparatus comprises one or more processors, and a Web application executing on the apparatus. The Web application implements a particular workflow and is configured to receive, via one or more computer networks from an end-user device, a request to access the Web application. In response to receiving, over one or more computer networks from an end-user device, the request to access the Web application, generating and providing to the end-user device, via the one or more computer networks, one or more Web pages which, when processed by the end-user device, provide a user interface that allows a user of the end-user device to specify a plurality of settings for processing data generated by the end-user device. A request for the data generated by the end-user device to be processed by the Web application according to the workflow using the plurality of settings specified by the user of the end-user device is received, via the one or more computer networks from the end-user device. In response to receiving, via the one or more computer networks from the end-user device, the request for the data generated by the end-user device to be processed by the Web application according to the workflow using the plurality of settings specified by the user of the end-user device, a first processing request to a first cloud application that implements a first portion of the workflow is generated and transmitted, via the one or more computer networks. The first processing request specifies both the data generated by the end-user device and the settings specified by the user of the end-user device, and wherein the first processing request conforms to a first application program interface of the first cloud application. First results data that specifies first processing results from the first cloud application is received, via the one or more computer networks. A second processing request is generated and transmitted, via the one or more computer networks, to a second cloud application that implements a second portion of the workflow. The second processing request includes both the first results data that specifies the first processing results received from the first cloud application and the settings specified by the user of the end-user device, and wherein the second processing request conforms to a second application program interface of the second cloud application, wherein the second application program interface is different than the first application program interface. Second processing results data that specifies second processing results from the second cloud application is received, via the one or more computer networks. A third processing request is generated and transmitted, via the one or more computer networks, to a third-party service that is different than the first cloud application and the second cloud application. The third processing request specifies the second processing results data received from the second cloud application.

An apparatus provides an improvement in accessing cloud services over computer networks from end-user devices. The apparatus comprises one or more processors, and a Web application executing on the apparatus. The Web application implements a particular workflow is configured to receive, via one or more computer networks from an end-user device, a request to access the Web application. In response to receiving, over one or more computer networks from an end-user device, the request to access the Web application, one or more Web pages are generated and provided to the end-user device, via the one or more computer networks. When processed by the end-user device, a user interface is provided that allows a user of the end-user device to specify a plurality of settings for processing data generated by the end-user device. A request for the data generated by the end-user device to be processed by the Web application according to the particular workflow using the plurality of settings specified by the user of the end-user device is received, via the one or more computer networks from the end-user device. In response to a determination made based upon the settings specified by the user of the end-user device that no conflicts exist in the settings specified by the user of the end-user device, then a first processing request is generated and transmitted, via the one or more computer networks, to a cloud application that implements a plurality of portions of the workflow. The first processing request specifies both the data generated by the end-user device and the settings specified by the user of the end-user device, and the first processing request conforms to a first application program interface of the cloud application. Processing results data that specifies processing results generated by the cloud application are received, via the one or more computer networks, from the cloud application that implements a plurality of portions of the workflow. A request to process the results data that specifies processing results generated by the cloud application in response to processing the data generated by the end-user device using the settings specified by the user of the end-user device is generated and transmitted, via the one or more computer networks to a third-party service that is separate from the cloud application.

An apparatus provides an improvement in accessing cloud services over computer networks from end-user devices. The apparatus comprises one or more processors, and a cloud application executing on the apparatus. The cloud application is configured to receive, via one or more computer networks from an end-user device, a request for a particular Web page, wherein the request for the particular Web page was generated at an end-user device in response to a user of the end-user device selecting a link to the particular Web page displayed on a first Web page that was provided to the end-user device by a Web application that is part of a first cloud environment that is different than a second cloud environment that includes the cloud application. The request for the particular Web page includes user identification data that uniquely identifies a user of the end-user device, device identification data that uniquely identifies the end-user device, and a token that is specific to the user of the end-user device, the end-user device, and the cloud application. The cloud application is further configured to receive, over one or more computer networks from an end-user device, the request to access the Web page, and determine whether the token that is specific to the user of the end-user device, the end-user device, and the cloud application is currently valid. In response to determining that the token that is specific to the user of the end-user device, the end-user device, and the cloud application is currently valid, user access is provided to the cloud application.

Embodiments may be implemented by one or more non-transitory computer-readable media and/or one or more computer-implemented methods.

BRIEF DESCRIPTION OF THE DRAWINGS

In the figures of the accompanying drawings like reference numerals refer to similar elements.

FIG. 5 is a flow diagram that depicts an approach for integrating two different cloud environments in the context of preparing documents for e-filing with a judicial court.

DETAILED DESCRIPTION

Figure 1A:
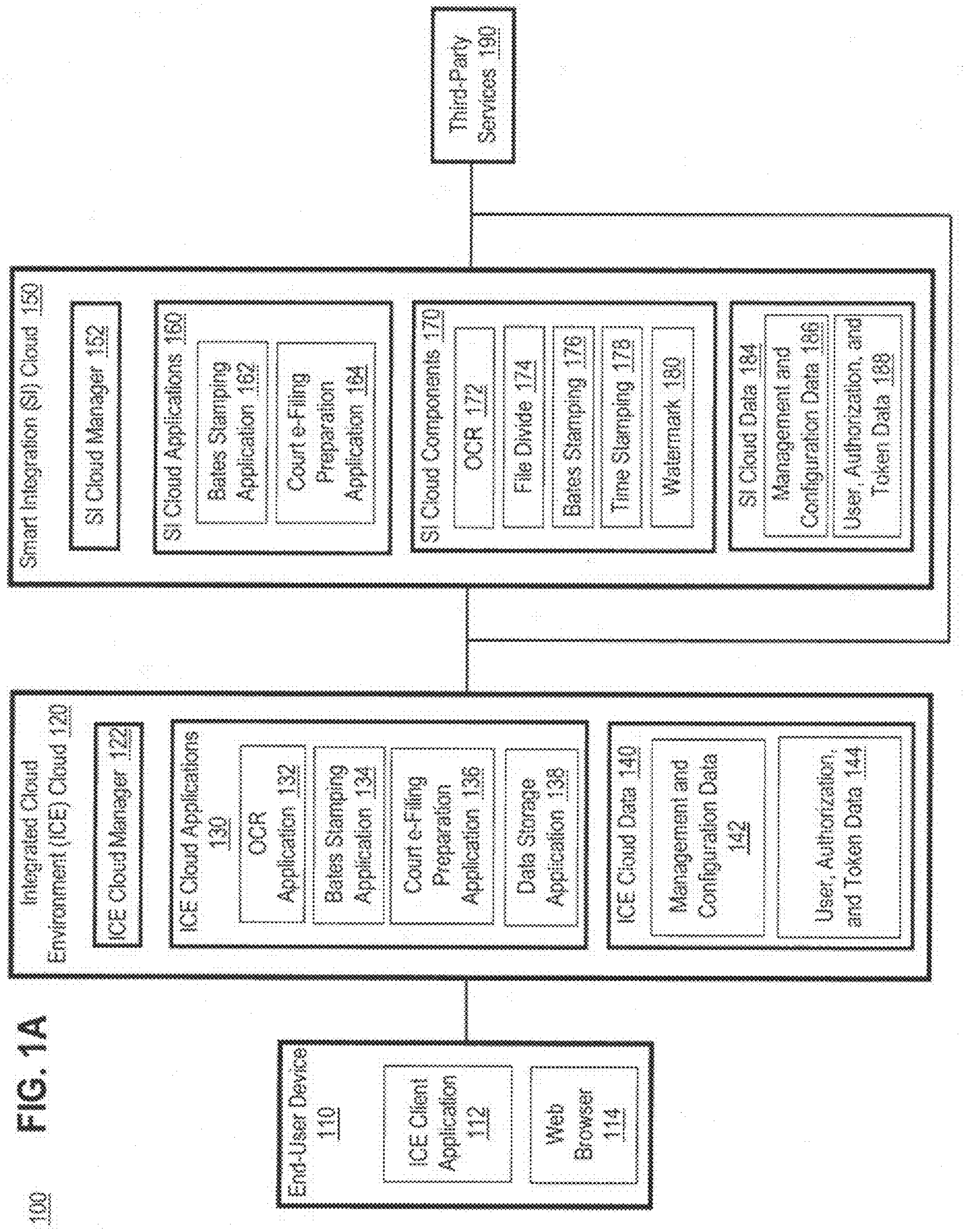
FIG. 1A is a block diagram that depicts an example arrangement for accessing cloud services using end-user devices.

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form to avoid unnecessarily obscuring the embodiments. Various aspects of the embodiments are described hereinafter in the following sections:

I. Overview
II. Architecture
  A. ICE Cloud
    i. ICE Cloud Manager
    ii. ICE Cloud Data
    iii. User, Authorization, and Token Data
  B. SI Cloud
    i. SI Cloud Components
    ii. SI Cloud Applications
    iii. SI Cloud Data
III. Integrating the SI Cloud and the ICE Cloud Environments
  A. Integration Type 1: End-to-End Processing Managed by the SI Cloud
    i. Operational Examples
    ii. Using Mapping Data to Identify Tokens for Third-Party Services
  B. Integration Type 2: Integration Managed by the ICE Cloud
  C. Integration Type 3: Integration Managed by the ICE Cloud With Conflict Checking
  D. Integration Type 4: Direct Linking
IV. Provisioning Users and Subscriptions
V. Implementation Examples

I. Overview

An approach provides access to cloud services that are impractical or difficult to implement on end-user devices without a high level of programming skill and customization. As used herein, the term "end-user device" refers to any type of electronic device. Examples of end-user devices include, without limitation, personal computers, workstations, multi-function peripherals (MFPs), tablet computing devices, mobile computing devices, personal digital assistants, telephony devices including smart phones, other consumer devices, etc.

The approach uses of a first set of cloud services, referred to herein as Integrated Cloud Environment (ICE) cloud services, to access to a second set of cloud services, referred to herein as Smart Integration (SI) cloud services, on end-user devices. According to one embodiment, the SI cloud services implement unique and/or complex workflows that are desirable to users of end-user devices, but that are not available via the ICE cloud services.

The ICE cloud services act as an intermediary between end-user devices and the SI cloud services and provide a user-friendly user interface for accessing the SI cloud services via an end-user device. The ICE cloud services implement the Application Program Interfaces (APIs) of the SI cloud services, and also manage results generated by the SI cloud services, but without having to implement the APIs of SI cloud components that are used by the SI cloud applications. The ICE cloud services also manage user information, authorization credentials, and tokens needed to access third-party services. Further, the ICE cloud services provide a user interface for performing management functions with respect to both the ICE cloud services and the SI cloud services.

According to another embodiment, the SI cloud and the ICE cloud are integrated using direct linking, i.e., by directly linking an end-user device to the SI cloud. According to this approach, the user interface of an end-user device displays a user interface object that includes an embedded link that points to the SI cloud. A user of the end-user device directly connects the end-user device with SI cloud by selecting the user interface object. Selection of the user interface object causes information, such as a user ID, device identification data, and a token to be sent to the SI cloud to allow the SI cloud to authorize the user's access to the SI cloud.

These approaches address the technical problem of how to access the functionality provided by the SI cloud services via end-user devices without having to modify the SI cloud services, implement the APIs of the SI cloud services on end-user devices, manage the results of cloud service processing, or manage the data, including authorization data, required to use third-party services. The technical solution uses existing cloud services, i.e., the first set of cloud services (ICE cloud services) as an intermediary between end-user devices and the second set of cloud services (SI cloud services), as well as a direct linking approach.

II. Architecture

FIG. 1A is a block diagram that depicts an example arrangement 100 for accessing cloud services using end-user devices. In the example depicted in FIG. 1A, arrangement 100 includes an end-user device 110, an Integrated Cloud Environment (ICE) cloud 120, a Smart Integration (SI) cloud 150, and third-party services 190.

End-user device 110 is a device that performs printing and one or more functions, such as scanning, copying, facsimile, etc. End-user device 110 may include computer hardware, computer software, and any combination of computer hardware and computer software for performing printing and the one or more other functions. This may include, for example, scanning components, one or more processors, one or more memories, one or more communications interfaces, such as wired and wireless interfaces, an operating system, one or more processes for supporting and performing the functionality provided by end-user device 110, a display such as a touch screen display, etc. According to one embodiment, end-user device 110 includes one or more elements for communicating with other processes. In the example depicted in FIG. 1A, end-user device 110 may include an ICE client application 112, or alternatively, a Web browser 114. ICE client application 112 is an application that is configured to communicate with ICE cloud 120 and implements at least a portion of one or more application program interfaces (APIs) of ICE cloud 120. For example, ICE client application 112 may implement Web browser functionality to communicate with ICE cloud 120. Web browser 114 may be any type of Web browser for communicating with ICE cloud 120 and allows end-user device 110 to access functionality provided by ICE cloud 120 and SI cloud 150 without a purpose-built application such as ICE client application 112.

A. ICE Cloud

ICE cloud 120 is a cloud environment that includes an ICE cloud manager 122, ICE cloud applications 130 and ICE cloud data 140. ICE cloud 120 may be implemented on one or more computing elements, such as network elements, servers, etc., and embodiments are not limited to any particular implementation for ICE cloud 120. ICE cloud 120 may include fewer or additional elements than the elements depicted in FIG. 1A, depending upon a particular implementation, and ICE cloud 120 is not limited to any particular implementation. For example, ICE cloud 120 may be implemented by one or more processes executing on one or more computing systems.

i. Ice Cloud Manager

ICE cloud manager 122 manages ICE cloud 120, including processing requests from end-user device 110 and other client devices, and performing various administrative tasks for ICE cloud 120. ICE cloud applications 130 may be managed by ICE cloud manager 122 and/or by one or more application server processes. ICE cloud applications 130 may include a wide variety of applications for performing various functions, including as connectors to services provided by SI cloud 150, as described in more detail hereinafter. In the example depicted in FIG. 1A, ICE cloud applications 130 include an OCR application 132, a Bates stamping application 134, a court electronic filing, i.e., e-filing, preparation application 136, and a data storage application 138. Embodiments are not limited to these applications and other applications may be provided, depending upon a particular implementation. One example application not depicted in FIG. 1A is an application for converting data for mobile applications, e.g., a PDF conversion application for mobile printing.

Figure 2A:
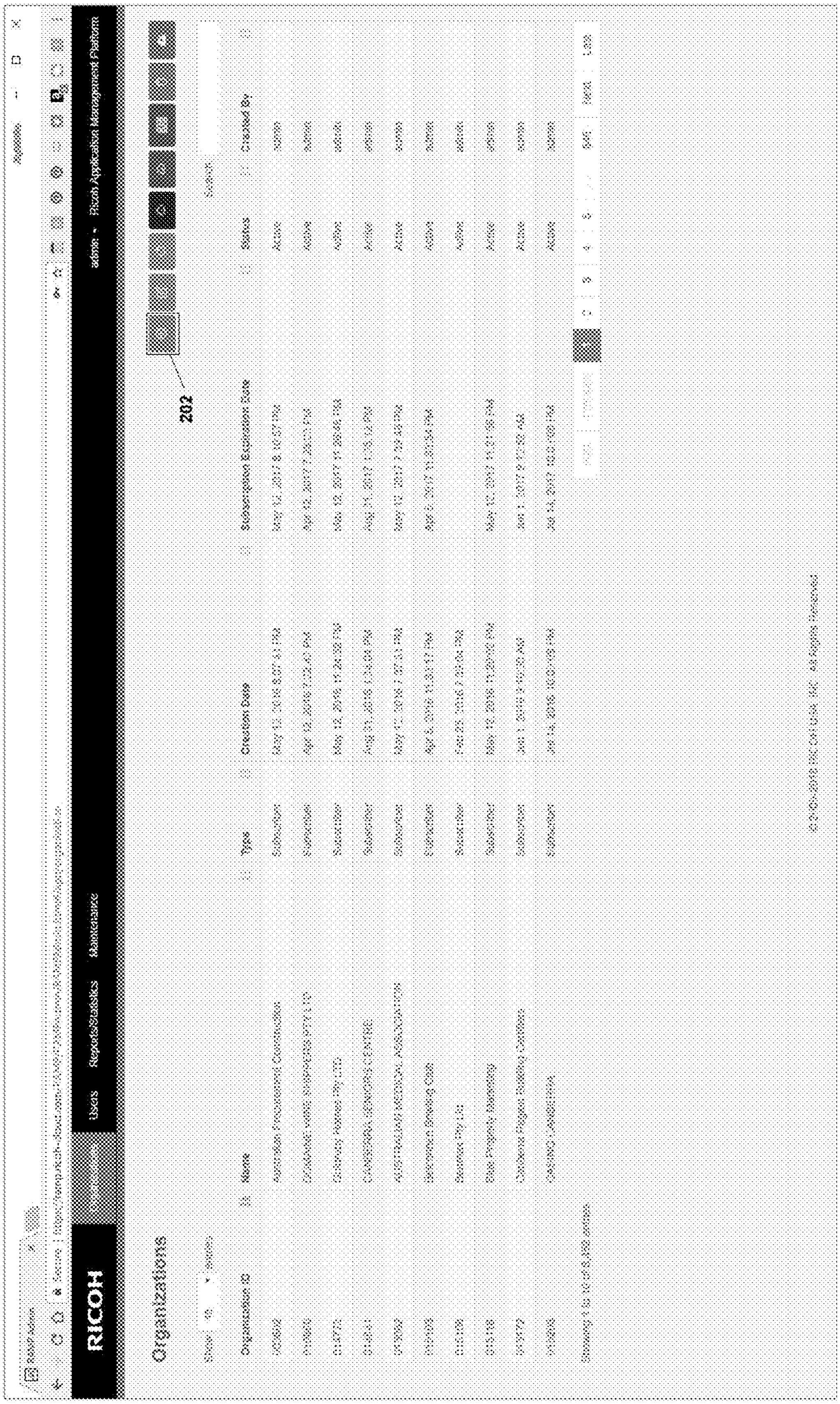
FIG. 2A depicts an administrative screen that allows administrative users to view their organization (customer) list.
Figure 2B:
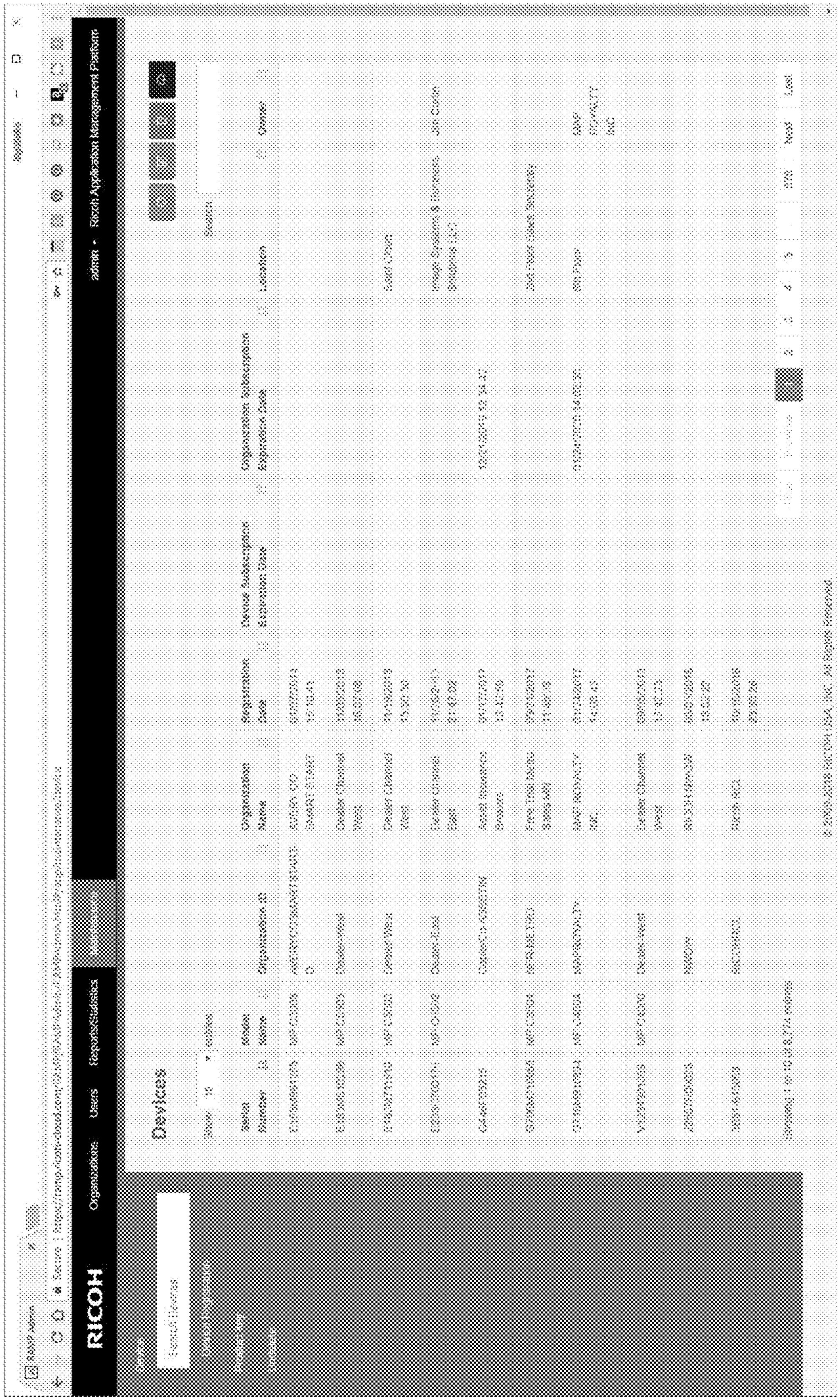
FIG. 2B depicts an administrative screen that allows administrative users to view their currently-registered devices.
Figure 2C:
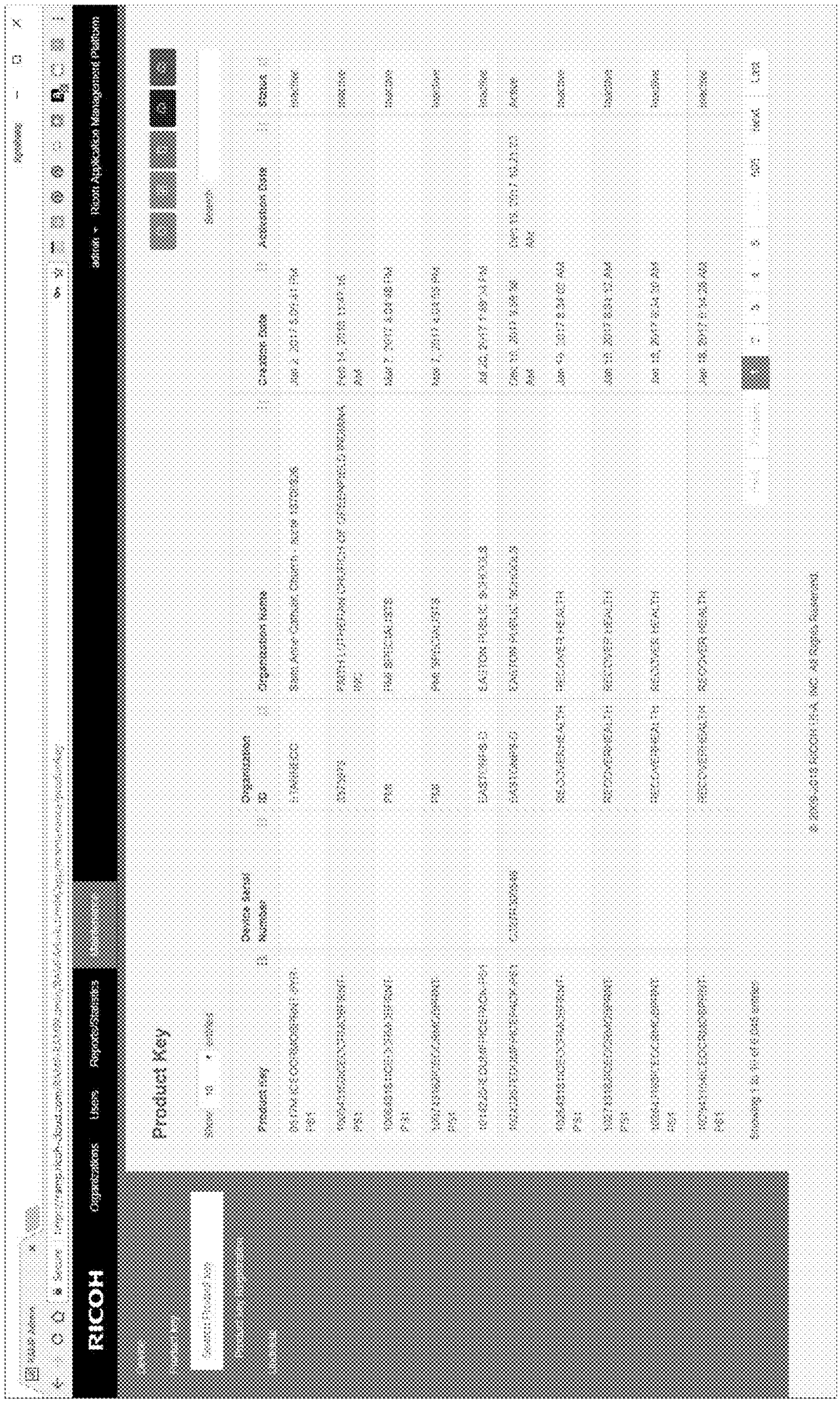
FIG. 2C depicts an administrative screen that allows administrative users to view their product keys.
Figure 2D:
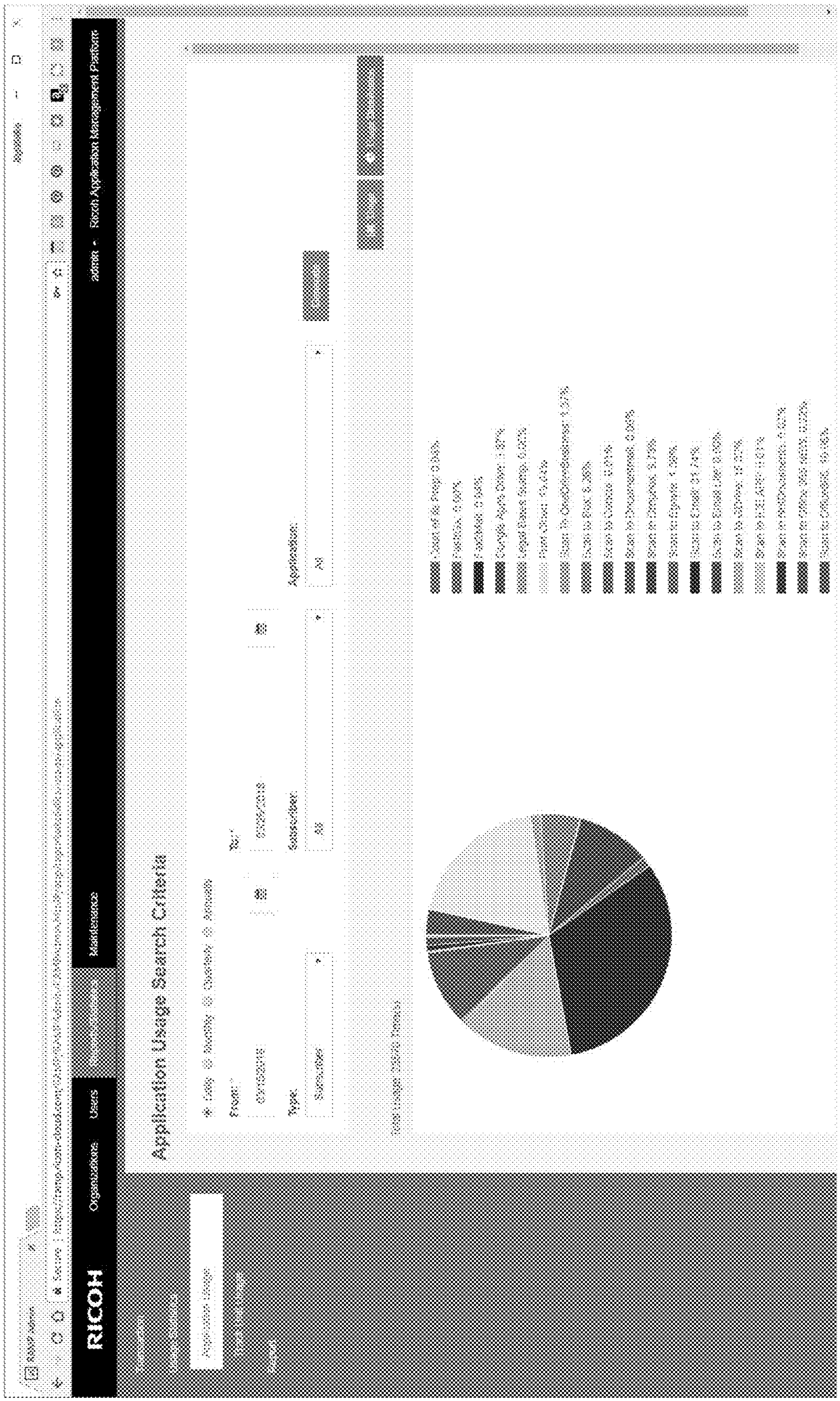
FIG. 2D depicts an administrative screen that allows administrative users to view their application usage reports.
Figure 2E:
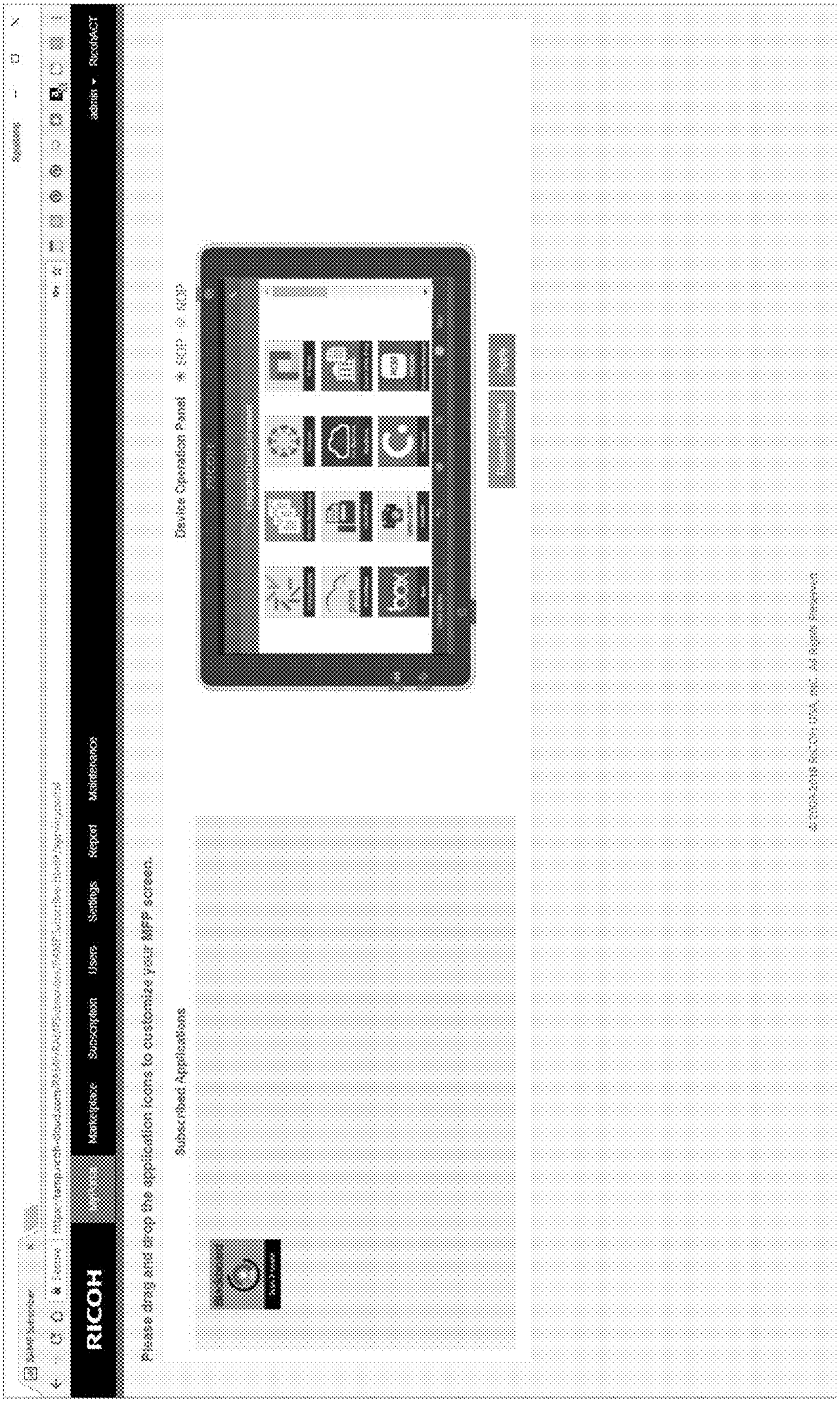
FIG. 2E depicts a user interface screen of a subscriber console that allows subscribers to view their currently subscribed subscriptions.
Figure 2F:
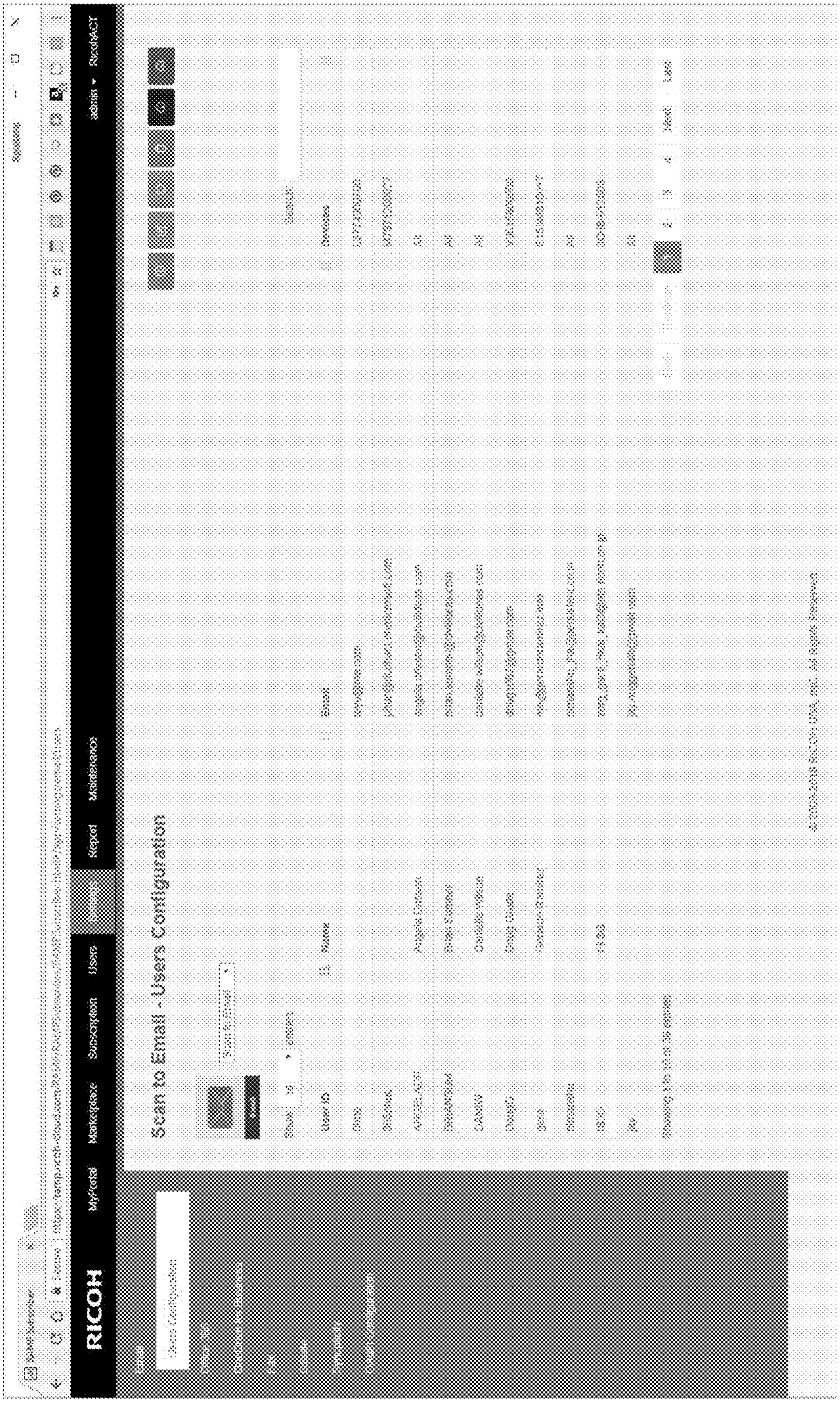
FIG. 2F depicts a user interface screen of a subscriber console that allows subscribers to view applications settings for an application.
Figure 2G:
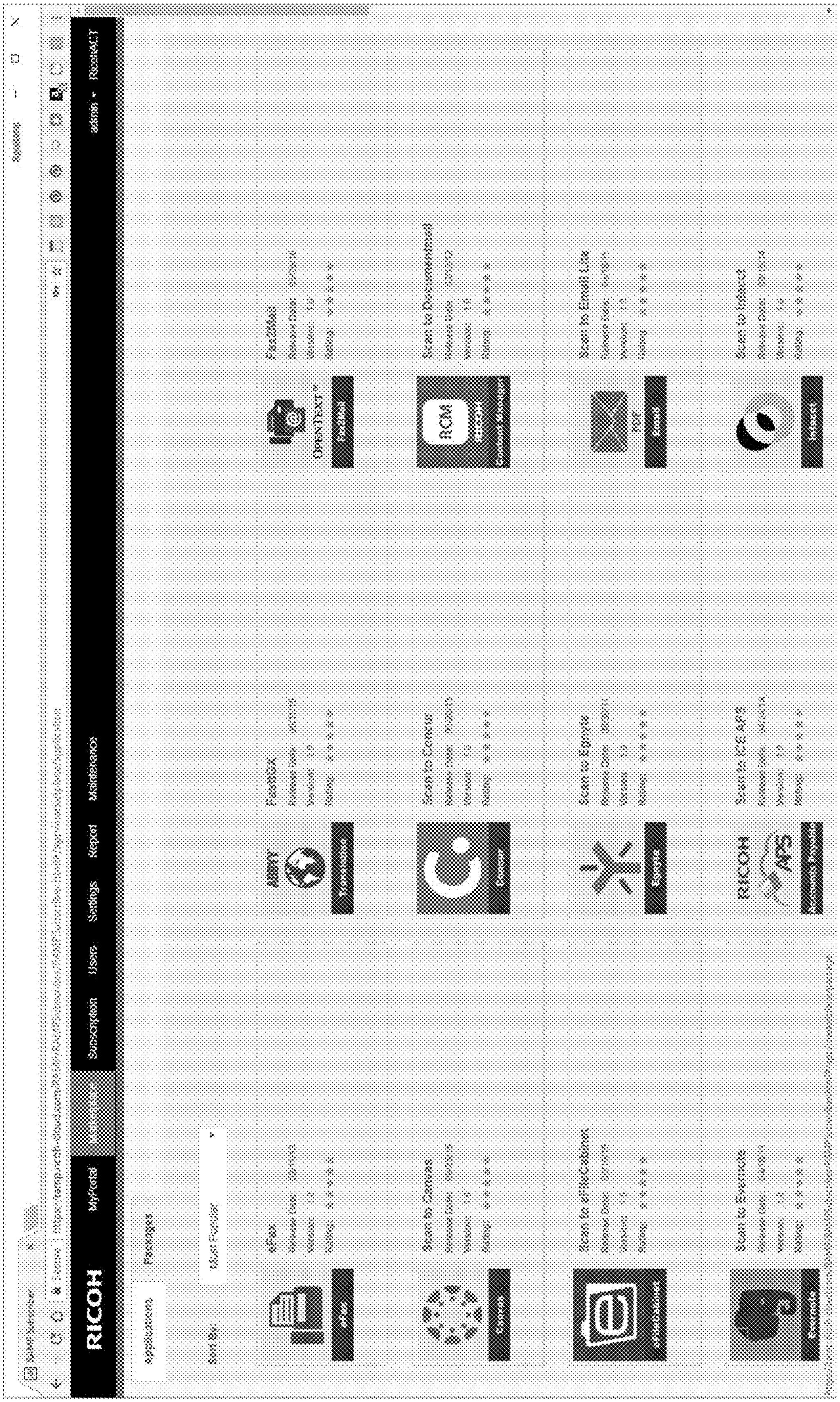
FIG. 2G depicts a user interface screen of a subscriber console that allows subscribers to view an application marketplace.

According to one embodiment, ICE cloud manager 122 provides one or more user interfaces for managing the ICE cloud environment. The user interfaces may be implemented as a Web-based user interface, e.g., by generating and providing one or more Web pages to a client device in response to requests from the client device. FIGS. 2A-2D depict four administrative screens that allow administrative users to view their organization (customer) list (FIG. 2A), currently-registered devices (FIG. 2B), product keys (FIG. 2C), and application usage reports (FIG. 2D). FIGS. 2E-2H depict user interface screens of a subscriber console that allow subscribers to view their currently subscribed subscriptions (FIG. 2E), view applications settings for an application (FIG. 2F), view an application marketplace (FIG.

Figure 2H:
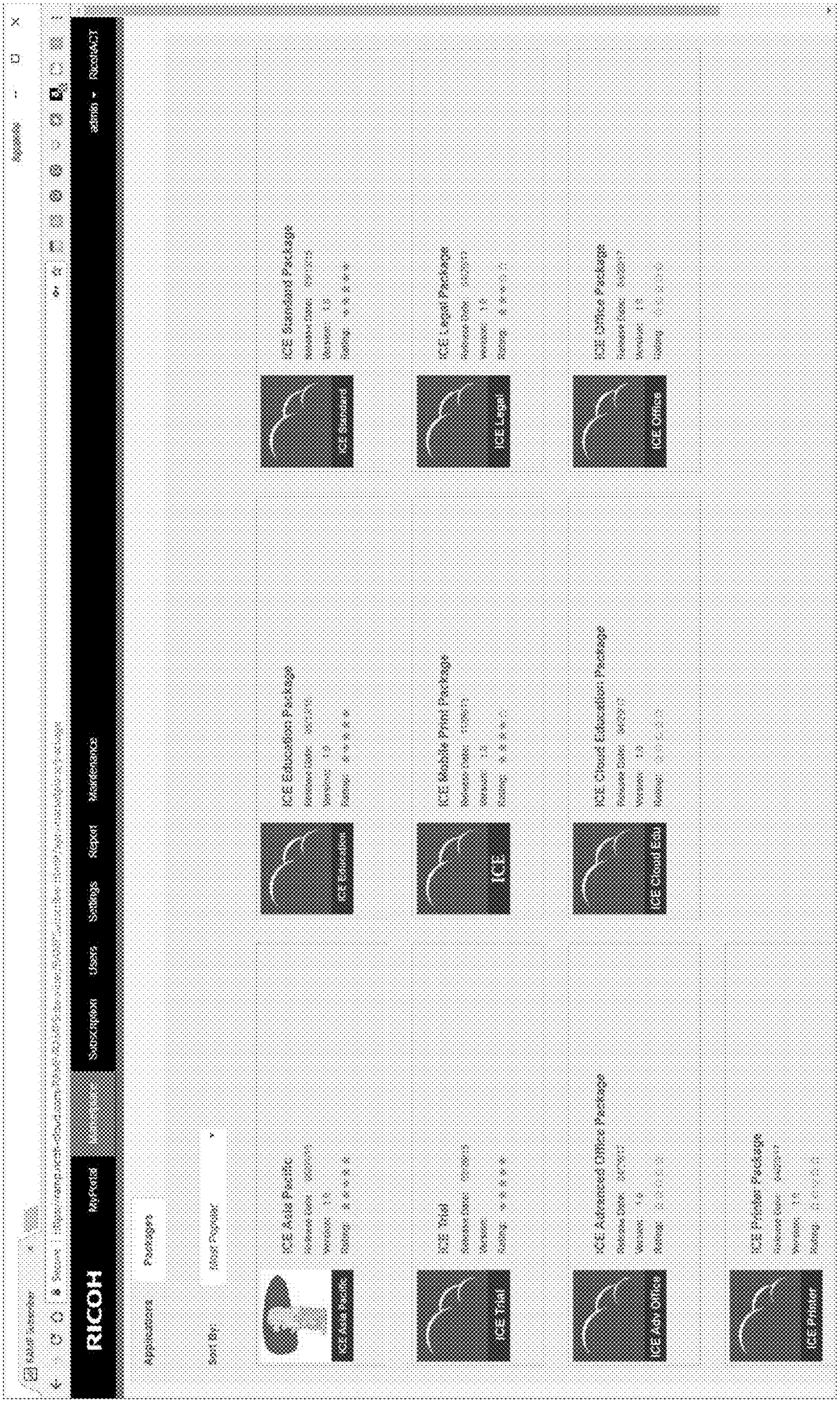
FIG. 2H depicts a user interface screen of a subscriber console that allows subscribers to view a packages marketplace.
Figure 2I:
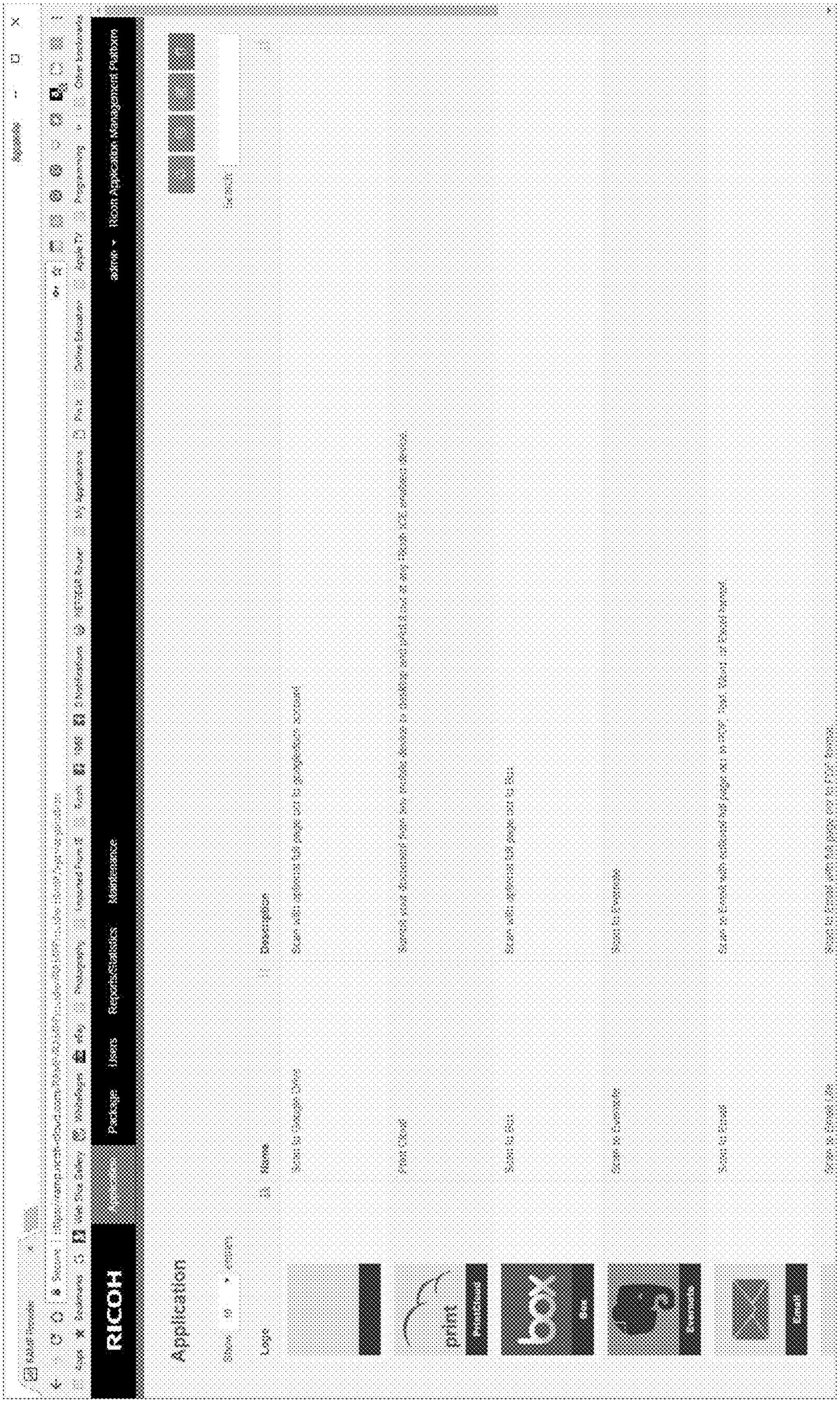
FIG. 2I depicts a user interface screen of a provider console that allow providers of applications and packages to manage applications and packages and more specifically, to view current applications.
Figure 2J:
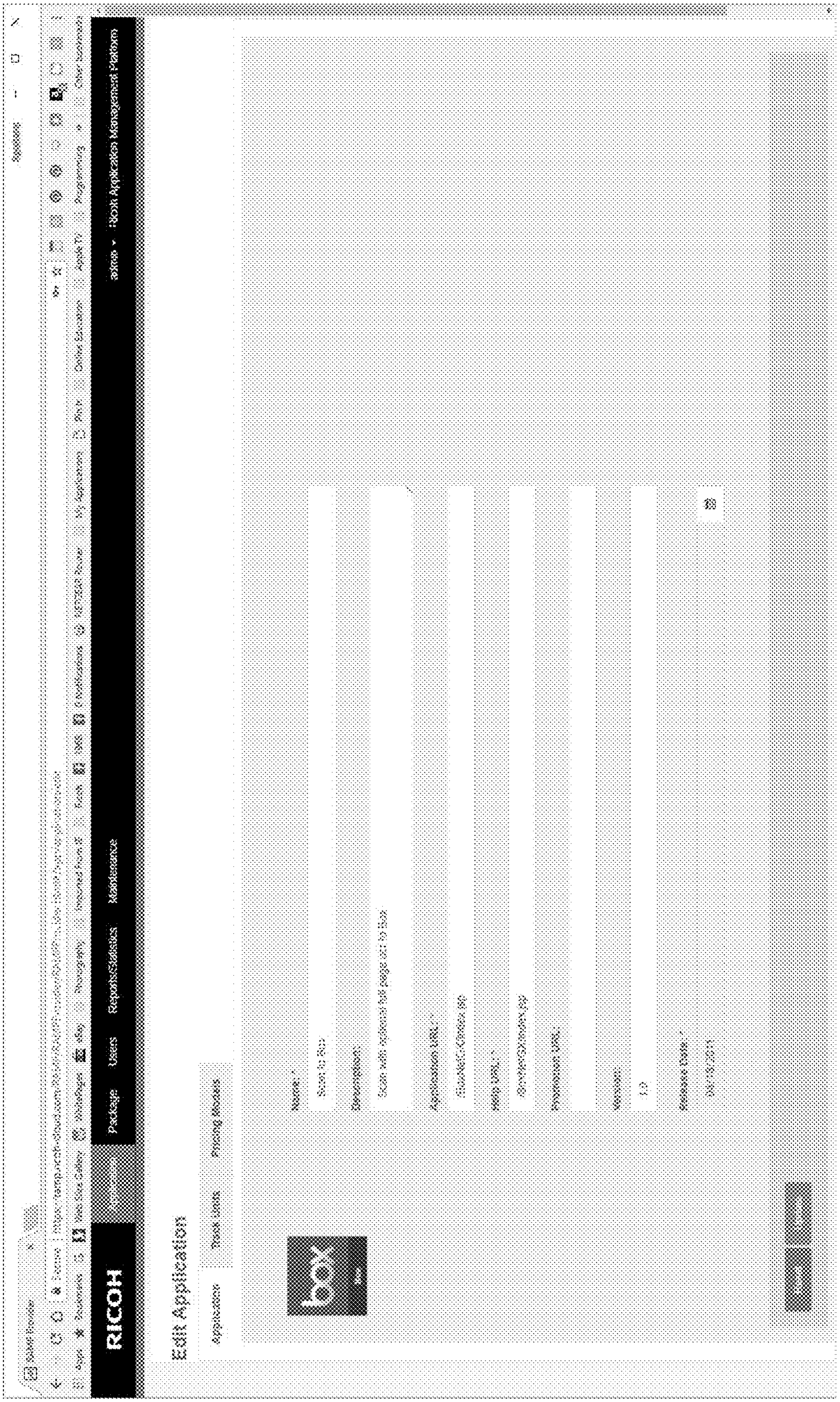
FIG. 2J depicts a user interface screen of a provider console that allow providers of applications and packages to manage applications and packages and more specifically, to add/update applications.
Figure 2K:
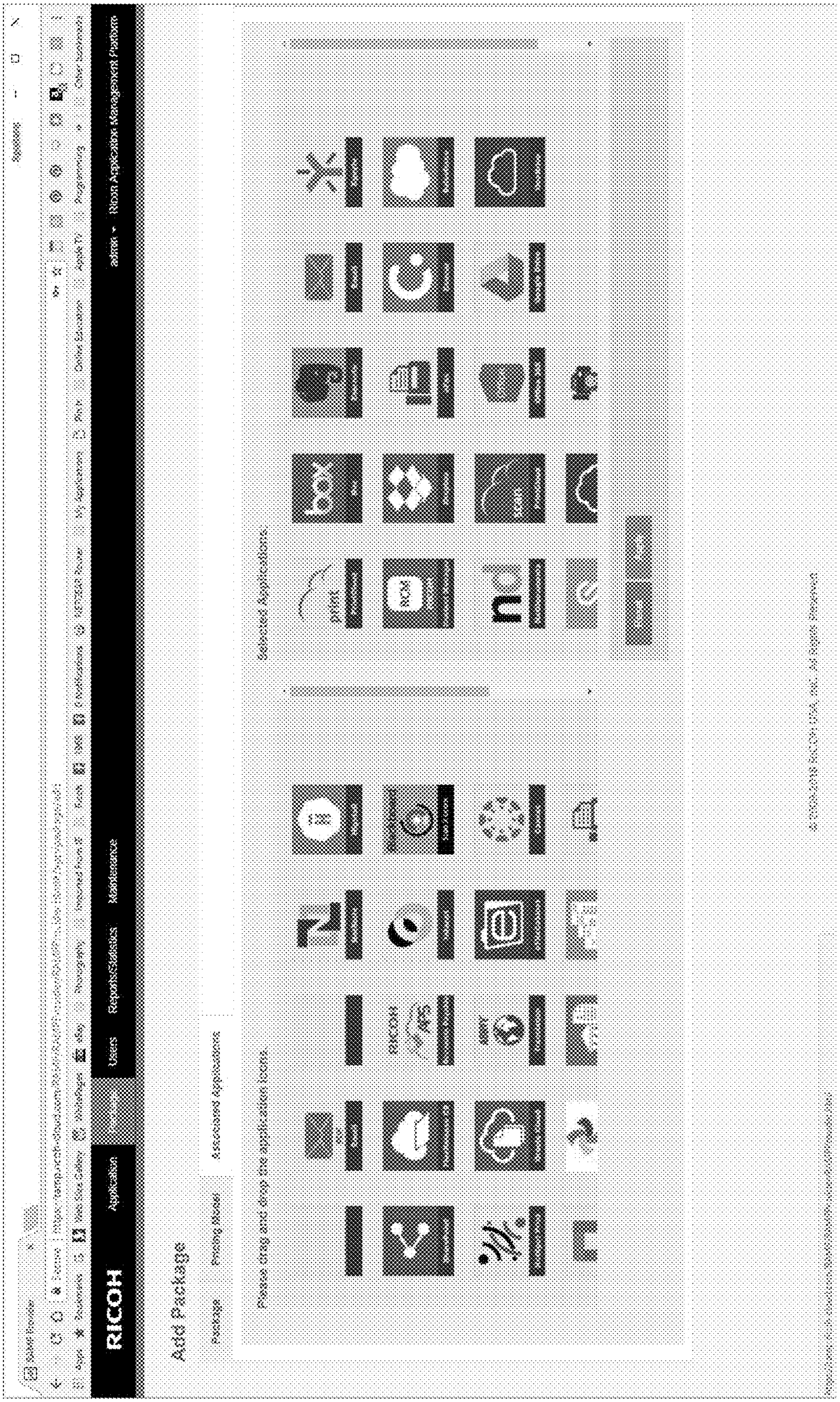
FIG. 2K depicts a user interface screen of a provider console that allow providers of applications and packages to manage applications and packages and more specifically, to view their current packages of applications.
Figure 2L:
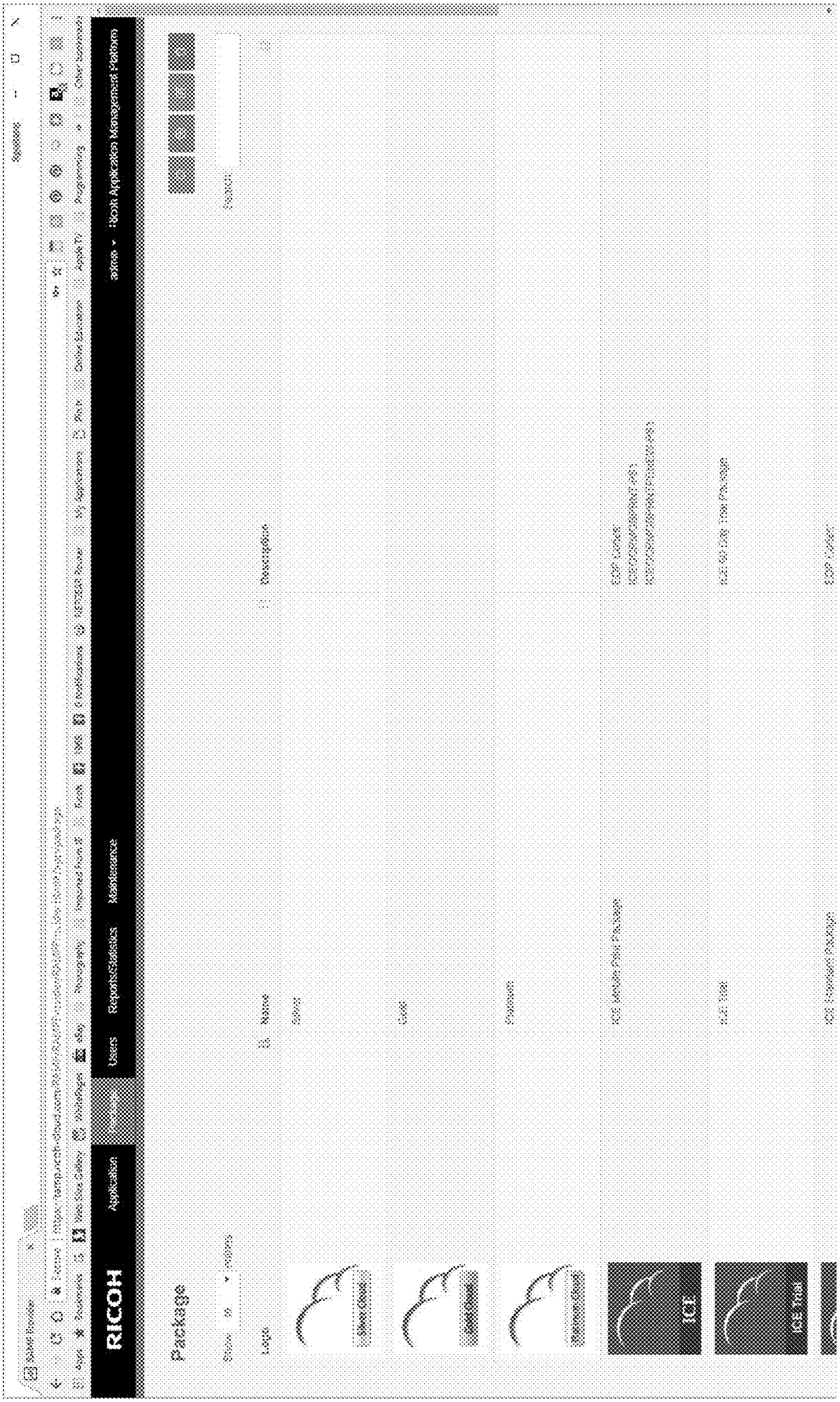
FIG. 2L depicts a user interface screen of a provider console that allow providers of applications and packages to manage applications and packages and more specifically, to add/update packages.

2G), and view a packages marketplace (FIG. 2H). FIGS. 2I-2L depict user interface screens of a provider console that allow providers of applications and packages to manage applications and packages and more specifically, to view current applications (FIG. 2I), add/update applications (FIG. 2J), view their current packages of applications (FIG. 2K), and add/update packages (FIG. 2L). Settings specified by a user may be stored, for example in management and configuration data 142, and used as default settings for ICE cloud applications 130.

ii. Ice Cloud Data

ICE cloud data 140 includes data used to configure and manage ICE cloud 120. In the example depicted in FIG. 1A, ICE cloud data 140 includes management and configuration data 142 and user, authorization, and token data 144. Management and configuration data 142 includes configuration data for ICE cloud applications 130, for example, the names, versions, application program interface definitions, and status of ICE cloud applications 130. User, authorization, and token data 144 may include any type of user data, authorization data and token data. This data is used, for example, to access ICE cloud applications 130, SI cloud applications 160 and third-party services 190, as described in more detail hereinafter.

iii. User, Authorization, and Token Data

Figures 1B, 1C, 1D:
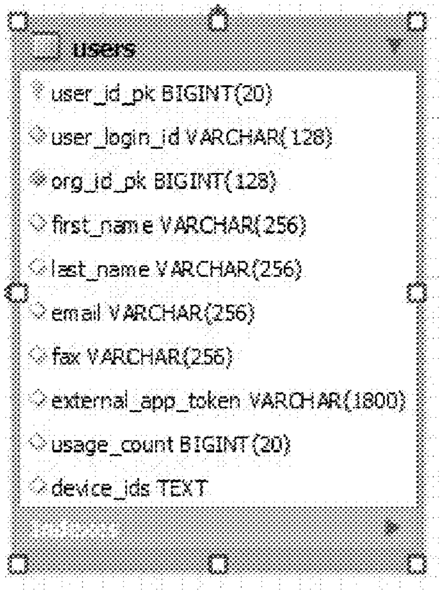
FIG. 1B is a block diagram that depicts an example data schema for storing user, authorization, and token data.
FIG. 1C depicts an example instance of the data schema of FIG. 1B in the form of a two-part table.
FIG. 1D depicts mapping data in the form of a table that specifies a correspondence between ICE cloud user IDs and SI cloud user IDs.

FIG. 1B is a block diagram that depicts an example data schema for user, authorization, and token data 144. In this example, the fields in the data schema include a user identification (ID), a user login ID, an organization ID, a first name, a last name, an email address, a fax number, an external application token, a usage count, and one or more device IDs. The data for each field may comprise, for example, a numeric value, an alphanumeric string, etc. Not all of the fields depicted in FIG. 1B are required, and fewer or additional fields may be used, depending upon a particular implementation. For example, the data schema may include a "token valid" field that contains Boolean value indicating whether a particular token is currently valid. Users may have multiple tokens, for example, one for each of several applications, as described in more detail hereinafter.

FIG. 1C depicts an example instance of the data schema of FIG. 1B in the form of a two-part table. An instance of the data schema may be created and managed for each user, for example, as part of user, authorization, and token data 144 (FIG. 1A). The user interfaces for managing ICE cloud 120 provided by ICE cloud manager 122 may include a user interface for managing ICE cloud data 140, including user, authorization, and token data 144.

An application token, also referred to herein simply as a "token," is used to support token-based authentication for services, such as third-party services 190 and, as described in more detail hereinafter, SI cloud 150. Tokens may be valid for any amount of time that may vary depending upon a particular implementation. For example, tokens may be valid until canceled/revoked, valid for a particular amount of time, i.e., valid until expiration, valid per use for a particular transaction/function, etc. A separate token may be issued to a particular user for each of a plurality of services that the user needs to access, and thus a user may have multiple tokens at any particular time. Tokens may be issued by the services for which they are used or may be issued by other services designated to issue tokens. Tokens may also be end-user device specific and may have corresponding permissions or scope, which define functions that the user may perform. Tokens are maintained in ICE cloud 120 and used by ICE cloud applications 130 to access third-party services 190, and as described hereinafter, to provide direct integration of end-user devices and ICE cloud 150.

B. SI Cloud

SI cloud 150 includes an SI cloud manager 152, SI cloud applications 160, SI cloud components 170, and SI cloud data 184. SI cloud 150 may be implemented on one or more computing elements, such as network elements, servers, etc., and embodiments are not limited to any particular implementation for SI cloud 150. SI cloud 150 may include fewer or additional elements than the elements depicted in FIG. 1A, depending upon a particular implementation, and SI cloud 150 is not limited to any particular implementation. For example, SI cloud 150 may be implemented by one or more processes executing on one or more computing systems.

SI cloud manager 152 manages SI cloud 150, including managing processing of requests to and from ICE cloud 120 and third-party services 190, and performing various administrative tasks for SI cloud 150.

i. SI Cloud Components

Figure 3A:
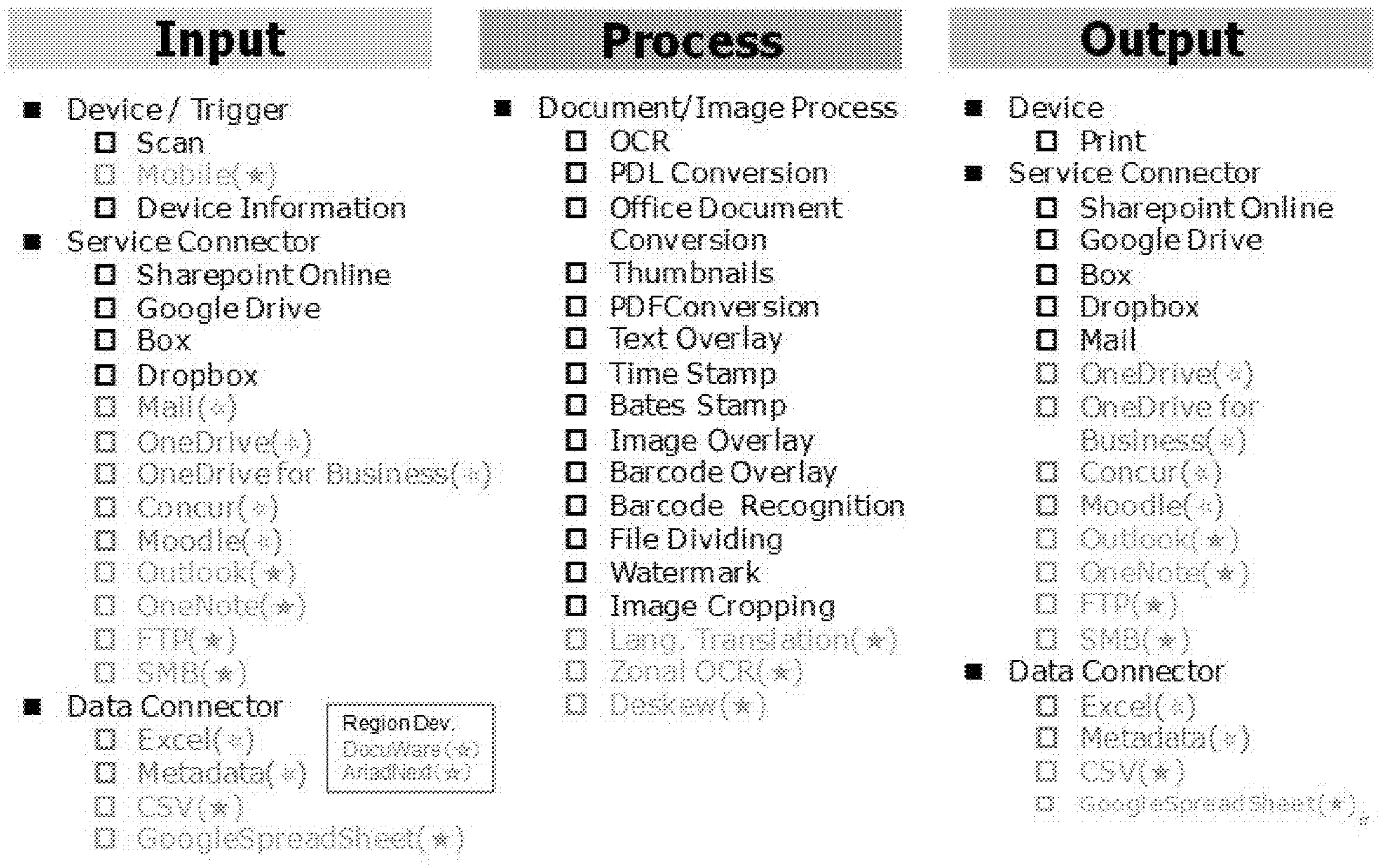
FIG. 3A depicts example components in the component categories input, process, and output.

SI cloud components 170 are processes that each implement one or more functions. The functions may be any type of function and may vary depending upon a particular implementation. According to one embodiment, the functions include input functions, output functions, and process functions. Examples of input and output functions include, without limitation, device/trigger functions, service connector functions, and data connector functions. FIG. 3A depicts example components in the component categories input, process, and output. In this example, the input categories represent sources of documents or document data. For example, scan data from scanning, device information from a device, e.g., from device firmware information, device metering information (number of copies, prints, scans, etc. performed), etc. Another type of input is user-defined user interface selections, such as a list box. User-defined user interface selections may originate from spreadsheets, CSV files, Google sheets, etc. Process function types pertain to different types of processing that may be performed on documents, including, for example, barcode recognition.

In the example depicted in FIG. 1A, SI cloud components 170 include several process functions, including OCR 172, file divide 174, Bates stamping 176, time stamping 178, and watermark 180, which provide OCR, file divide, Bates stamping, time stamping, and watermarking services, respectively. These example components are provided for explanation purposes and embodiments are not limited to these examples components. Output functions pertain to what happens to processed document data. For example, processed document data may be printed, emailed, sent to a cloud service, and/or stored in on-premise storage locations, e.g., particular servers, folders, etc. According to one embodiment, SI cloud components 170 implement functions that are not implemented by ICE cloud applications 130. According to yet another embodiment, SI cloud applications 160 do not all share a common user interface.

According to one embodiment, each of the SI cloud components 170 supports a particular API that may be the same as or different from APIs supported by other SI cloud components. SI cloud components 170 may be used by other processes to perform the specified function. For example, an application external to SI cloud 150 may use OCR 172 component to convert image data to text using optical character recognition, although this requires that the application implement the API of OCR 172 component.

ii. SI Cloud Applications

SI cloud applications 160 are processes that use one or more SI cloud components 170 to perform multiple functions, also referred to herein as a "workflow." SI cloud applications 160 may be invoked by external applications and devices to perform a particular workflow. For example, a client device may invoke a particular SI cloud application, from SI cloud applications 160, to perform the workflow provided by the particular SI cloud application.

The functions performed by any particular workflow may vary depending upon a particular implementation and embodiments are not limited to any particular functions. As one example, a business workflow may include receiving scan data from an end-user device, such as an MFP, converting the scan data to text data, e.g., using optical character recognition, marking the scan data and/or the text data to establish authenticity, performing various types of business processing on the text data, storing the scan data and text data in a secure repository, with or without encryption, and generating and transmitting one or more notifications. The notifications may indicate, for example, results of the business processing performed on the text data, the successful storing of the scan data and/or text data in the repository, etc. This is just one example of a workflow that may be implemented by According to one embodiment, SI cloud applications 160 implement workflows using SI cloud components 170. This may include, for example, SI cloud applications 160 invoking one or more SI cloud components to perform the functions of a particular workflow. SI cloud applications 160 are configured to support the APIs of SI cloud components 170 that they invoke, as well as manage intermediate results provided by SI cloud components 170 to perform a workflow.

For example, suppose that a particular SI cloud application uses two SI cloud components A and B to implement a workflow that processes data from an end-user device, such as an MFP. The particular SI cloud application receives the data, for example, from an ICE cloud application. The particular SI cloud application generates a data processing request that conforms to the API of SI cloud component A. For example, the request may include one or more commands defined by the API of SI cloud component A, along with the data, or a reference to the data. SI cloud application transmits the request to SI cloud component A, which processes the data in accordance with the request, and generates processing results. The particular SI cloud application receives the processing results from SI cloud component A. In this example, the processing results from SI cloud component A are considered to be intermediate results because the particular SI cloud application has not yet completed the workflow, and the processing results from SI cloud component A are used as input data to SI cloud component B.

The particular SI cloud application generates a data processing request that conforms to the API of SI cloud component B. For example, the request may include one or more commands defined by the API of SI cloud component B, along with the processing results received from SI cloud component A, or a reference to the processing results. The particular SI cloud application transmits the data processing request SI cloud component B for processing. SI cloud component B processes the request, generates processing results, and provides the processing results back to the particular SI cloud application. In this example, the processing results received from SI cloud component B are considered to be final processing results, since the workflow is complete. In the foregoing example, the particular SI cloud application manages all of the processing performed by SI cloud components A and B. Thus, an entity, such as an ICE cloud application, invoking the particular SI cloud application only has to interact with the particular SI cloud application and does not need to implement the APIs or manage intermediate results of the SI cloud components used by the particular SI cloud application to implement the workflow.

In the example depicted in FIG. 1A, SI cloud applications 160 include a Bates stamping application 162 and a court e-filing preparation application 164. These are example applications for purposes of explanation that are described in more detail herein, and embodiments are not limited to these example SI cloud applications.

Figure 3B:
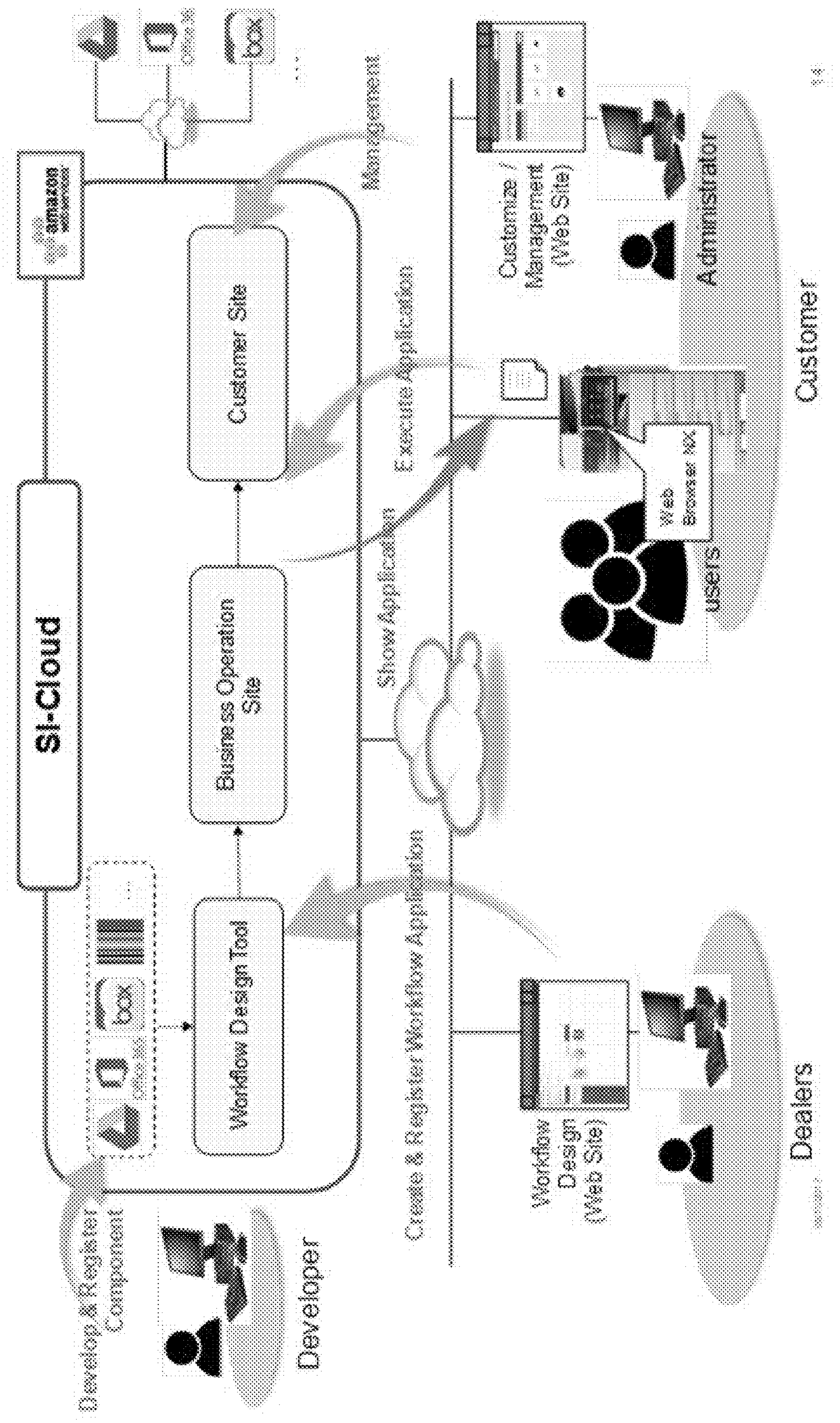
FIG. 3B is a block diagram that depicts an example context for an SI cloud.

FIG. 3B is a block diagram that depicts an example context for SI cloud 150. In the example depicted in FIG. 3B, developers develop and register SI cloud components 170 in SI cloud 150, and dealers create and register SI cloud applications 160 in SI cloud 150. In addition, customers execute SI cloud applications 160 from, for example, end-user devices, such as MFPs.

Figure 3C:
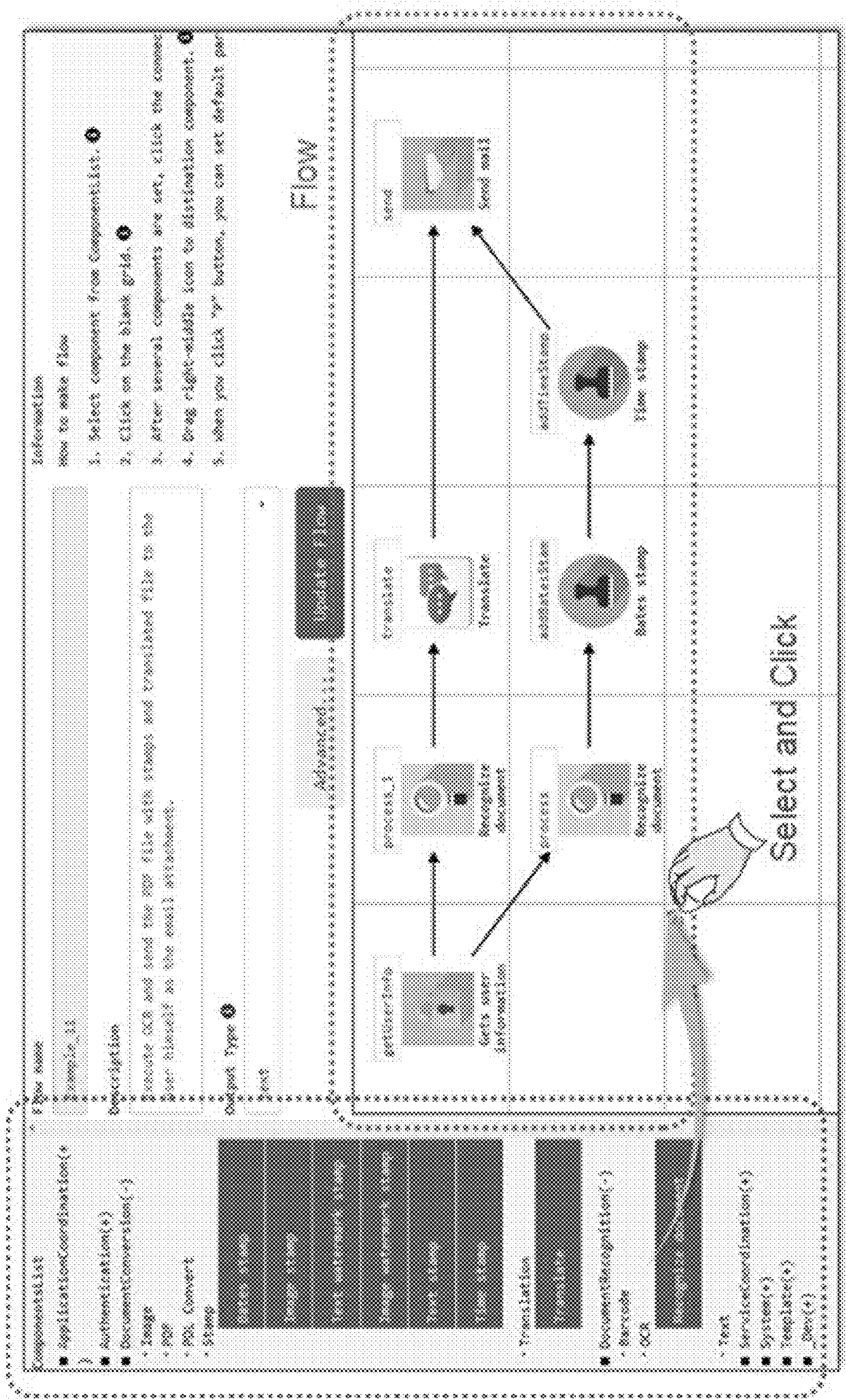
FIG. 3C depicts a user interface provided by a workflow design tool that allows users to drag and drop icons of SI cloud components onto a work surface to create a workflow implemented by an SI cloud application.

SI cloud applications 160 may each provide a unique user interface and may implement their own API. The user interface may be implemented, for example, as a program user interface or a Web-based user interface. According to one embodiment, SI cloud 150 provides user interfaces for managing SI cloud 150. The user interfaces may be implemented as a Web-based user interface, e.g., by generating and providing one or more Web pages to a client device in response to requests from the client device. FIG. 3C depicts a user interface provided by a workflow design tool that allows users to drag and drop icons of SI cloud components 170 onto a work surface to create a workflow implemented by an SI cloud 150 application. In the example depicted in FIG. 3C, the workflow performs two parallel tasks. After receiving data from a user, for example a scanned image, the data is processed using OCR to generate text, and in the top task the text is translated. In the bottom task, a Bates stamp and a time stamp are added to the text. Both the translated text and the text with the Bates stamp and time stamp are emailed to a destination.

Figure 3D:
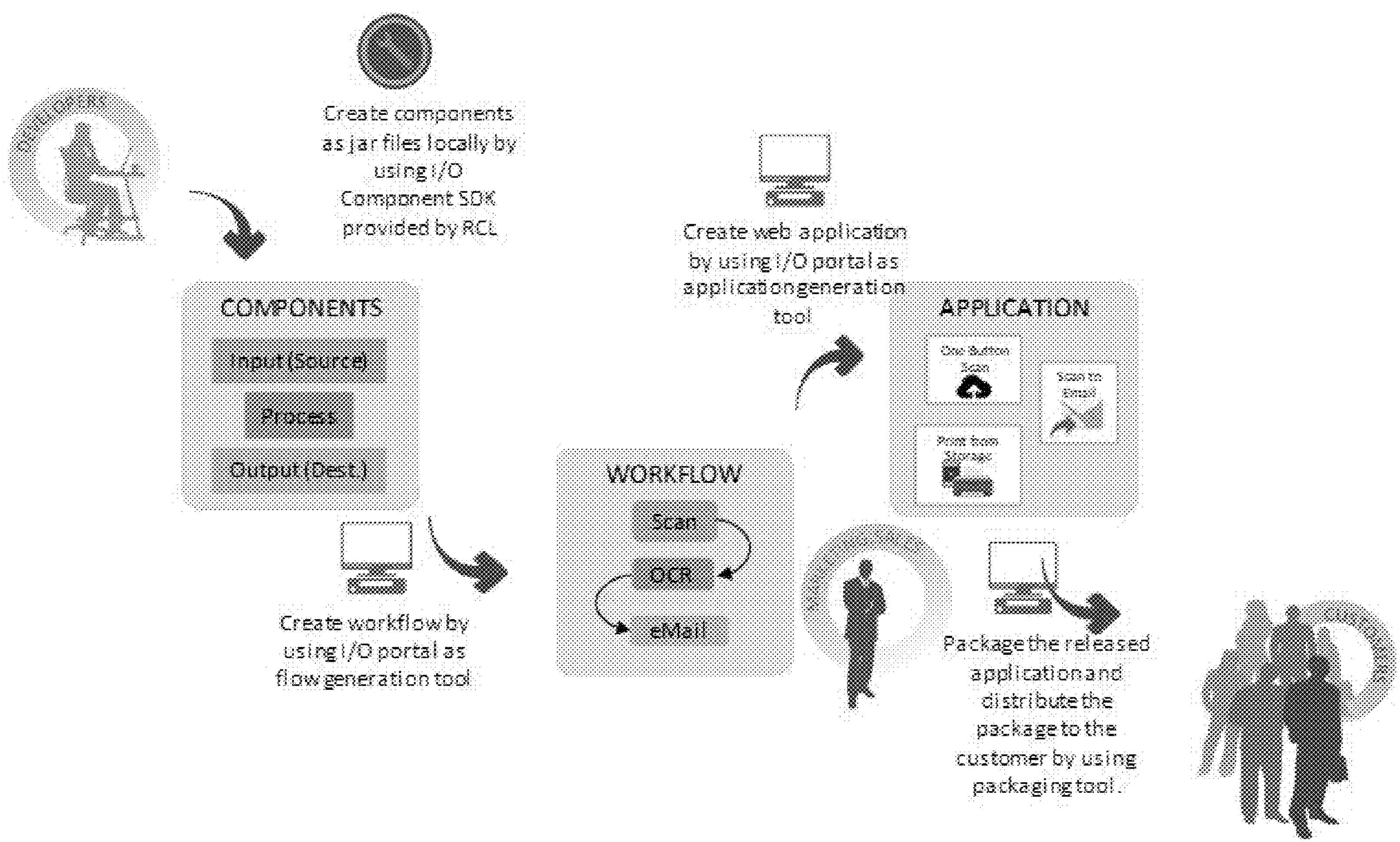
FIG. 3D is a block diagram that depicts the development process for SI cloud components and SI cloud applications.

FIG. 3D is a block diagram that depicts the development process for SI cloud components 170 and SI cloud applications 160. Starting from the upper left-hand corner, a developer creates SI cloud components 170 using an I/O component software development kit (SDK). In this example, SI cloud components 170 are created by jar files, but this is not required. Each new SI cloud component 170 has one or more defined inputs, processes (functions), and outputs. Workflows are created using the workflow design tool previously described herein with respect to FIG. 3C, and then implemented by applications, such as Web applications. Finally, the applications are released and made available to users via end-user devices, as described herein.

iii. SI Cloud Data

SI cloud data 184 includes data used to configure and manage SI cloud 150. In the example depicted in FIG. 1A, SI cloud data 184 includes management and configuration data 186 and user, authorization, and token data 188. Management and configuration data 186 includes configuration data for SI cloud applications 130 and SI cloud components 170, for example, the names, versions, application program interface definitions, and status of SI cloud applications 160 and SI cloud components 170. User, authorization, and token data 144 may include any type of user data, authorization data and token data. This data is used, for example, to access SI cloud applications 160, SI cloud components 170, and third-party services 190, as described in more detail hereinafter. The examples of user, authorization, and token data depicted in FIGS. 1B and 1C previously described herein with respect to user, authorization, and token data 144 are applicable to user, authorization, and token data 188, except that user, authorization, and token data 188 is managed by SI cloud 150, since it is separate and distinct from user, authorization, and token data 144.

III. Integrating the SI Cloud and the ICE Cloud Environments

Several approaches are provided for accessing functionality of SI cloud 150 on end-user devices, such as MFPs, using ICE cloud applications 130, that act as intermediaries between end-user devices and SI cloud 150. The approaches integrate functionality provided by SI cloud 150 with a common user interface implemented by ICE cloud applications 130. This provides the benefit of having access to the functionality provided by SI cloud 150 on end-user devices via a common user interface, without having to implement APIs of SI cloud 150 on end-user devices. As described in more detail hereinafter, the approaches include different ways of managing user information, authorization credentials and tokens needed to access third-party services.

A. Integration Type 1: End-to-End Processing Managed by the SI Cloud

According to one embodiment for integrating the SI cloud and the ICE cloud, an ICE cloud application acts as an intermediary between and end-user device, such as an MFP, and an SI cloud application. The ICE cloud application both provides a user interface that allows a user to select a user and specify settings needed by the SI cloud application to process data, and implements the API of the SI cloud application. The ICE cloud application provides the data, user identification data, and the user-specified settings to the SI cloud application. The SI cloud application may use one or more SI components to process the data using the user-specified settings and thereby implement a workflow. In this situation, the SI cloud application implements the APIs of the SI cloud components and handles all interactions with the SI cloud components on behalf of the ICE cloud application and the end-user devices. The SI cloud application receives processing results from the SI cloud components and manages any subsequent processing of the processing results, for example, by itself or third-party services. This provides an end-to-end approach with minimal involvement of end-user devices and ICE cloud applications.

i. Operational Examples

Figure 4A:
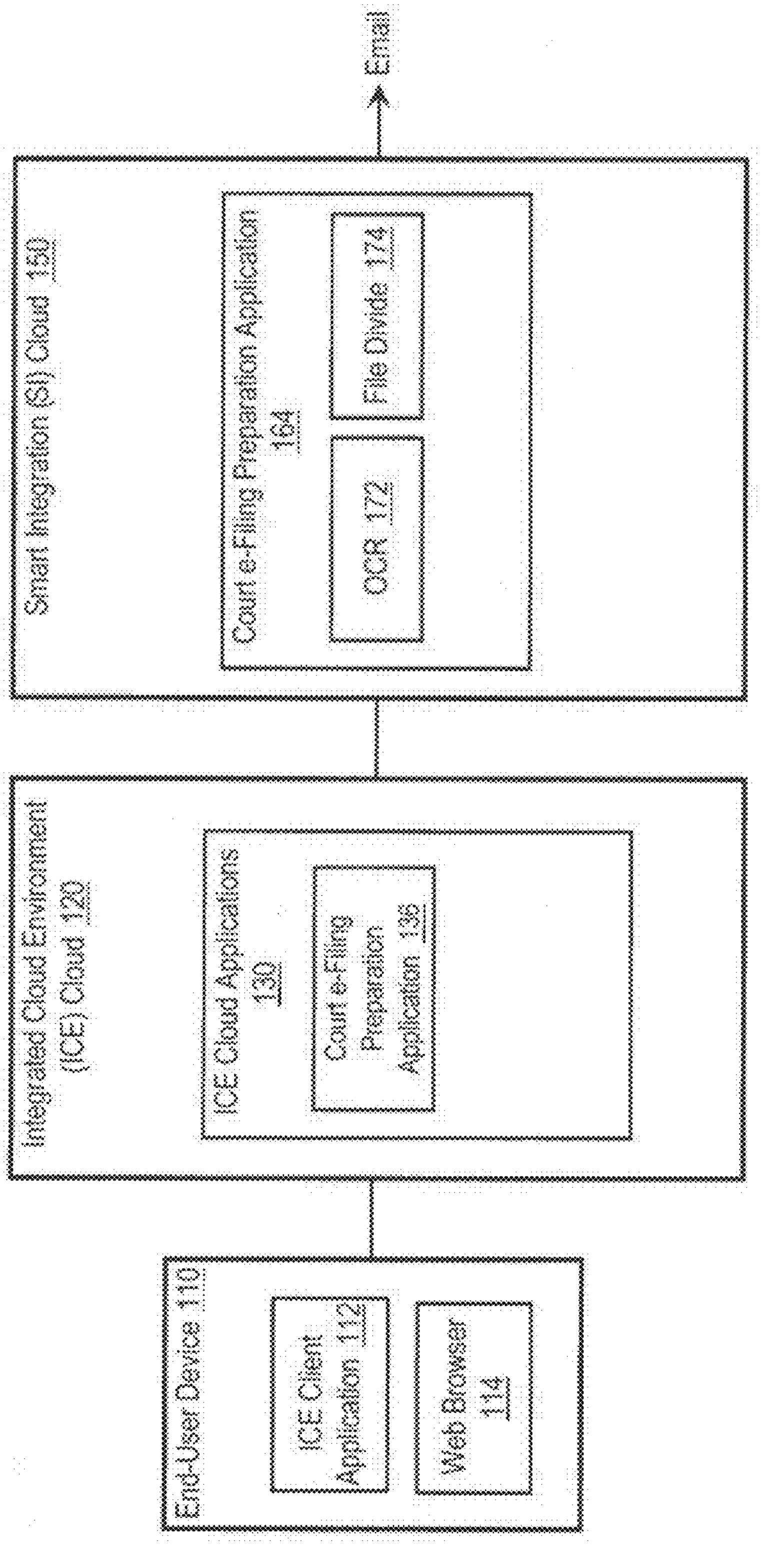
FIG. 4A is a block diagram that depicts an approach for integrating two different cloud environments.

FIG. 4A is a block diagram 400 that depicts an approach for integrating two different cloud environments. Some of the elements of FIG. 1A are not depicted in FIG. 4A for purposes of explanation only. In FIG. 4A, the approach is depicted in the context of preparing documents for e-filing with a judicial court. In this context, court e-filing preparation application 136 provides a user interface to a user of end-user device 110 and access to court e-filing preparation application 164 in SI cloud 150. Judicial courts may have specific requirements for electronic filing including, for example, formatting requirements, size requirements, etc. Documents to be e-filed with judicial courts that exceed a specified size have to be divided into separate documents.

Figure 4B:
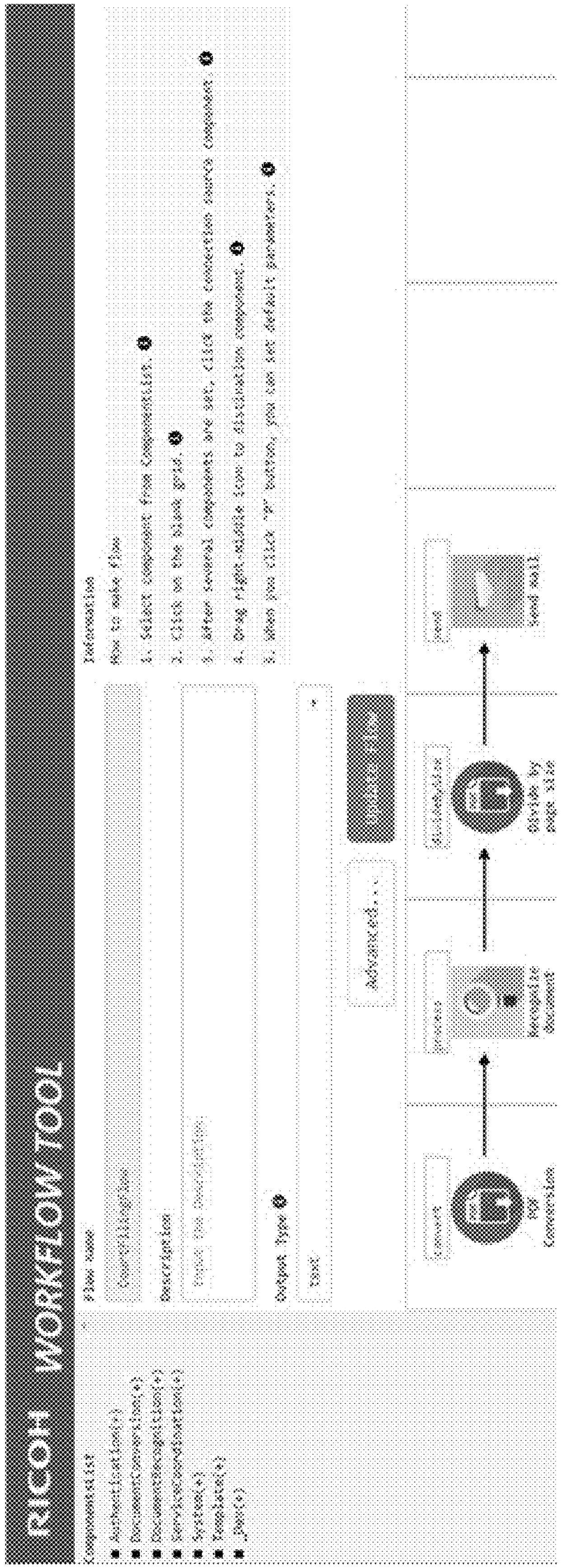
FIG. 4B is a user interface screen of a workflow tool that allows users to create workflows.

FIG. 4B is a user interface screen 420 of a workflow tool that allows users to create workflows. User interface screen 420 depicts the current steps performed in the workflow implemented by court e-filing preparation application 164 using SI cloud components 170. In this example, the workflow includes converting image data to text data using PDF conversion, dividing the text data into text portions that each satisfies a size requirement, and transmitting the text portions to one or more destinations via email. User interface controls allow a user to add, remove, and reorder steps in the workflow by selecting, dragging, and dropping user interface objects that correspond to each function in the workflow. Users may also specify default parameters used by each function in the workflow.

FIG. 5 is a flow diagram 500 that depicts an approach for integrating two different cloud environments in the context of preparing documents for e-filing with a judicial court. In step 502, a user of end-user device 110 accesses court e-filing preparation application 136 in ICE cloud 120 via ICE client application 112 or Web browser 114. For example, the user may initiate execution of ICE client application 112 or instruct Web browser 114 to access a URL associated with court e-filing preparation application 136. This may include the user identifying themselves, e.g., by selecting a user from a drop-down menu, completing authentication, for example, by scanning an identification card via a scanner associated with end-user device 110, entering user credentials, such as a user ID and password, etc. Verification of user credentials may be done locally on end-user device 110, or may involve remote services, such as a user verification service, ICE cloud manager 122, an ICE cloud application 130, etc.

Figure 4C:
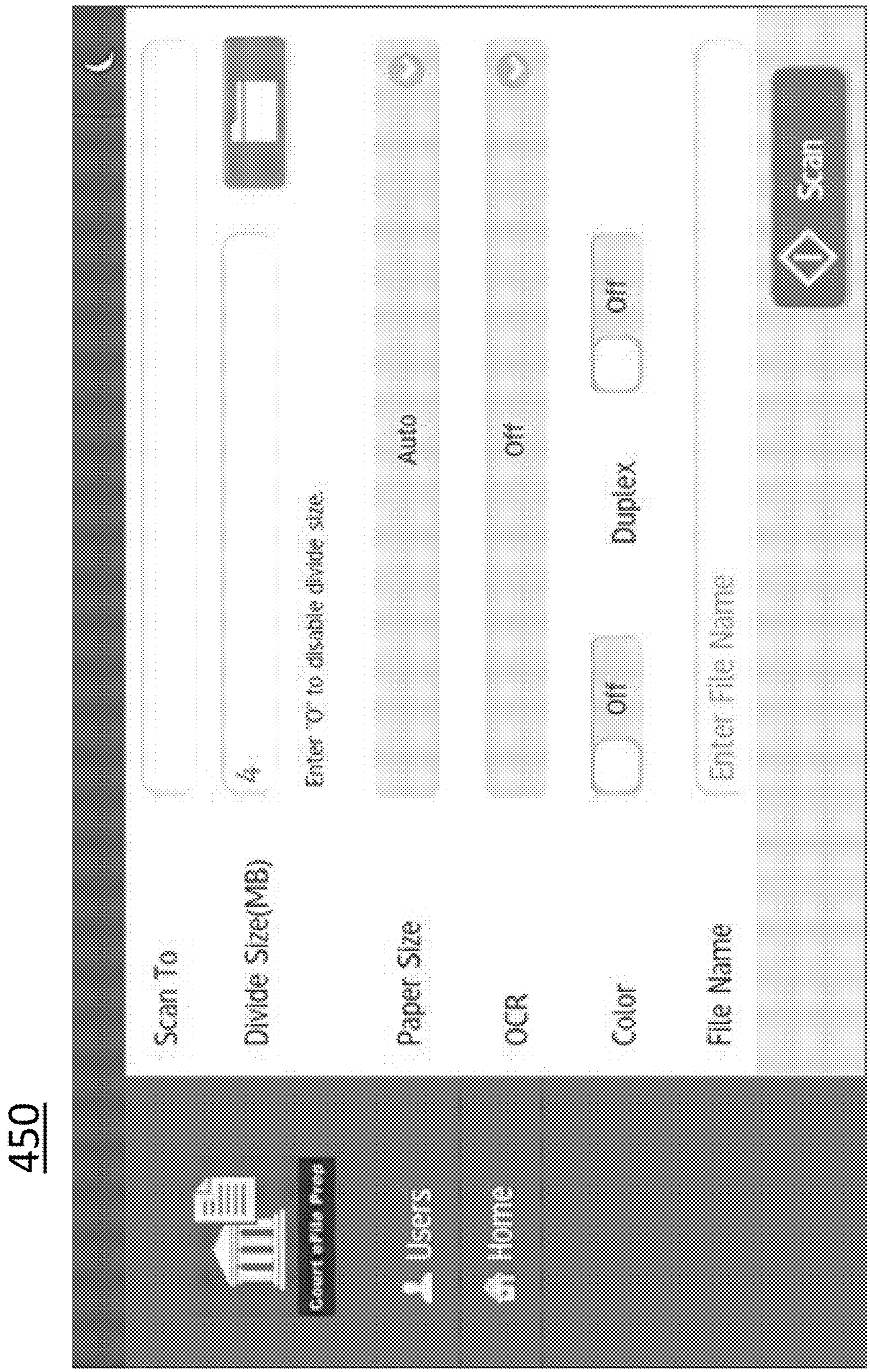
FIG. 4C depicts an example user interface screen provided by an ICE client application or a Web browser.

In step 504, court e-filing preparation application 136 provides a user interface, for example, via one or more Web pages. In the alternative where the user uses ICE client application 112 to access court e-filing preparation application 136, ICE client application 112 may provide the user interface. FIG. 4C depicts an example user interface screen 420 provided by ICE client application 112 or Web browser 114. User interface screen 420 allows a user to specify a destination for the end documents, for example by specifying one or more destination email addresses, a divide size that is used to limit the maximum size of each end document, a paper size, whether to enable OCR, color and duplex options, and a file name, collectively referred to herein as "user settings." User settings may be stored on end-user device 110 and used as default values for the user the next time they access end-user device 110.

In step 506, the user specifies settings to be provided to court e-filing preparation application 136 and ultimately used by court e-filing preparation application 164 to process data. The settings may include one or more email addresses to which the final processing results are to be sent.

In step 508, the user initiates the scan, for example by selecting the <Scan> button in FIG. 4C, the document is scanned, and scan data is generated. Embodiments are described herein in the context of a user generating source data in the form of scan data by scanning a physical document at end-user device for purposes of explanation, but embodiments are not limited to this example and are applicable to any type of source data. For example, a user may select existing source data, for example, previously scanned data stored on end-user device 110, data stored at a cloud service, such as a cloud data storage service, etc.

In step 510, user identification data, the scan data and settings data are provided to court e-filing preparation application 136. For example, ICE client application 112 may transmit a message to court e-filing preparation application 136 that includes the user ID, scan data, or a link to a location where the scan data is stored, and settings data that indicates the settings selected by the user. Alternatively, Web browser 114 may provide the user ID, scan data and settings data to court e-filing preparation application 136.

In step 512, court e-filing preparation application 136 invokes court e-filing preparation application 164 in SI cloud 150. According to one embodiment, court e-filing preparation application 136 supports the API of court e-filing preparation application 164 and invokes court e-filing preparation application 164 by generating and transmitting one or more messages to court e-filing preparation application 164 that conform to the API of court e-filing preparation application 164. The messages may include the user identification data and the settings data. The messages may be implemented, for example, by one or more Representational State (REST) calls.

In step 514, court e-filing preparation application 164 processes the scan data using the settings specified by the user and generates results. In the current example, this includes converting the scan data to text using optical character recognition, and dividing the text into text portions that satisfy a size requirement. The size requirement may be, for example, a maximum size limit or page limit allowed by a judicial Court for e-filing. In this example, the text portions represent the results of the processing performed by court e-filing preparation application 164. In the present example, court e-filing preparation application 164 performs final processing by transmitting the text portions to one or more email destinations specified by the settings data. Other types of final processing may be performed, depending upon a particular implementation, and embodiments are not limited to the example of emailing the final results to one or more destinations.

Figure 6A:
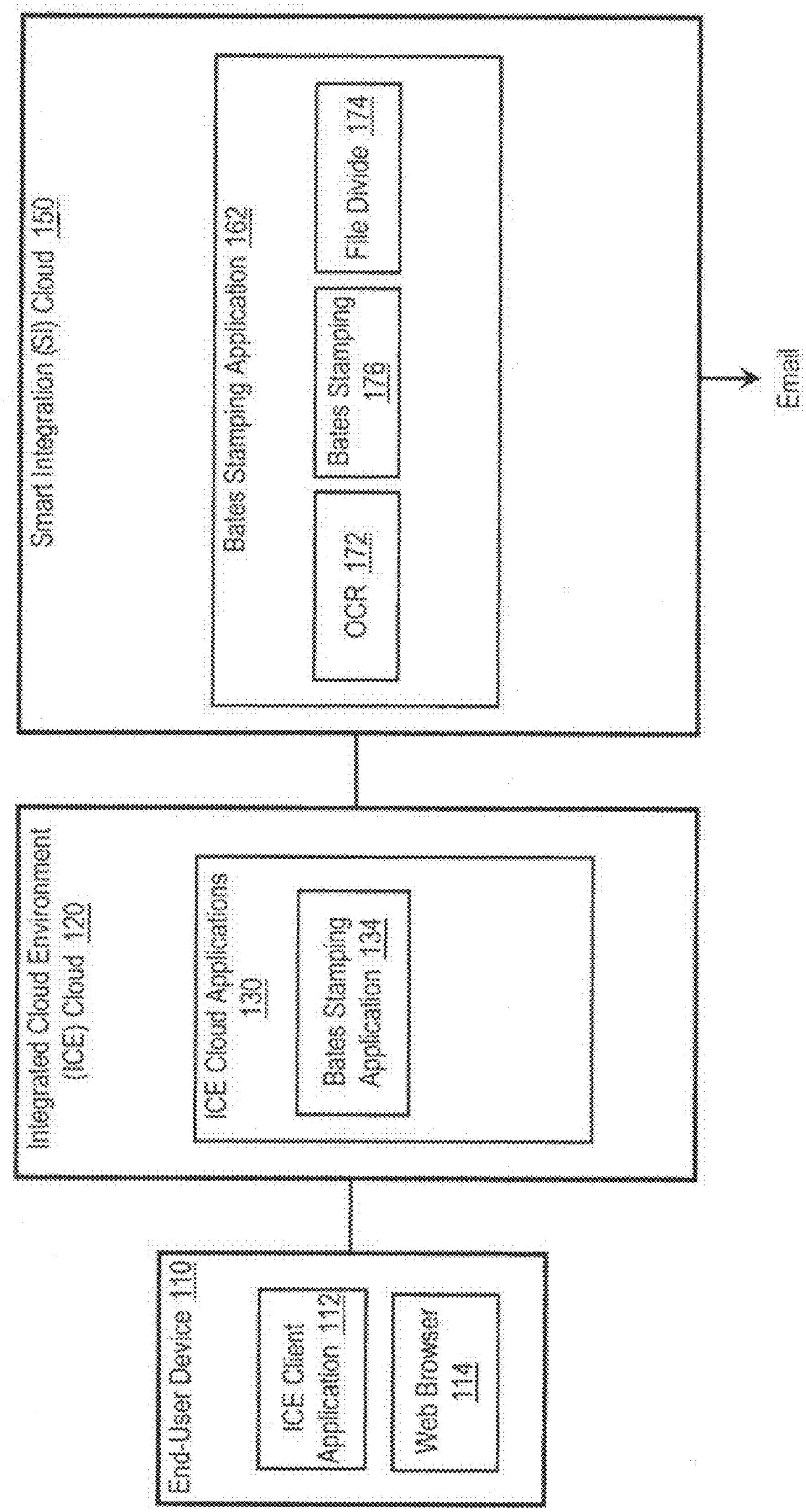
FIG. 6A is a block diagram that depicts another example of the approach for integrating two different cloud environments.

FIG. 6A is a block diagram 600 that depicts another example of the approach for integrating two different cloud environments. As with FIG. 4A, some of the elements of FIG. 1A are not depicted in FIG. 6A for purposes of explanation only. In FIG. 6A, the approach is depicted in the context of adding a Bates stamp to a document. In this context, Bates stamping application 134 provides a user interface to a user of end-user device 110 and access to Bates stamping application 162 in SI cloud 150.

Figure 6B:
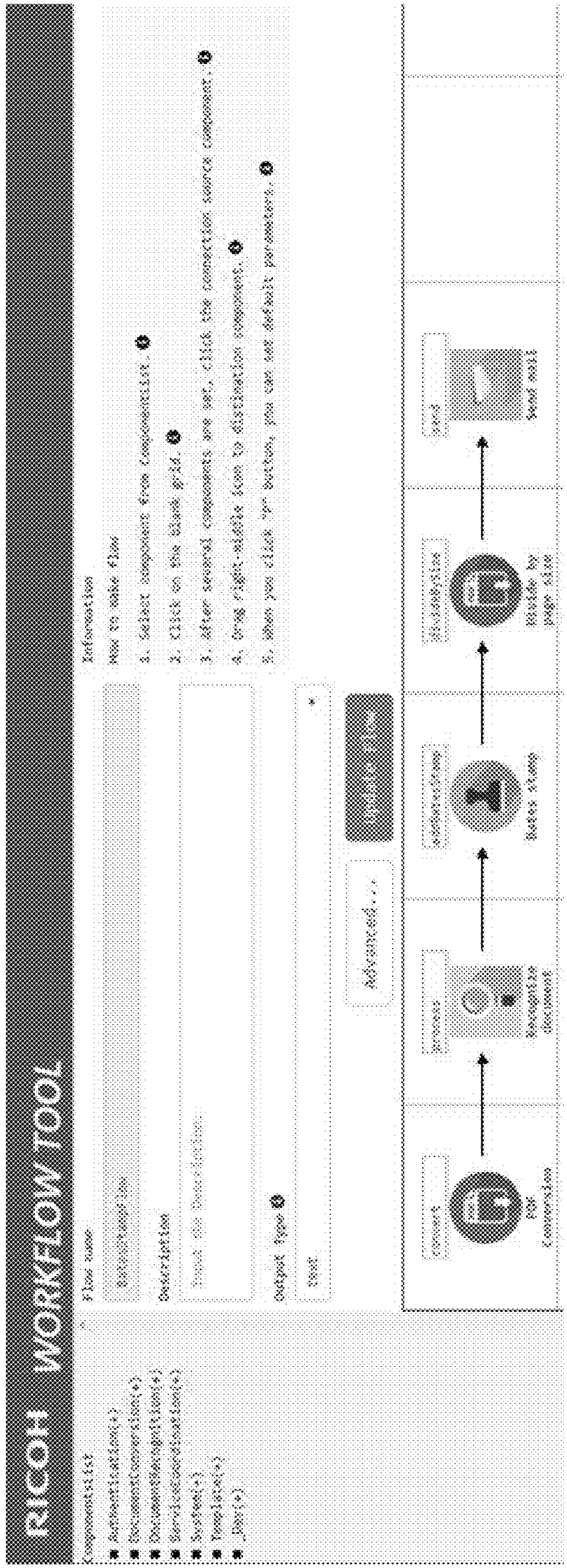
FIG. 6B is a user interface screen of a workflow tool that allows users to create workflows.

FIG. 6B is a user interface screen 620 of a workflow tool that allows users to create workflows. User interface screen depicts the current steps performed in the workflow implemented by Bates stamping application 162 using SI cloud components 170. In this example, the workflow includes converting image data to text data using PDF conversion, applying a Bates stamp to the text, dividing the text data into text portions that each satisfies a size requirement, and transmitting the text portions to one or more destinations via email. As in the prior example of FIG. 4B, user interface controls allow a user to add, remove, and reorder steps in the workflow by selecting, dragging, and dropping user interface objects that correspond to each function in the workflow. Users may also specify default parameters used by each function in the workflow.

Figure 7:
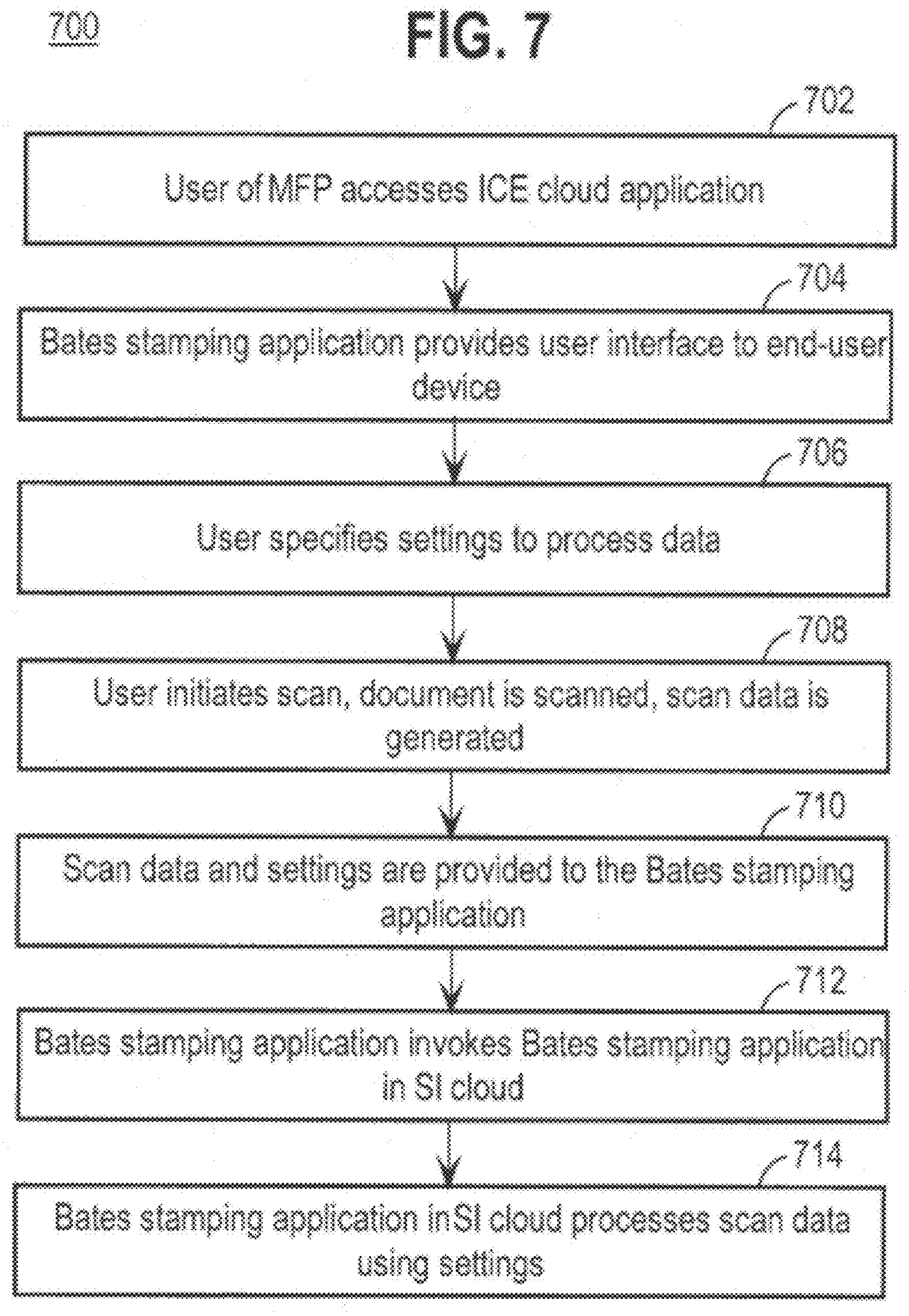
FIG. 7 is a flow diagram that depicts an approach for integrating two different cloud environments in the context of adding a Bates stamp to a document.

FIG. 7 is a flow diagram 700 that depicts an approach for integrating two different cloud environments in the context of adding a Bates stamp to a document. In step 702, a user of end-user device 110 accesses Bates stamping application 134 in ICE cloud 120 via ICE client application 112 or Web browser 114. For example, the user may initiate execution of ICE client application 112 or instruct Web browser 114 to access a URL associated with Bates stamping application 134. This may include the user identifying themselves, e.g., by selecting a user from a drop-down menu, and completing authentication as previously described herein with respect to step 502 of FIG. 5.

Figure 6C:
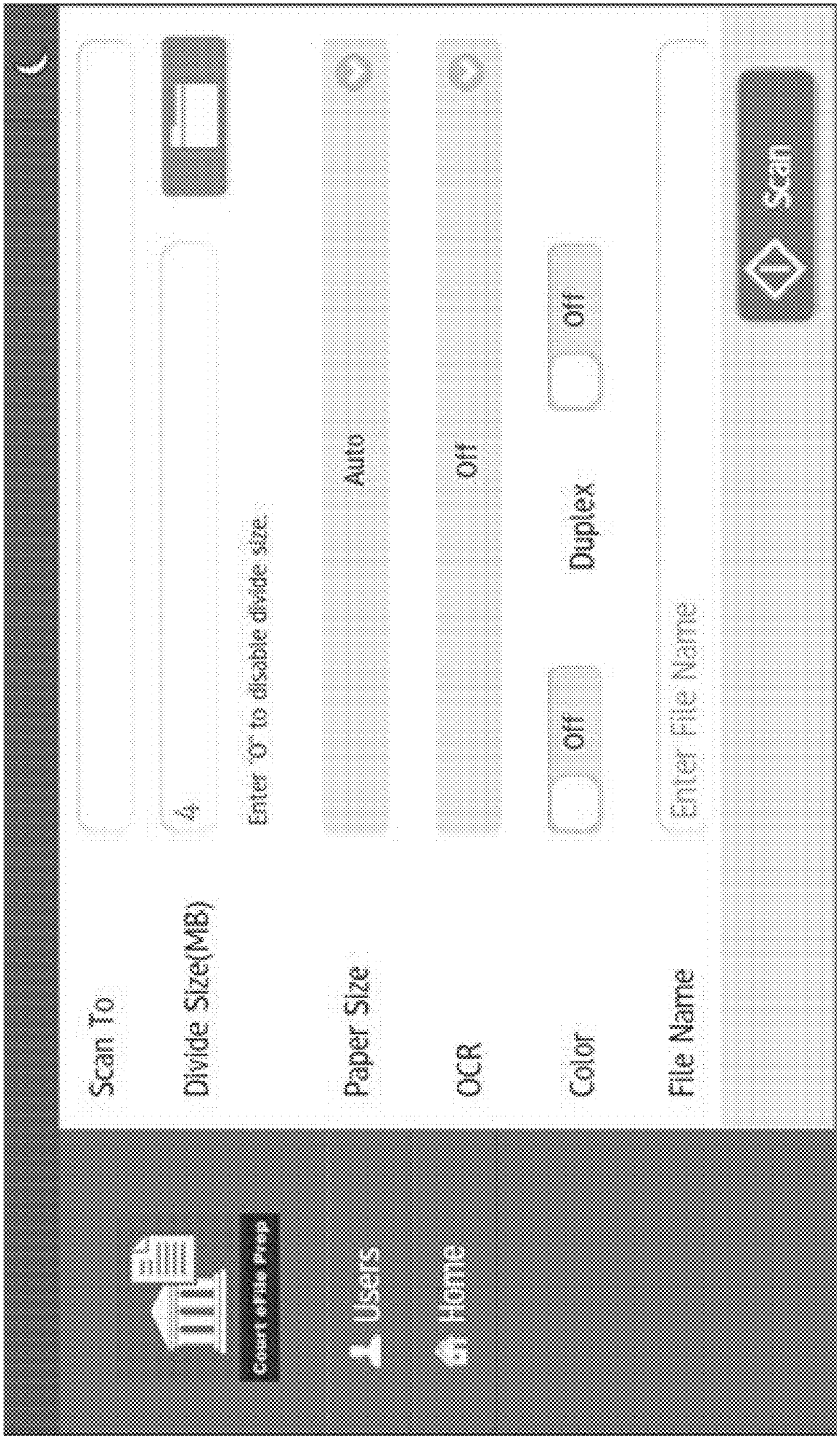
FIG. 6C depicts an example user interface screen provided by an ICE client application or a Web browser.
Figure 6D:
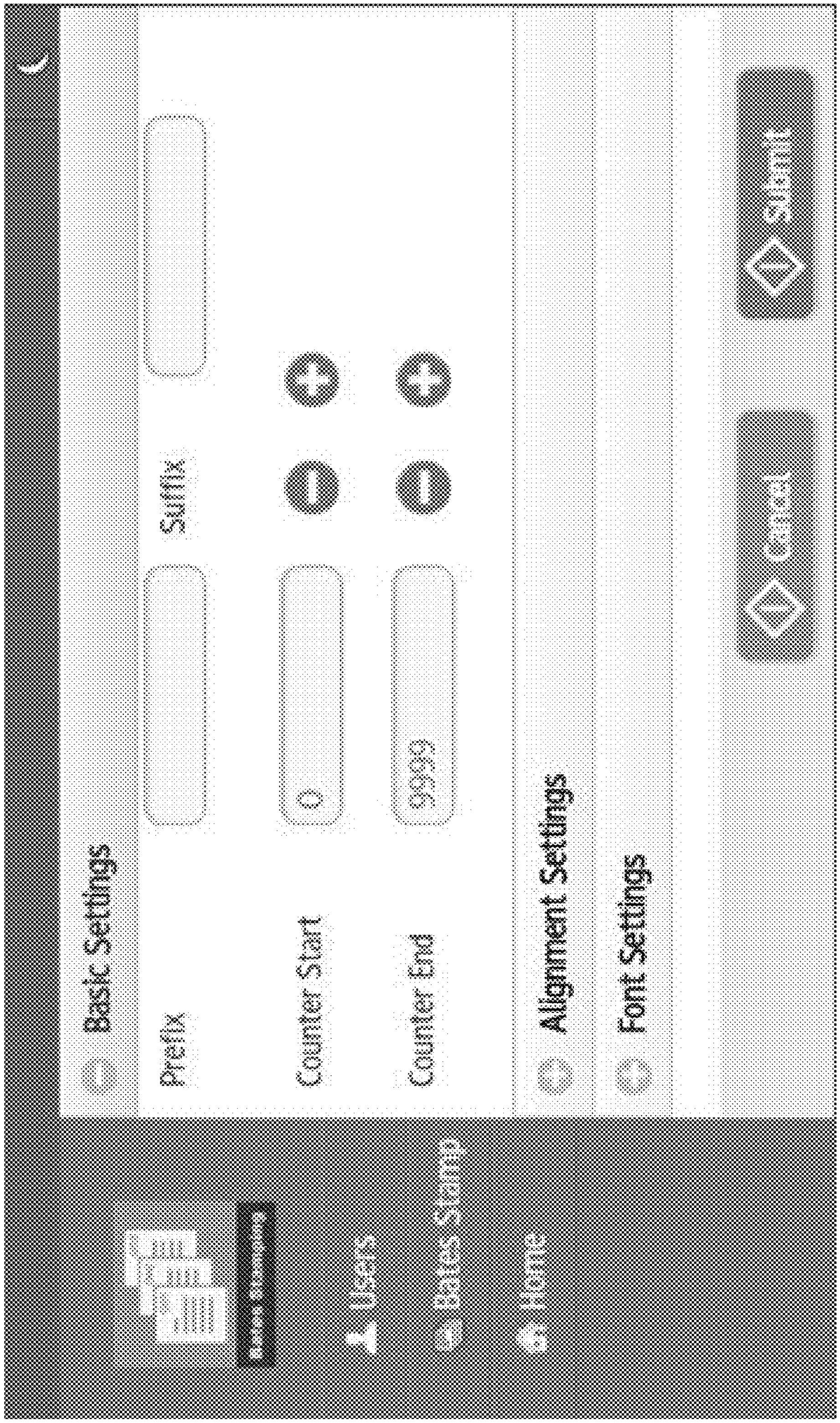
FIG. 6D depicts an example user interface screen provided by an ICE client application or a Web browser.

In step 704, Bates stamping application 134 provides a user interface, for example, via one or more Web pages. In the alternative where the user uses ICE client application 112 to access Bates stamping application 134, ICE client application 112 may provide the user interface. FIGS. 6C and 6D depict example user interface screens 620, 640, respectively, provided by ICE client application 112 or Web browser 114. User interface screen 620 allows a user to specify a destination for the end documents, for example by specifying one or more destination email addresses, a divide size that is used to limit the maximum size of each end document, a paper size, whether to enable OCR, color and duplex options, and a file name. Note that the user settings provided via user interface screen 620 are the same as the user settings provided by user interface screen 420 of FIG. 4C, which is provided by court e-filing preparation application 136. Having a common user interface across ICE cloud applications 130 provides a more favorable user experience. User interface screen 640 allows a user to specify settings that are specific to Bates stamping, including a prefix and suffix, a counter start and counter end, alignment settings to specify a location of the Bates stamp, and font settings to specify the font of the Bates stamp.

In step 706, the user specifies settings to be provided to Bates stamping application 134 and ultimately used by Bates stamping application 162 to process data. The settings may include one or more email addresses to which the final processing results are to be sent.

In step 708, the user initiates the process, for example by selecting the <Scan> button in FIG. 6C, the document is scanned, and scan data is generated. As previously described herein, embodiments are applicable to existing source data, for example, previously scanned data stored on end-user device 110, data stored at a cloud service, such as a cloud data storage service, etc.

In step 710, user identification data, the scan data and settings are provided to Bates stamping application 134. For example, ICE client application 112 may transmit a message to Bates stamping application 134 that includes the user ID, the scan data, or a link to a location where the scan data is stored, and settings data that indicates the settings selected by the user. Alternatively, Web browser 114 may provide the user ID, scan data and settings data to Bates stamping application 134.

In step 712, Bates stamping application 134 invokes Bates stamping application 162 in SI cloud 150. According to one embodiment, Bates stamping application 134 supports the API of Bates stamping application 162 and generates and transmits one or more messages to Bates stamping application 162 that conform to the API of Bates stamping application 162. The messages may include the user identification data and the settings data. The messages may be implemented, for example, by one or more Representational State (REST) calls.

In step 714, Bates stamping application 162 processes the scan data using the settings specified by the user. In the current example, this includes converting the scan data to text using optical character recognition, adding a Bates stamp to the text, and dividing the text into text portions that do not exceed a specified page limit. In the present example, Bates stamping application 162 performs final processing by transmitting the text portions to one or more email destinations specified by the settings data. A Bates stamp may be added to each text portion to identify the text portions as belonging to the same text document. Other types of final processing may be performed, depending upon a particular implementation, and embodiments are not limited to the example of emailing the final results to one or more destinations.

In the court e-filing preparation and Bates stamping examples just described, the respective ICE cloud application provides a graphical user interface for the end-user client device, i.e., end-user device 110. The ICE cloud application implements the API of, and invokes, the corresponding SI cloud application. The SI cloud application implements the APIs of, and invokes, the SI cloud components to implement the workflow of the SI cloud application. The SI cloud application receives the processing results from the last SI cloud component in the workflow and then performs any final processing, such as emailing the processing results to one or more email destinations.

ii. Using Mapping Data to Identify Tokens for Third-Party Services

In the two examples just described, the final processing includes emailing results to one or more destinations. The email addresses for the destinations may be provided by ICE cloud applications 130 to SI cloud applications 160 when ICE cloud applications 130 invoke SI cloud applications 160, e.g., via one or more REST calls. For example, the settings data included in the processing requests generated and transmitted by court e-filing preparation application 136 and Bates stamping application 134 to court e-filing preparation application 164 and Bates stamping application 162, respectively, may include the email addresses for the final processing results.

There may be situations where processing performed by an SI cloud application includes the use of third-party services 190 that require the use of tokens. For example, the final processing results generated by court e-filing preparation application 164 and Bates stamping application 162 may be provided to third-party services 190 that require the use of tokens, for example, to authenticate a user. For situations where tokens are specific to a particular domain, tokens issued to users of ICE cloud 120 may not be usable by SI cloud 150 to access third-party services 190, and vice versa. Thus, even if an ICE cloud application 130 included a token in the messages generated and transmitted to invoke a particular SI cloud application 160, e.g., via one or more REST calls, the receiving SI cloud application may not be able to use the token.

According to one embodiment, this problem is addressed using mapping data that specifies a correspondence between user IDs in ICE cloud 120 and user IDs in SI cloud 150. As described in more detail hereinafter, the provisioning of new users in arrangement 100 may include creating user IDS both ICE cloud 120 and SI cloud 150, and also establishing a correspondence between the user IDs in the mapping data.

FIG. 1D depicts mapping data 192 in the form of a table, that specifies a correspondence between ICE cloud user IDs and SI cloud user IDs. For example, after the provisioning process described in more detail hereinafter, the ICE cloud user ID "User1" is created in ICE cloud 120 and a corresponding SI cloud user ID "X1" is created in SI cloud 150. Each of these user IDs is used in their corresponding environment, i.e., ICE cloud 120 and SI cloud 150. Mapping data 192 may store additional information, depending upon a particular implementation, and mapping data 192 is not limited to the example depicted in FIG. 1D. Mapping data 192 may be generated and updated during the provisioning process and may be maintained by ICE cloud 120, SI cloud 150, another location, e.g., at a server, or any combination thereof. As one non-limiting example, mapping data 192 may be maintained as part of user, authorization, and token data 144, or 188.

Mapping data 192 allows an SI cloud application to determine a user ID in SI cloud 150 that corresponds to a user ID in ICE cloud 120 so that an appropriate token, that is valid in the SI cloud 150 domain, can be selected for third-party services 190.

For example, suppose that a user of end-user device 110 having a corresponding user ID of "User1" requests that a document be processed using Bates stamping application 134 previously described herein with respect to FIGS. 6A-6D and 7, except that instead of the final processing results being email as described, the final processing results are sent to a cloud storage service included in third-party services 190. The user ID "User1" may be provided by Bates stamping application 134 when it invoked Bates stamping application 162, for example by being included in the user settings data or otherwise specified in the REST call. Suppose further that the cloud storage service requires the use of tokens, and that the SI cloud application, which in this example, is Bates stamping application 134, cannot use ICE cloud 120 tokens. Upon completion of the regular processing and generation of the final processing results, Bates stamping application 162 uses mapping data 192 to determine that the SI cloud 150 user ID "X1" corresponds to the ICE cloud 120 user ID "User1." Bates stamping application 162 then accesses user, authorization, and token data 188 and retrieves a token for the SI cloud 150 user ID "X1" for the cloud storage service. Bates stamping application 162 then generates and transmits, to the cloud storage service, a processing request that includes the token for the cloud storage service. This approach allows an SI cloud application 160, knowing an ICE cloud 120 user ID, to determine a corresponding user ID in the SI cloud 150, and then select a token that is valid for the corresponding user ID in the SI cloud 150 and a particular third-party service.

With this integration approach, the end-user device, i.e., end-user device 110, does not have to implement the APIs of any SI cloud applications or SI cloud components. In addition, with the Web browser-based implementation discussed herein, the end-user device does not have to implement the API of the ICE cloud application. Further, the end-user device and ICE cloud application do not have to manage any access and authentication information required by third-party services 190, since this is managed by the SI cloud application. In addition, the SI cloud application manages all user information required by SI cloud components 170 and tokens required by third-party services 190.

B. Integration Type 2: Integration Managed by the ICE Cloud

As in the prior integration embodiment, the ICE cloud application acts as an intermediary between and end-user device, such as an MFP, and multiple SI cloud applications. Unlike the first integration approach described above however, in which once the ICE cloud application invokes an SI cloud application, any subsequent processing is handled by the SI cloud application, according to this integration approach, the ICE cloud application manages multiple SI cloud applications and any processing by third-party services.

The ICE cloud application both provides a user interface that allows a user to specify settings needed by the SI cloud applications to process data, and implements the APIs of the SI cloud applications. The ICE cloud application provides the data and the user-specified settings to the SI cloud applications. The SI cloud applications process the data using the user-specified settings and, to the extent that the SI cloud applications use SI cloud components, the SI cloud applications implement the APIs of the SI cloud components and handle all interactions with the SI cloud components on behalf of the ICE cloud application and the end-user devices. The ICE cloud application may use multiple SI cloud applications and interact with each SI cloud applications individually. This includes receiving the processing results as an output from one SI cloud application and providing the processing results as an input to another SI cloud application. The ICE cloud application also manages access and authentication information required by the third-party services. This may include, for example, tokens required by third-party services 190. Maintaining access and authentication information required by third-party services in ICE cloud 120 avoids having to modify SI cloud 150 to support third-party services.

Figure 8A:
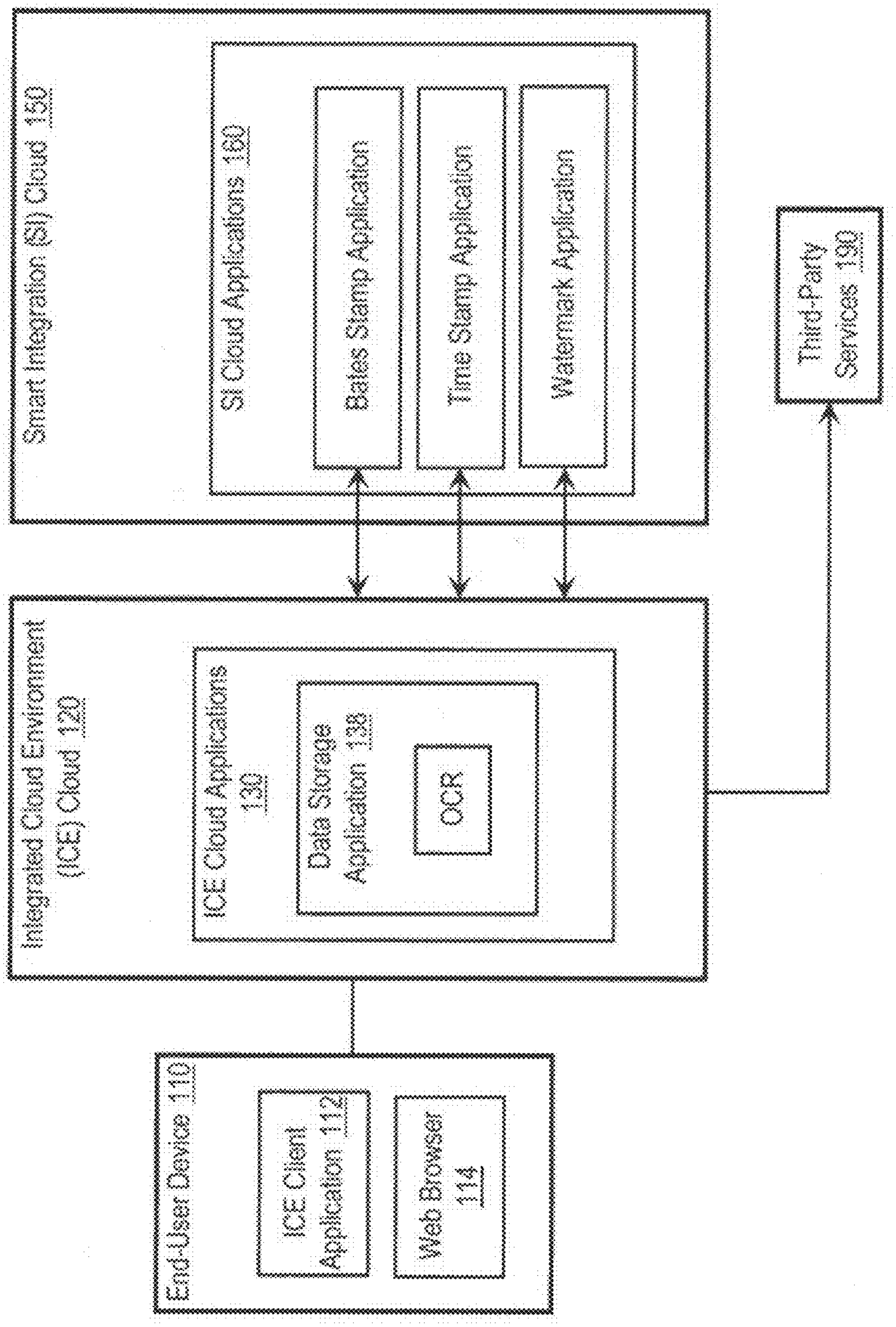
FIG. 8A is a block diagram that depicts an arrangement for integrating two different cloud environments according to an embodiment.

FIG. 8A is a block diagram that depicts an arrangement 800 for integrating two different cloud environments according to an embodiment. Some of the elements of FIG. 1A are not depicted in FIG. 8A for purposes of explanation only.

In the arrangement 800 of FIG. 8A, the ICE cloud application is a data storage application 138 that optionally converts image data to text using optical character recognition, applies three different types of stamps/marks to the data, and then stores the stamped/marked data at a third-party cloud storage service. In this example, the three different types of stamps/marks include a Bates stamp, a time stamp, and a watermark, are implemented by three separate SI cloud applications 160 that include a Bates stamp application, a time stamp application, and a watermark application and represent three different workflows. A Bates stamp is added to the data, followed by a time stamp, and finally a watermark. Thus, the Bates stamp application, the time stamp application, and the watermark application each implement a portion of the workflow of data storage application 138. Data storage application 138 implements the APIs of the Bates stamp application, the time stamp application, and the watermark application, and separately invokes each of the applications to process the data. After receiving the processing results from the watermark application, data storage application 138 provides the results to third-party services 190.

Data storage application 138 provides a user interface to a user of end-user device 110 and handles all of the interactions with SI cloud 150 and third-party services 190. Data storage application 138 optionally processes the image data received from end-user device 110 using an internal OCR component to convert the image data to text data. Embodiments are not limited to this example, however, and data storage application 138 may invoke OCR functionality elsewhere, for example, via an OCR application in SI cloud applications 160. Data storage application 138 provides the results received from the watermark application to one or more third-party services 190. In the present example, the third-party services 190 include a cloud storage service, such as Box, Dropbox, Google Drive, Apple iCloud Drive, Microsoft OneDrive, etc., and the resulting data that includes the stamp is stored at the cloud storage service.

Figure 8B:
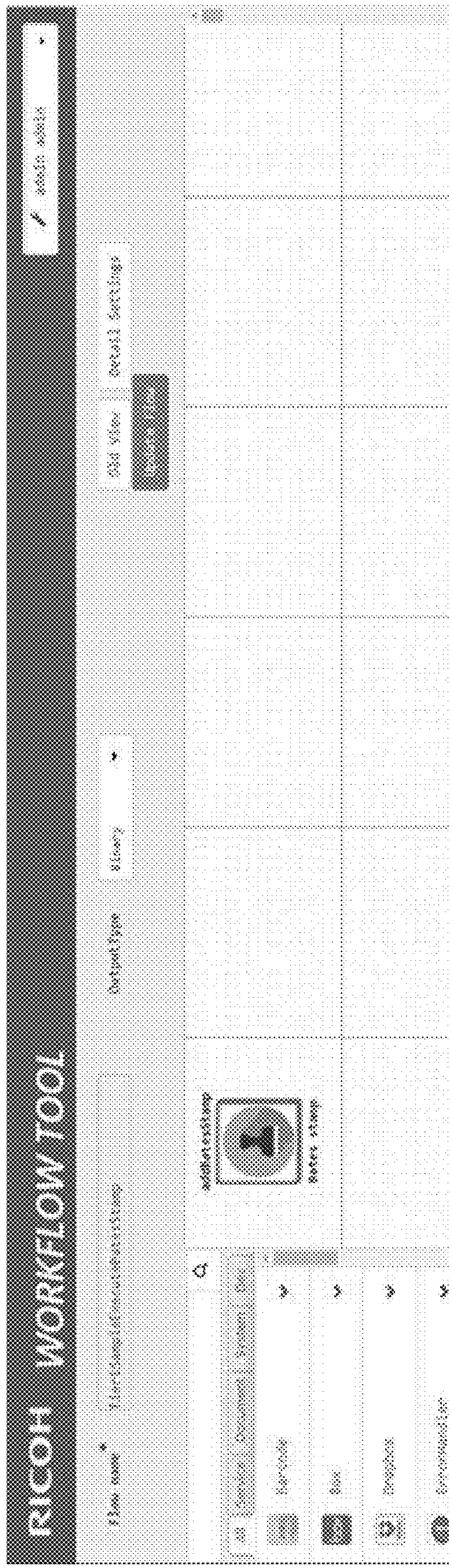
FIG. 8B is a block diagram that depicts a Bates stamping workflow.
Figure 8C:
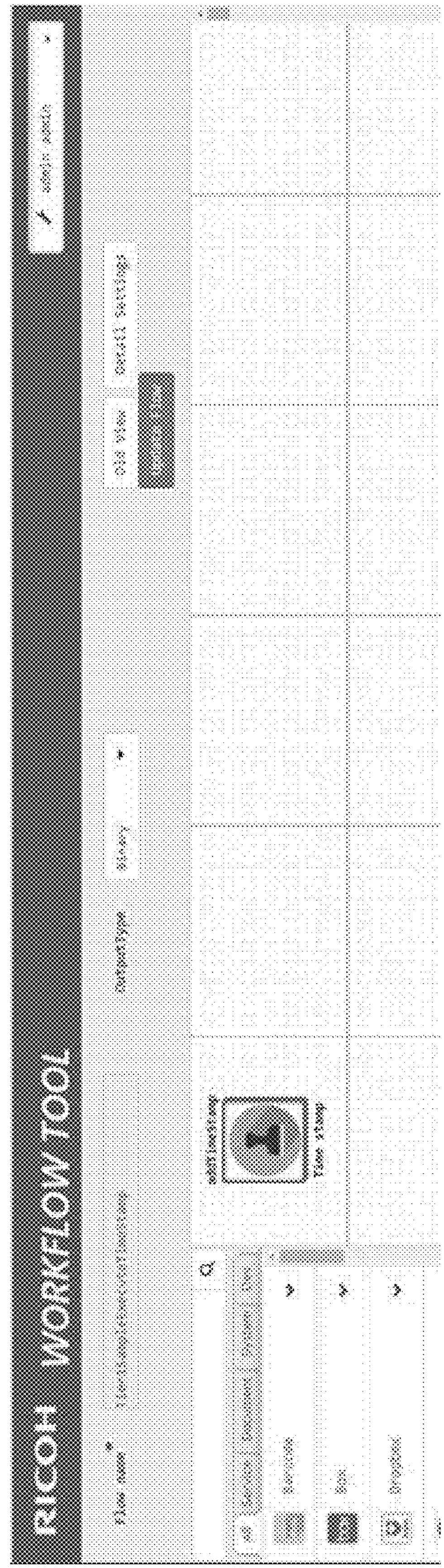
FIG. 8C is a block diagram that depicts a time stamping workflow.
Figure 8D:
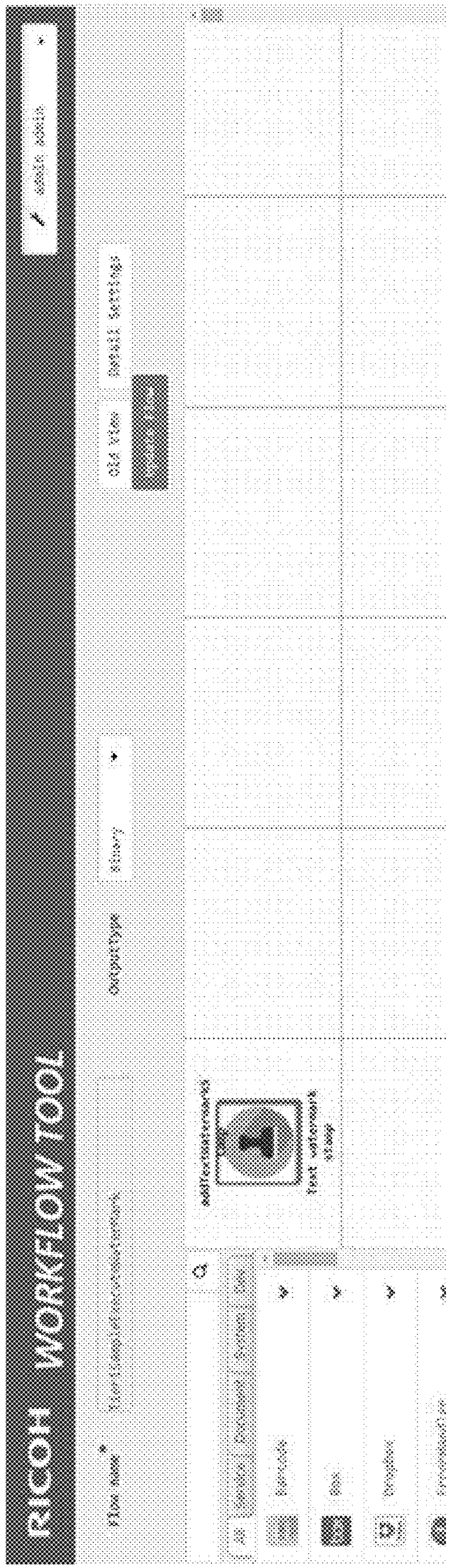
FIG. 8D is a block diagram that depicts a watermarking workflow.

FIGS. 8B-8D are a block diagrams that depict three different stamping/marking workflows that include Bates stamping, time stamping, and watermarking, performed by the Bates stamp application, the time stamp application, and the watermark application, respectively.

Figure 9:
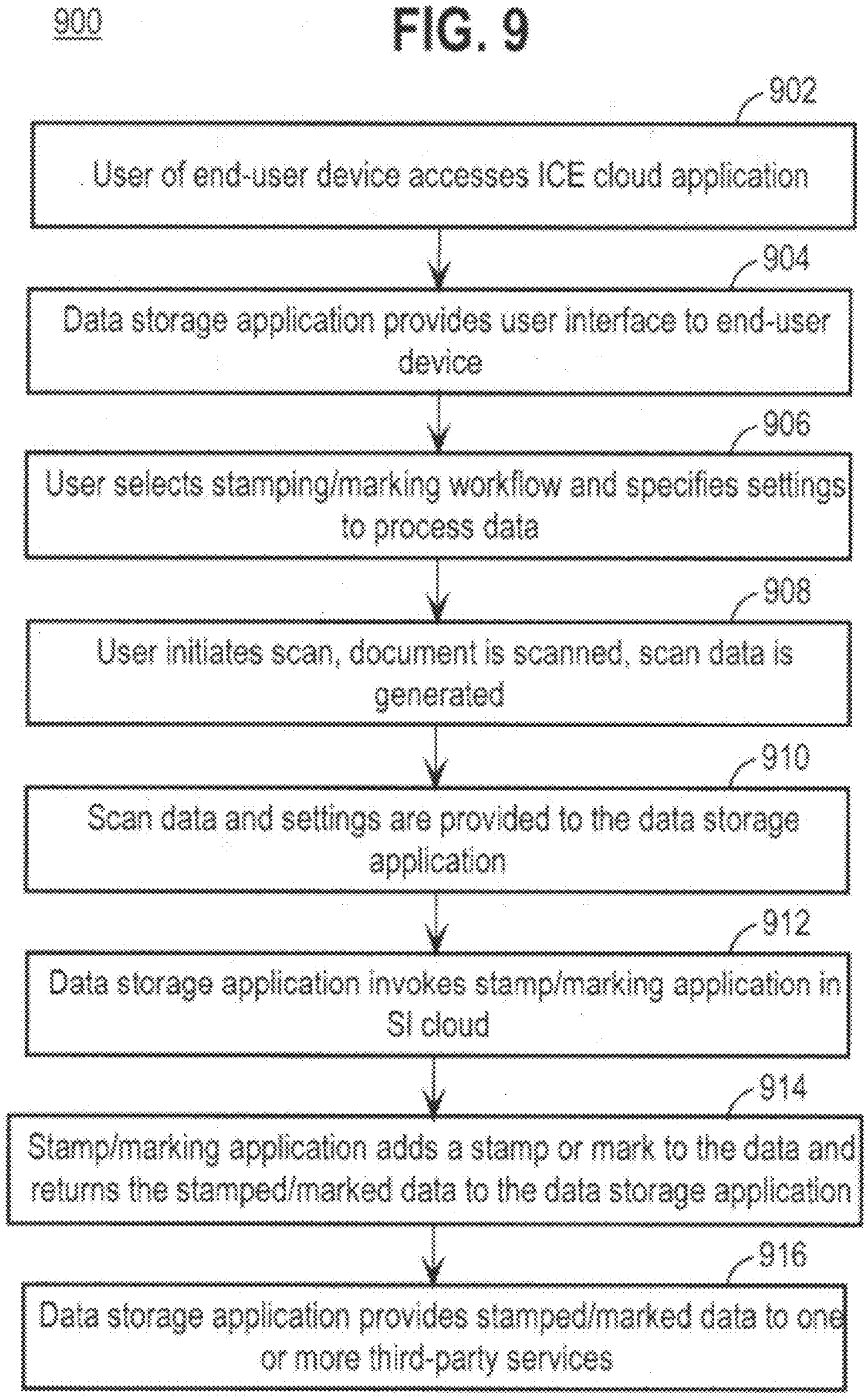
FIG. 9 is a flow diagram that depicts an approach for integrating two different cloud environments in the context of applying a mark to data, and then storing the marked data in cloud storage.

FIG. 9 is a flow diagram 900 that depicts an approach for integrating two different cloud environments in the context of applying a mark to data, and then storing the marked data in cloud storage. In step 902, a user of end-user device 110 accesses data storage application 138 in ICE cloud 120 via ICE client application 112 or Web browser 114, as previously described herein. As in prior examples, this may include the user identifying themselves, e.g., by selecting a user from a drop-down menu, completing authentication, for example, by scanning an identification card via a scanner associated with end-user device 110, entering user credentials, such as a user ID and password, etc. Verification of user credentials may be done locally on end-user device 110, or may involve remote services, such as a user verification service, ICE cloud manager 122, an ICE cloud application 130, etc.

Figure 8E:
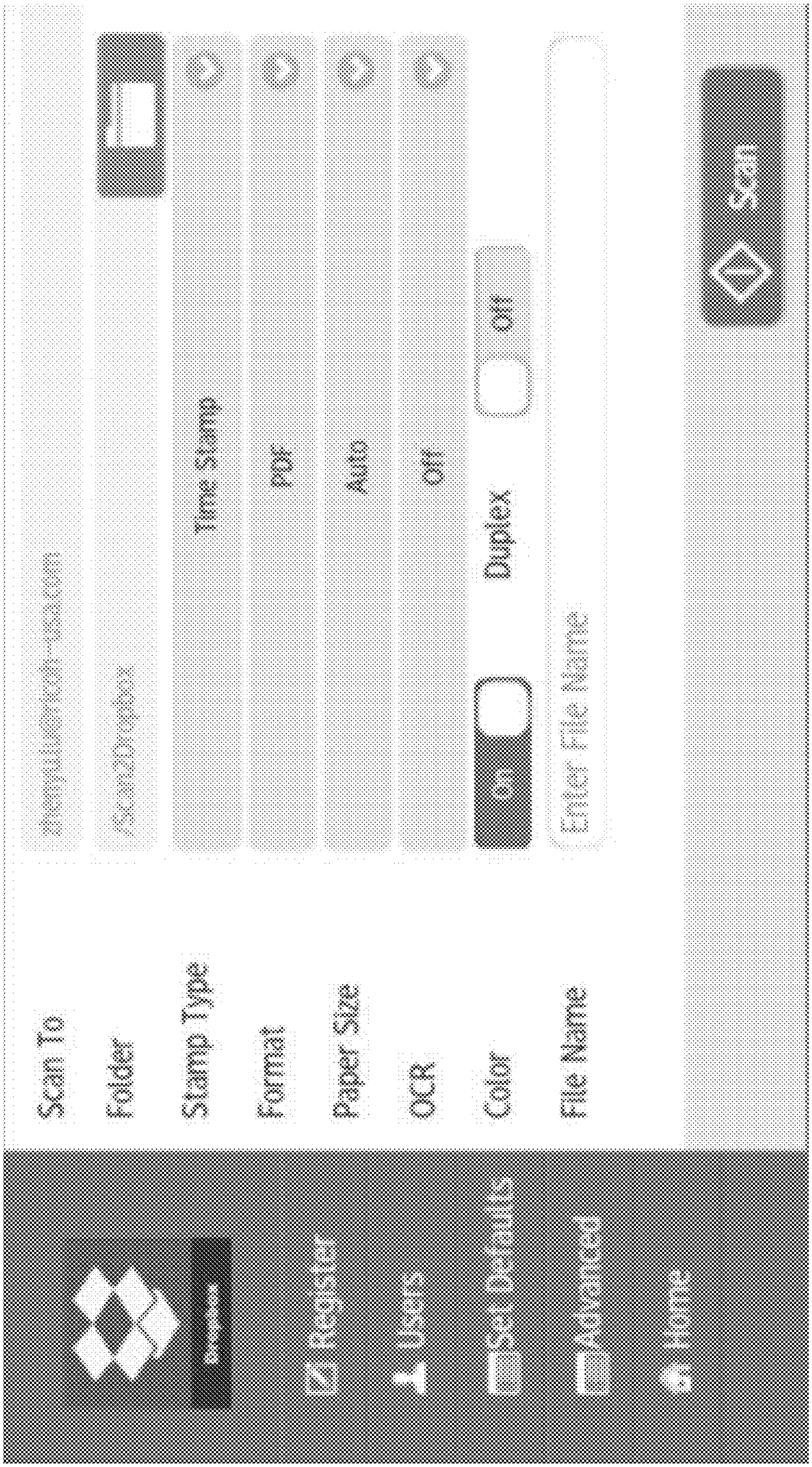
FIG. 8E depicts a user interface screen that allows a user to specify a destination for the end documents, a stamp type, an output format, a paper size, whether to enable OCR, color and duplex options, and a file name.
Figure 8F:
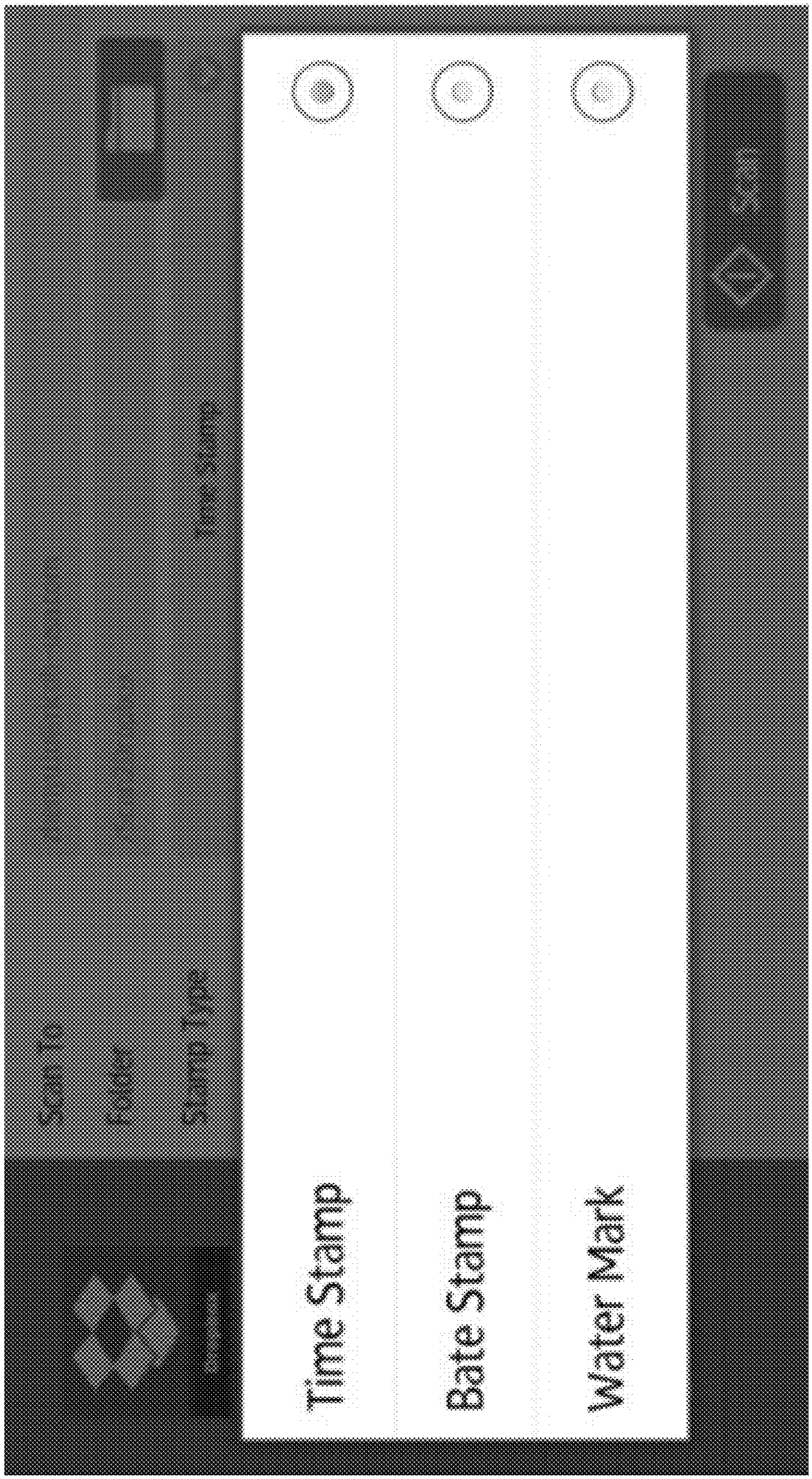
FIG. 8F depicts a user interface screen that allows a user to specify the type of stamping to be added to the data.
Figure 8G:
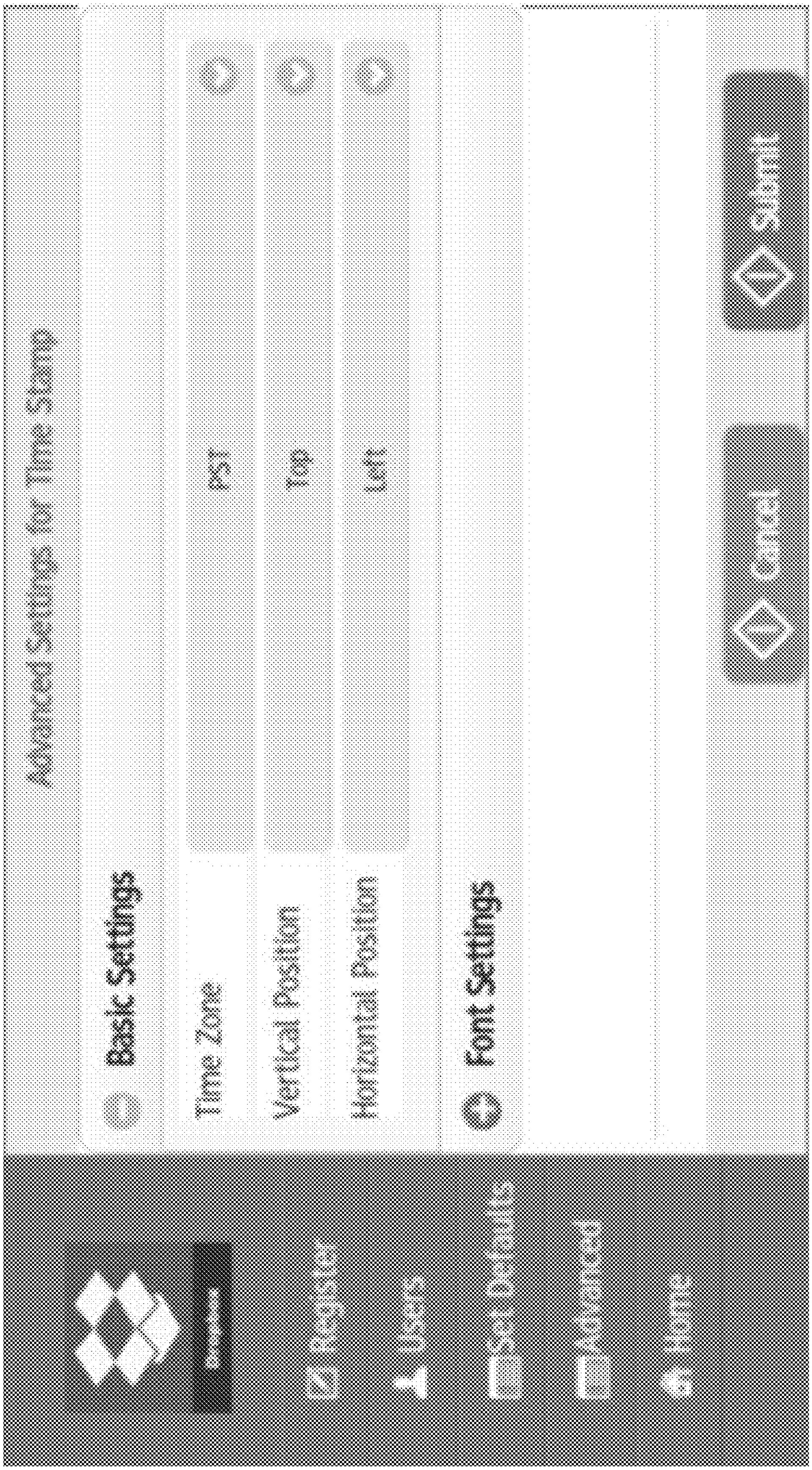
FIG. 8G depicts a user interface screen that allows a user to specify advanced time stamp settings including a time zone, vertical and horizontal positions, and font settings.
Figure 8H:
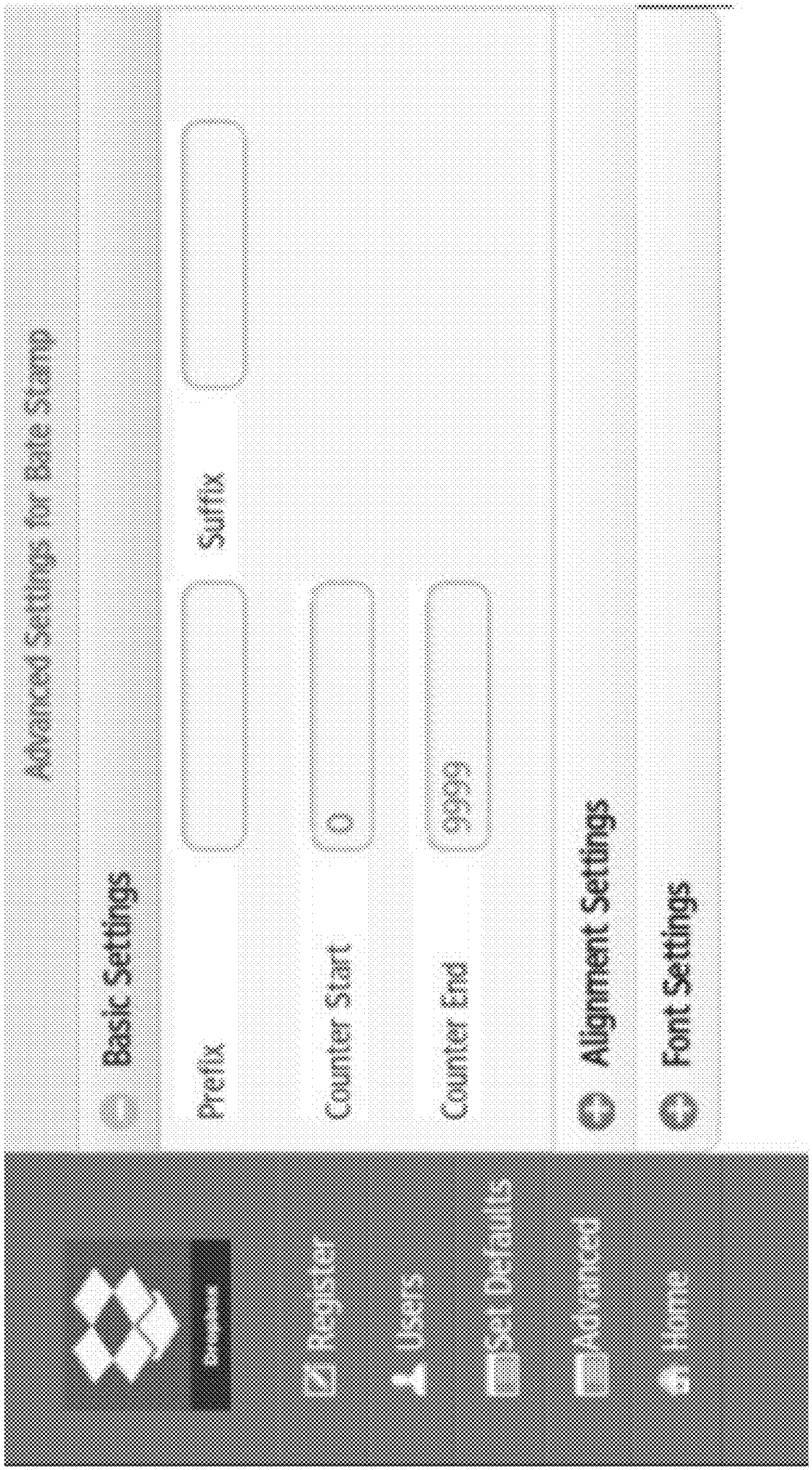
FIG. 8H depicts a user interface screen that allows a user to specify advanced Bates stamp settings.
Figure 8I:
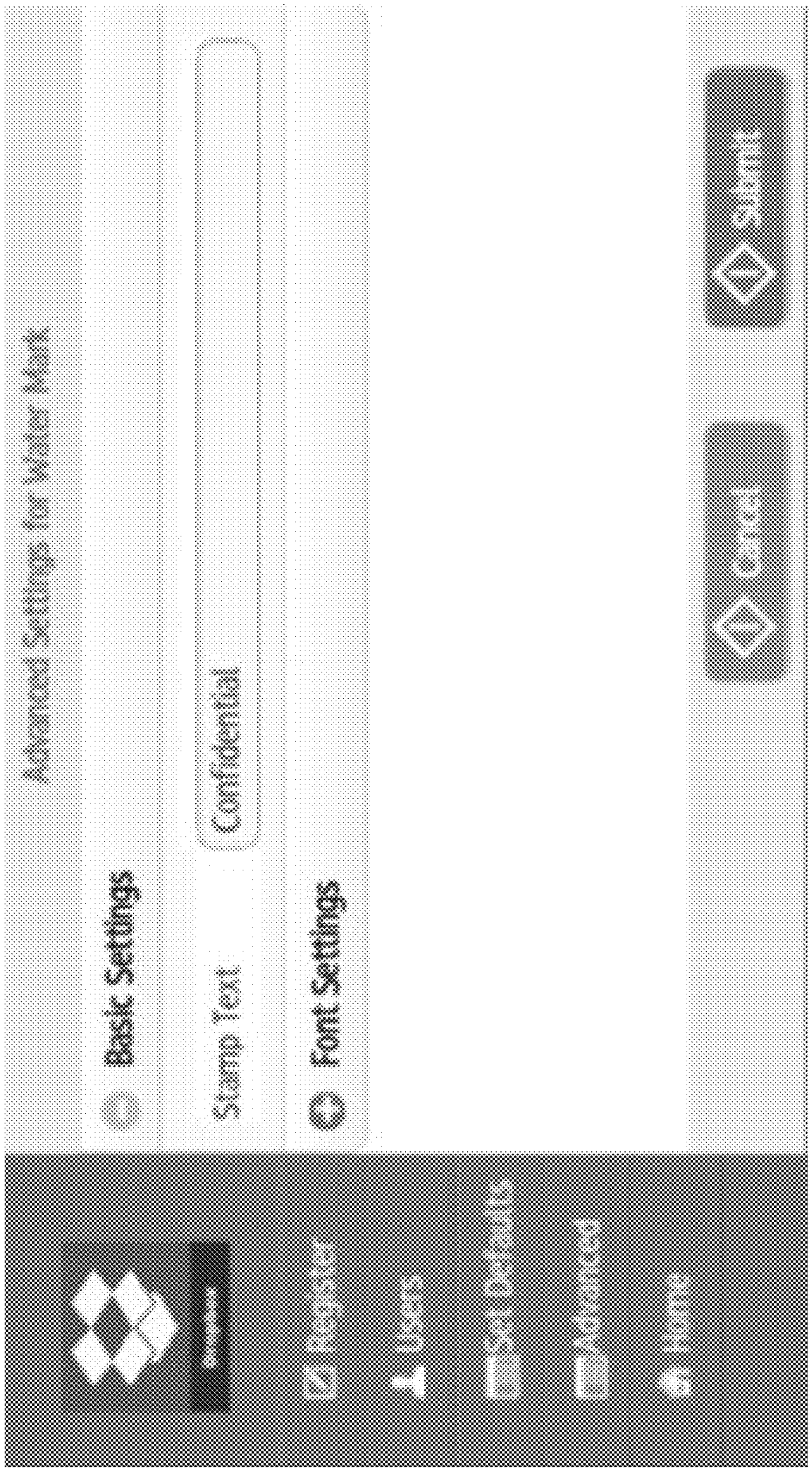
FIG. 8I depicts a user interface screen that allows a user to specify advanced watermark settings.

In step 904, data storage application 138 provides a user interface as previously described herein. FIGS. 8E-8I depict example user interface screens provided by ICE client application 112 or Web browser 114 for specifying user settings pertaining to the service provided by data storage application 138. FIG. 8E depicts a user interface screen that allows a user to specify a destination for the end documents, a stamp type, an output format, a paper size, whether to enable OCR, color and duplex options, and a file name. FIG. 8F depicts a user interface screen that allows a user to specify the type of stamping to be added to the data. The available choices are a time stamp, a Bates stamp and a watermark, although embodiments are not limited to these examples and other types of stamps/marks may be used. In addition, multiple stamps and marks may be selected. FIG. 8G depicts a user interface screen that allows a user to specify advanced time stamp settings including a time zone, vertical and horizontal positions, and font settings. FIG. 8H depicts a user interface screen that allows a user to specify advanced Bates stamp settings. FIG. 8I depicts a user interface screen that allows a user to specify advanced watermark settings.

In step 906, the user selects a particular stamping/marking workflow and specifies settings to be provided to data storage application 138 and ultimately used by data storage application 138, and SI cloud applications 160, to process data.

In step 908, the user initiates processing by data storage application 138, for example by selecting the <Scan> button in FIG. 8E. In response to the user selection of the <Scan> button, the document is scanned, and scan data is generated.

In step 910, the user ID, scan data and settings are provided to data storage application 138. For example, ICE client application 112 may transmit a message to data storage application 138 that includes the scan data, or a link to a location where the scan data is stored, and settings data that indicates the settings selected by the user. Alternatively, Web browser 114 may provide the scan data and settings data to data storage application 138.

In step 912, data storage application 138 invokes a stamping or marking application in SI cloud 150 based upon the settings specified by the user. This may include, for example, the Bates stamp application, the time stamp application and/or the watermark application depicted in FIG. 8A. Data storage application 138 generates and transmits to one of these applications a request to add a corresponding stamp or watermark to data specified in the request. The request may include the data or a link to the data. The request may be implemented, for example, by one or more REST calls.

In step 914, the SI cloud application, e.g., the Bates stamp application, the time stamp application and/or the watermark application adds a stamp or mark to the data, and returns the stamped/marked data back to data storage application 138.

Steps 912 and 914 may be repeated several times for any number of stamping/marking applications. In the present example, data storage application 138 first uses Bates stamp application to add a Bates stamp to the data. This may include data storage application 138 generating and transmitting, to the Bates stamp application, a request to add a Bates stamp to the data. The request conforms to an API of the Bates stamp application and includes settings data that specifies the user settings for the Bates stamp, such as the user settings depicted in FIG. 8H. The Bates stamp application processes the request and adds a Bates stamp to the data. The Bates stamp application then returns the processed data to data storage application 138.

Data storage application 138 receives results from the Bates stamp application and generates and transmits, to the time stamp application, a request to add a time stamp to the data. The request conforms to an API of the time stamp application and includes settings data that specifies the user settings for the time stamp, such as the user settings depicted in FIG. 8G. The APIs may be different from application to application, and data storage application 138 handles preparing requests that satisfy the API of each application used, which may include formatting data into a different format required by the next application to be used. The time stamp application processes the request and adds a time stamp to the data. The time stamp application then returns the data to data storage application 138.

After receiving the processed data from the time stamp application, in step 916, data storage application 138 provides the stamped/marked data to one or more third-party services 190 for processing. For example, data storage application 138 may provide the stamped/marked data to a cloud storage service. This may be useful to fulfill a requirement to maintain the integrity of stored data. This may include data storage application 138 generating and transmitting one or more requests that comply with the APIs of third-party services 190. According to one embodiment, data storage application 138 manages any access and authentication information required by third-party services 190. This may include, for example, tokens, such as access and refresh tokens, required the use third-party services 190. For example, data storage application 138 uses the user ID to retrieve a valid token from user, authorization, and token data 144, and provide the token to the cloud storage service.

Thus, with this integration approach, the end-user device, i.e., end-user device 110, does not have to implement the APIs of any SI cloud applications or SI cloud components. In addition, with the Web browser-based implementation discussed herein, the end-user device does not have to implement the API of data storage application 138. The end-user device does not have to manage any access and authentication information required by third-party services 190, since this is managed by data storage application 138.

C. Integration Type 3: Integration Managed by the ICE Cloud With Conflict Checking In the Integration Type 2 approach previously described herein, the ICE cloud application interacts directly with each SI cloud application and receives the processing results from each SI cloud application at each step of the workflow. The ICE cloud application is therefore able to evaluate the processing results of each step in the workflow after it is performed before performing a subsequent step in the workflow. This allows the ICE cloud application to itself perform any processing necessary to prepare the processing results received from one SI cloud application to be used as an input to another SI cloud application. Since each SI cloud application generally performs a simple workflow with only one or two steps, the ICE cloud application is able to properly manage the data at each step in the workflow to avoid conflicts.

In some situations, however, the workflows, or portions of workflows, implemented by certain SI cloud applications are more complex, involving multiple steps. For example, as described in more detail hereinafter, a particular SI cloud application may apply more than one stamp or mark to data received from an end-user device and the stamps or marks may be positioned so that they at least partially overlap, obscuring some or all of the information provided by the stamp or mark. One example is a watermark applied over a Bates stamp that obscures a portion of the Bates number.

Figure 10A:
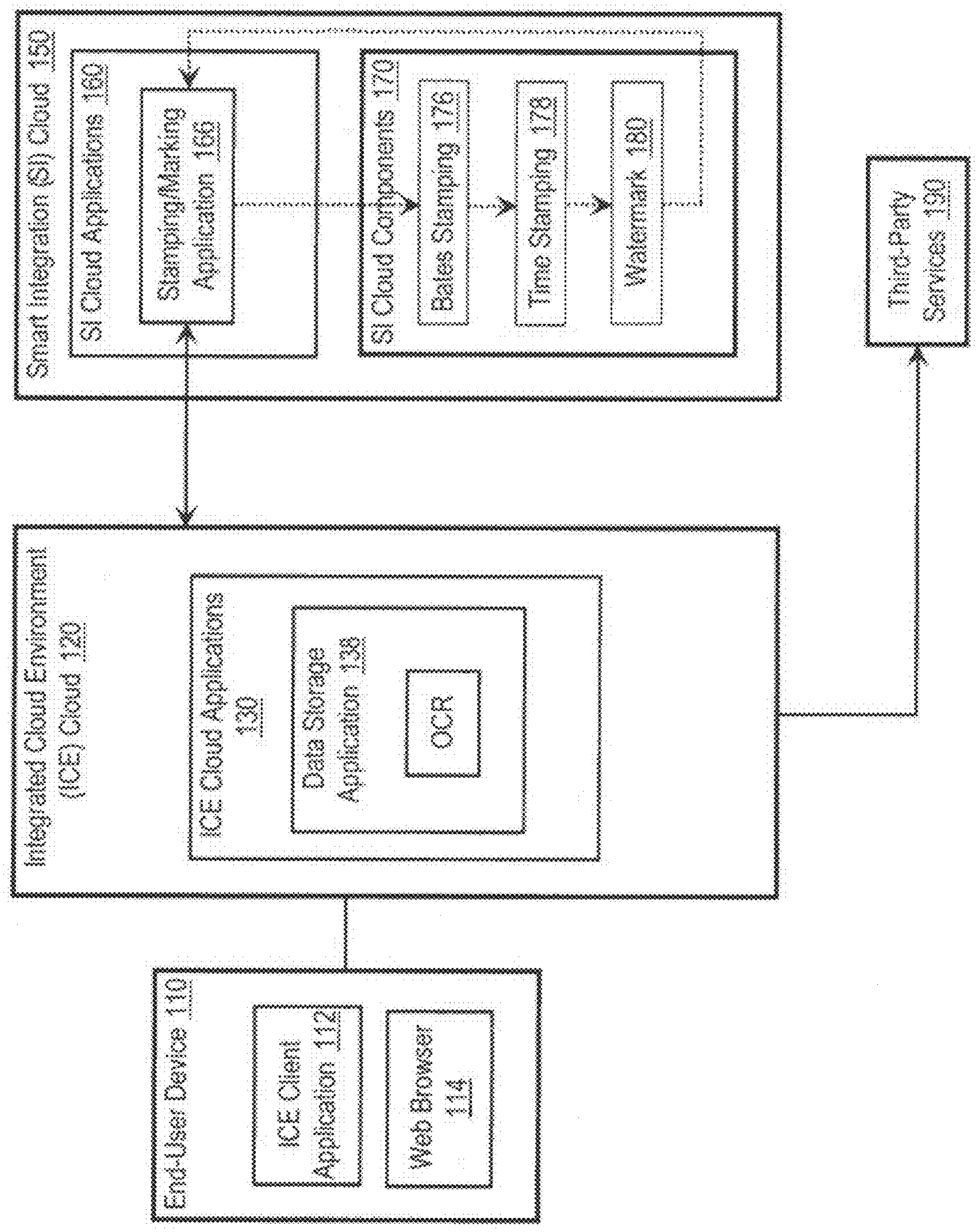
FIG. 10A is a block diagram that depicts an arrangement for integrating two different cloud environments using conflict checking, according to an embodiment.
Figure 10B:
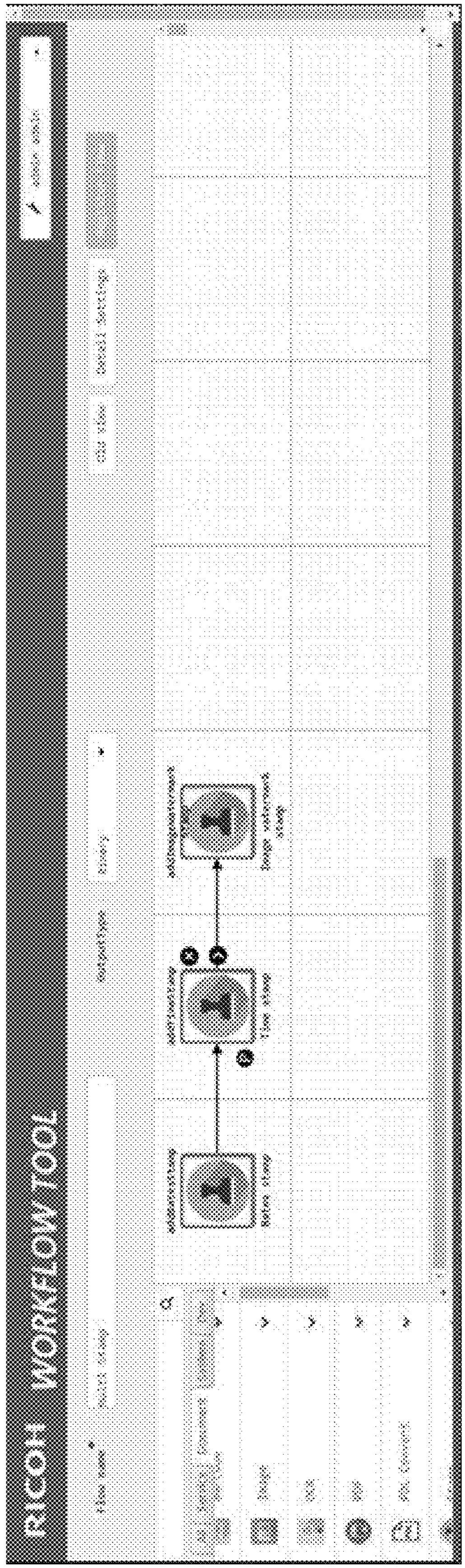
FIG. 10B is a block diagram that depicts a stamping/marking workflow implemented by a stamping/marking application.

According to another embodiment for integrating the SI cloud and the ICE cloud, conflict checking is performed to avoid potential conflicts in more complex SI cloud applications that use multiple SI cloud components to implement a workflow. FIG. 10A is a block diagram that depicts an arrangement 1000 for integrating two different cloud environments using conflict checking, according to an embodiment. Some of the elements of FIG. 1A are not depicted in FIG. 10A for purposes of explanation only. The approach depicted in FIG. 10A is similar to the approach depicted in FIG. 8A, in that data storage application 138 causes that data received from end-user device 110 to be processed by Bates stamping, time stamping, and watermarking. Instead, however, of invoking three separate SI cloud applications 160 to perform the stamping and marking, data storage application 138 invokes a single SI cloud application 160, namely, stamping/marking application 166, to perform the stamping and marking. FIG. 10B is a block diagram that depicts a stamping/marking workflow implemented by stamping/marking application 166. The stamping/marking workflow includes Bates stamping, time stamping, and watermarking. As depicted in FIG. 10A, the stamping/marking is performed by three SI cloud components 170, namely, Bates stamping 176 component, time stamping 178 component, and watermark 180 component, which are each invoked by stamping/marking application 166. Data storage application 138 receives the final results of the processing performed by stamping/marking application 166, and directly manages subsequent processing by third-party services 190.

According to one embodiment, to address potential conflicts, conflict checking is performed to avoid potential conflicts with processing performed by SI cloud 150. Conflict checking may be implemented in different ways that may vary depending upon a particular implementation. According to one embodiment, conflict checking is performed on the user settings specified by the user of end-user device 110. This may include, for example, analyzing the settings specified by the user of end-user device 110 to determine whether any type of data being added to document data will at least partially overlap. The data may include any type of data and embodiments are not limited to any type of data for conflict checks. Examples of data include, without limitation, text data, stamps, e.g., timestamps, Bates stamps, other stamps, etc., marks, e.g., watermarks, etc., codes, e.g., barcodes, QR codes, signatures, etc., and image data. For example, data storage application 138 may determine whether the locations of two data items being added satisfy a distance criterion. The distance criteria may specify a minimum distance between data items to ensure no overlap between the stamps or marks. A conflict exists when the difference between the locations of two data items is less than the distance criterion. The distance criterion may vary depending upon the types and/or sizes of the data items. For example, certain types of data items, such as stamps or marks, may be required to be at least a specified distance apart. As another example, certain types of data items, such as stamps or marks, may be required to be in separate areas of a document, e.g., on opposite sides or corners of a document. For example, if a user selects to apply both a Bates stamp and a watermark to a document, the Bates stamp and watermark may be required to be located at opposite corners of the document.

Conflict checking may be performed by the ICE application, e.g., data storage application 138, after the settings data is received from end-user device 110, but before data storage application 138 invokes stamping/marking application 166. In response to identifying a conflict, data storage application 138 may perform different actions. Data storage application 138 may itself resolve a detected conflict, for example, by changing the location of a stamp or mark. For example, suppose that two marks are designated for the upper right-hand corner of a document and would overlap. Data storage application 138 may change the location of one of the marks to the lower left hand corner of the document so that the two marks do not overlap. Data storage application 138 may generate and transmit one or more messages that are displayed on the user interface displayed at end-user device 110. The message may identify the conflict and query the user to resolve the conflict, for example, by changing the location of a stamp or mark. After the user changes the settings, revised settings data is transmitted to data storage application 138 and retested for conflicts. This process may be repeated until all conflicts have been resolved.

Conflict checking may also be performed at end-user device 110 by the user interface supplied by data storage application 138. For example, the user interface provided by data storage application 138 to end-user device 110 may include logic that performs conflict checking. In the context of a Web-based user interface, the logic may be implemented, for example, by one or more scripts.

Figure 11:
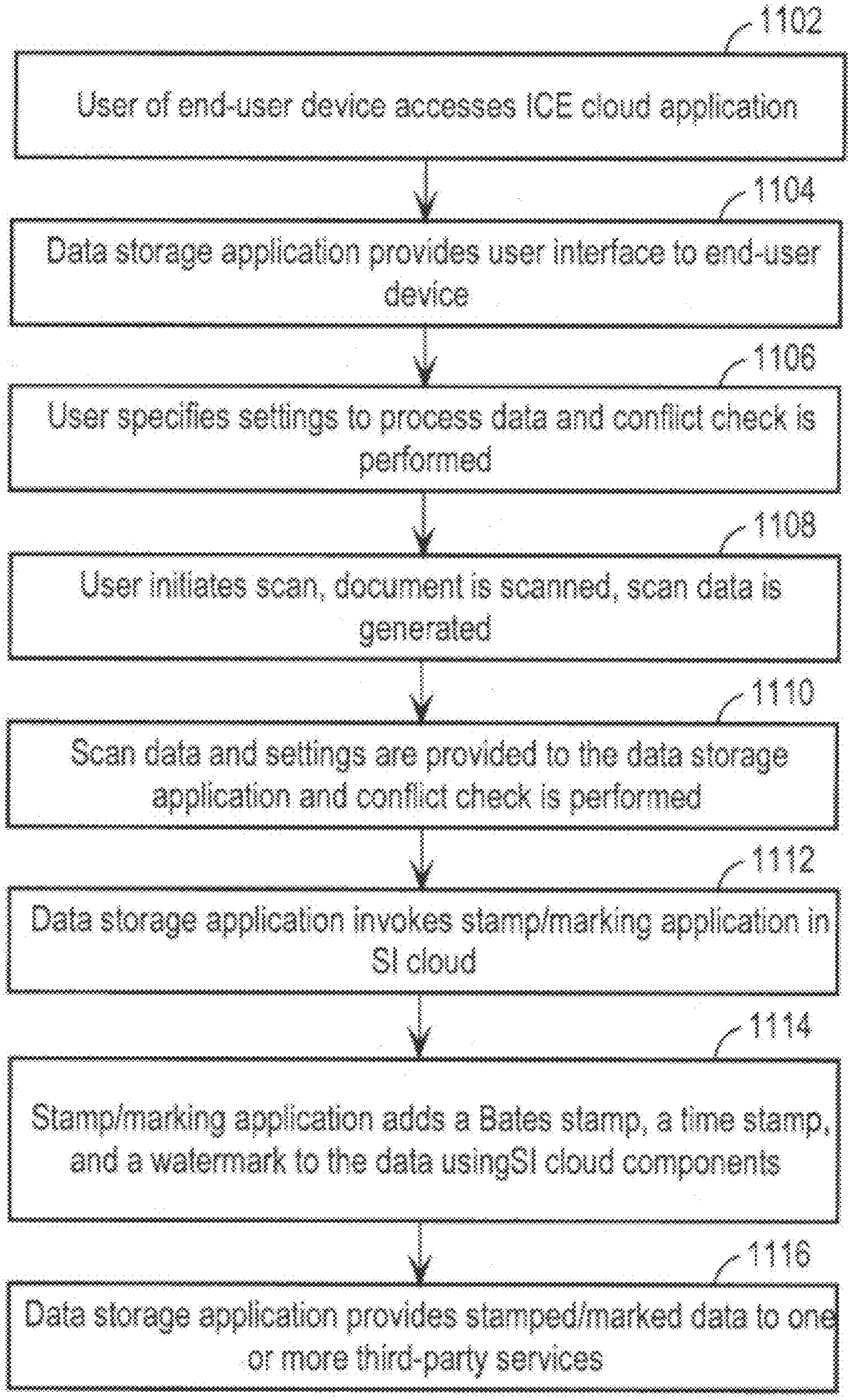
FIG. 11 is a flow diagram that depicts an approach for integrating two different cloud environments in the context of applying a mark to data, and then storing the marked data in cloud storage.

FIG. 11 is a flow diagram 1100 that depicts an approach for integrating two different cloud environments using conflict checking. The approach depicted by flow diagram 1100 is in the context of applying a mark to data, and then storing the marked data in cloud storage. In step 1102, a user of end-user device 110 accesses data storage application 138 in ICE cloud 120 via ICE client application 112 or Web browser 114, as previously described herein. This may include the user identifying themselves, e.g., by selecting a user from a drop-down menu, completing authentication, for example, by scanning an identification card via a scanner associated with end-user device 110, entering user credentials, such as a user ID and password, etc. Verification of user credentials may be done locally on end-user device 110, or may involve remote services, such as a user verification service, ICE cloud manager 122, an ICE cloud application 130, etc.

In step 1104, data storage application 138 provides a user interface as previously described herein. FIGS. 8E-8I depict example user interface screens provided by ICE client application 112 or Web browser 114 for specifying user settings pertaining to the service provided by data storage application 138. The user interface screen of FIG. 8E allows a user to specify a destination for the end documents, a stamp type, an output format, a paper size, whether to enable OCR, color and duplex options, and a file name. The user interface of FIG. 8F allows a user to specify the type of stamping to be added to the data. The available choices are a time stamp, a Bates stamp and a watermark, although embodiments are not limited to these examples and other types of stamps/marks may be used. In addition, multiple stamps and marks may be selected. The user interface of FIG. 8G allows a user to specify advanced time stamp settings including a time zone, vertical and horizontal positions, and font settings. The user interface of FIG. 8H allows a user to specify advanced Bates stamp settings. The user interface of FIG. 8I allows a user to specify advanced watermark settings.

In step 1106, the user specifies settings to be provided to data storage application 138 and ultimately used by data storage application 138, and SI cloud applications 160, to process data. After the user has specified settings, conflict checking may be performed on the user-specified settings by the user interface. For example, logic implemented in the user interface provided to end-user device 110 may analyze the settings data to detect any conflicts. If a conflict is detected, the user interface notifies the user and asks the user to resolve the conflicts. Alternatively, conflict checking may be performed in step 1110 by data storage application 138.

In step 1108, once any conflicts have been resolved, the user initiates processing by data storage application 138, for example by selecting the <Scan> button in FIG. 8E. In response to the user selection of the <Scan> button, the document is scanned, and scan data is generated.

In step 1110, user identification data, the scan data and settings are provided to data storage application 138. For example, ICE client application 112 may transmit a message to data storage application 138 that includes the scan data, or a link to a location where the scan data is stored, and settings data that indicates the settings selected by the user. Alternatively, Web browser 114 may provide the scan data and settings data to data storage application 138. Data storage application 138 may optionally perform conflict checking based upon the user settings as previously described herein, if not already done by logic implemented by the user interface in step 1106.

In step 1112, data storage application 138 invokes stamping/marking application 166 in SI cloud 150 and provides the settings data to stamping/marking application 166. This may be performed, for example, by data storage application 138 making one or more REST calls to stamping/marking application 166.

In step 1114, stamping/marking application 166 adds a Bates stamp, a time stamp, and a watermark to the data using Bates stamping 176 component, time stamping 178 component, and watermark 180 component, and returns the stamped/marked data back to data storage application 138. As previously described herein, stamping/marking application 166 supports the APIs of Bates stamping 176 component, time stamping 178 component, and watermark 180 component.

After receiving the processed data from the time stamp application, in step 1116, data storage application 138 provides the stamped/marked data to one or more third-party services 190 for processing. For example, data storage application 138 may provide the stamped/marked data to a cloud storage service. This may be useful to fulfill a requirement to maintain the integrity of stored data. This may include data storage application 138 generating and transmitting one or more requests that comply with the APIs of third-party services 190. According to one embodiment, data storage application 138 manages any access and authentication information required by third-party services 190. This may include, for example, providing a valid token to third-party services 190.

D. Integration Type 4: Direct Linking

According to another embodiment, the SI cloud and the ICE cloud are integrated using direct linking, i.e., directly linking an end-user device to the SI cloud 150. According to this approach, an ICE cloud application, such as ICE cloud manager 122 or one of the ICE cloud applications 130, provides a user interface for the end-user device. The user interface includes a user interface object, such as an icon, thumbnail image, symbol, etc., with an embedded link to SI cloud 150. The embedded link may point to, for example, SI cloud manager 152 or one of the SI cloud applications 160. A user of the end-user device selects the user interface object to directly connect the end-user device with SI cloud 150 and more specifically, for example, SI cloud manager 152 or one of the SI cloud applications 160.

Figure 12A:
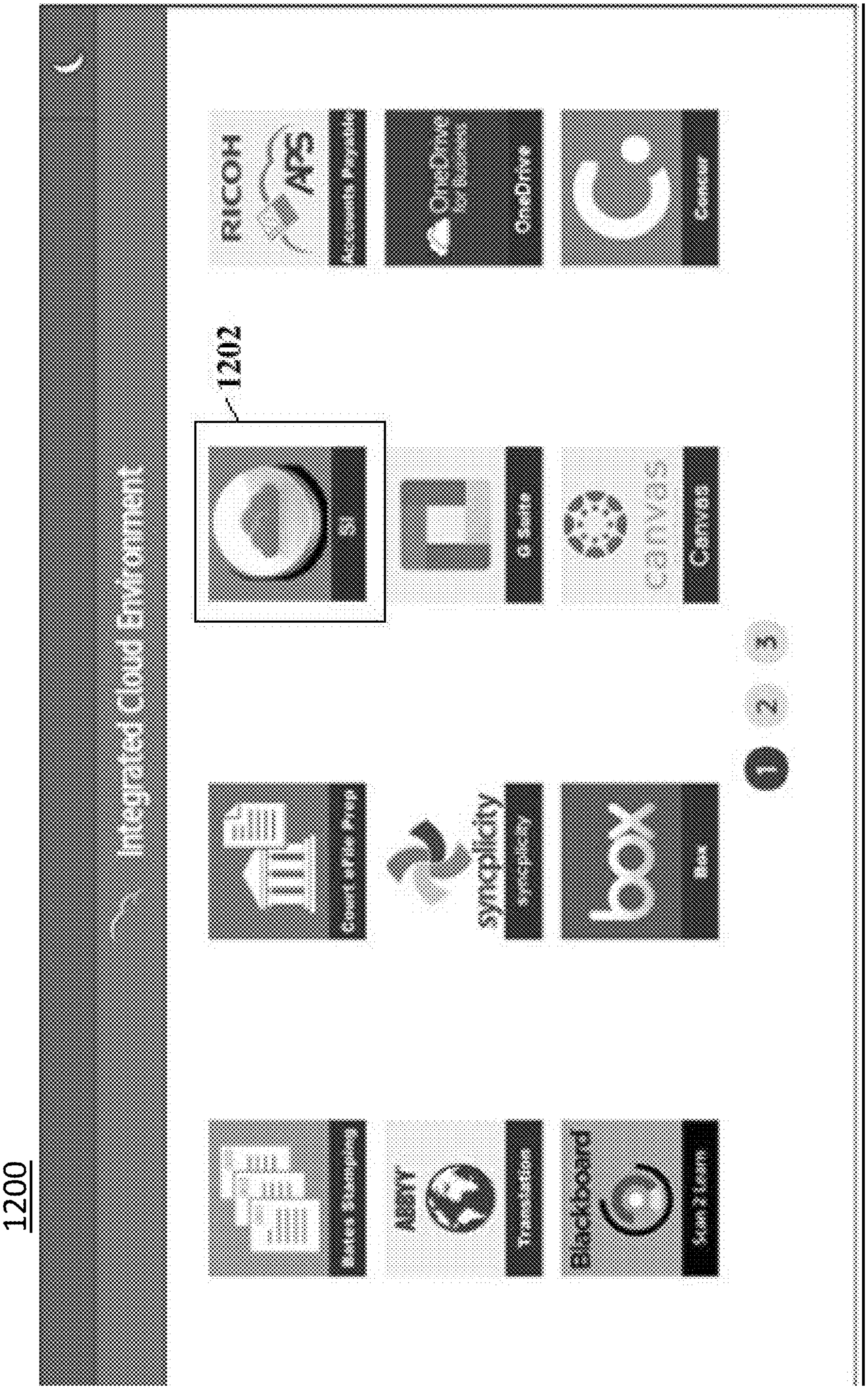
FIG. 12A is an example user interface screen for an end-user device that displays icons for various cloud services and in particular, icons for ICE cloud applications.

The user interface provided by the ICE cloud application to the end-user device may be implemented by, for example, as Web-based user interface. FIG. 12A is an example user interface screen 1200 for an end-user device that displays icons for various cloud services and in particular, icons for ICE cloud applications 130. For example, user interface screen 1200 includes icons that correspond to Bates stamping application 134, court e-filing preparation application 136, data storage application 138, etc. Each of the icons includes a link that points to the corresponding ICE cloud application 130 so that selection of the link invokes the corresponding ICE cloud application 130. Alternatively, the links may point to ICE cloud manager 122 so that selection of the link invokes ICE cloud manager 122 which, in turn, invokes the corresponding ICE cloud application 130 based, for example, upon information included in the request that identifies the corresponding ICE cloud application 130.

User interface screen 1200 provides access to SI cloud 150. According to an embodiment, user interface screen 1200 includes a particular icon 1202 that corresponds to SI cloud manager 152. Particular icon 1202 has an embedded URL that points to SI cloud manager 152. Selecting the embedded link causes a request for a Webpage to be generated and transmitted to SI cloud manager 152. The request includes information that SI cloud manager 152 uses to validate the user of the end-user device. The type of information included in the request may vary depending upon a particular implementation and embodiments are not limited to any particular type of information. Examples of information include, without limitation, a user ID of the user of the end-user device, device identification information that uniquely identifies the end-user device, such as a serial number, MAC address, etc., one or more tokens, or any combination of user ID, device identification data, and tokens. The information may be stored in local storage of the end-user device, such as a local cache. In this example, the one or more tokens are specific to SI cloud manager 152 since they will be used by SI cloud manager 152 to authorize access.

The information may be provided to SI cloud manager 152 via one or more URL parameters, query strings, cookies, etc., using any well-known techniques. SI cloud manager 152 receives and verifies the information to ensure that the user is authorized to access SI cloud manager 152 directly from an end-user device. SI cloud manager 152 may verify the information by comparing the received information to information contained in SI cloud data 184 to ensure that the user, device, and token are currently valid. For example, upon receiving, from end-user device 110, information that includes a user ID, a device ID, and a token, SI cloud manager 152 determines whether user, authorization, and token data 188 in SI cloud data 184 includes an entry that has the same user ID, device ID and token, and if so, whether the token is currently valid.

Figure 12B:
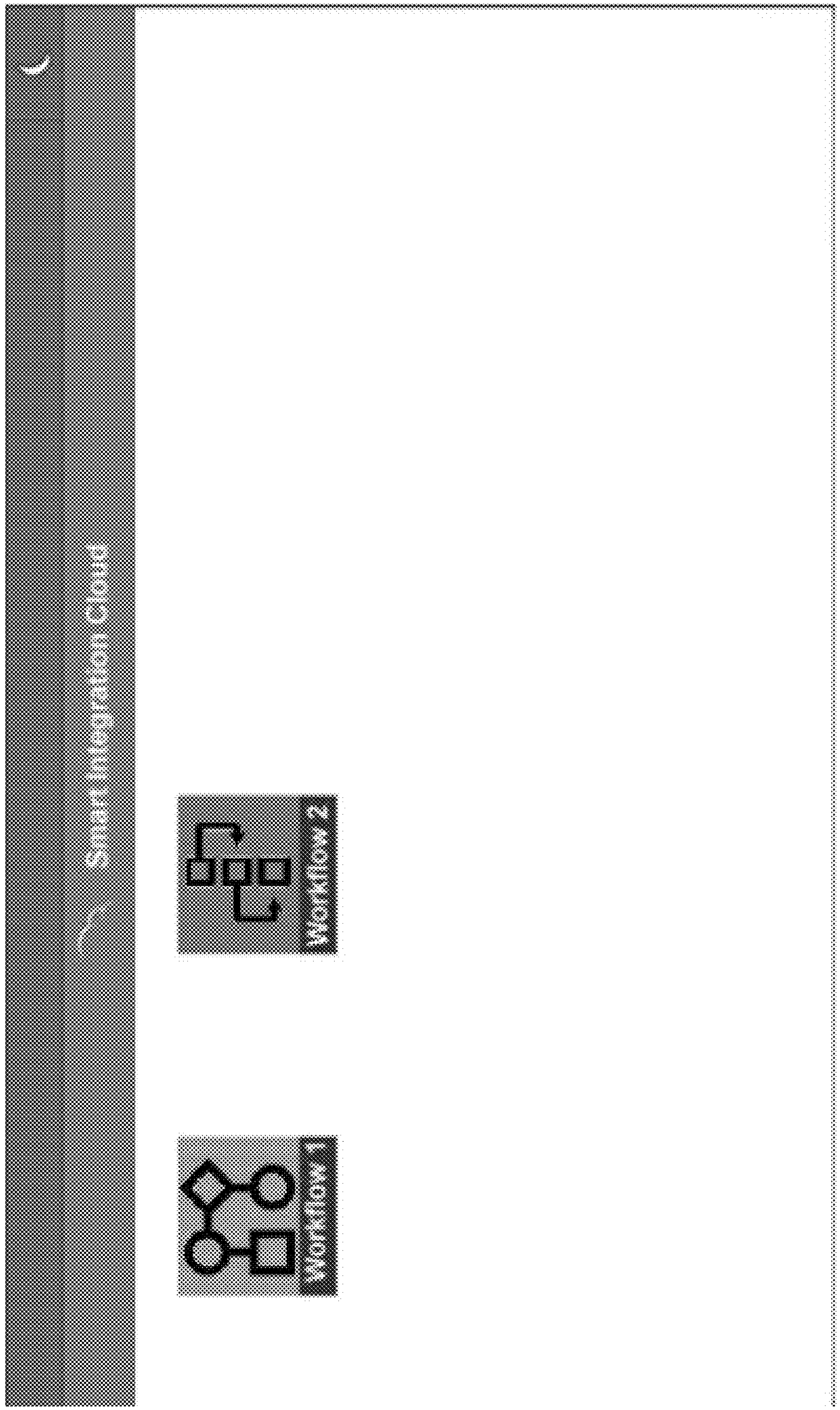
FIG. 12B is a block diagram that depicts an example user interface screen for an end-user device that displays icons for two SI cloud workflows.
Figure 12C:
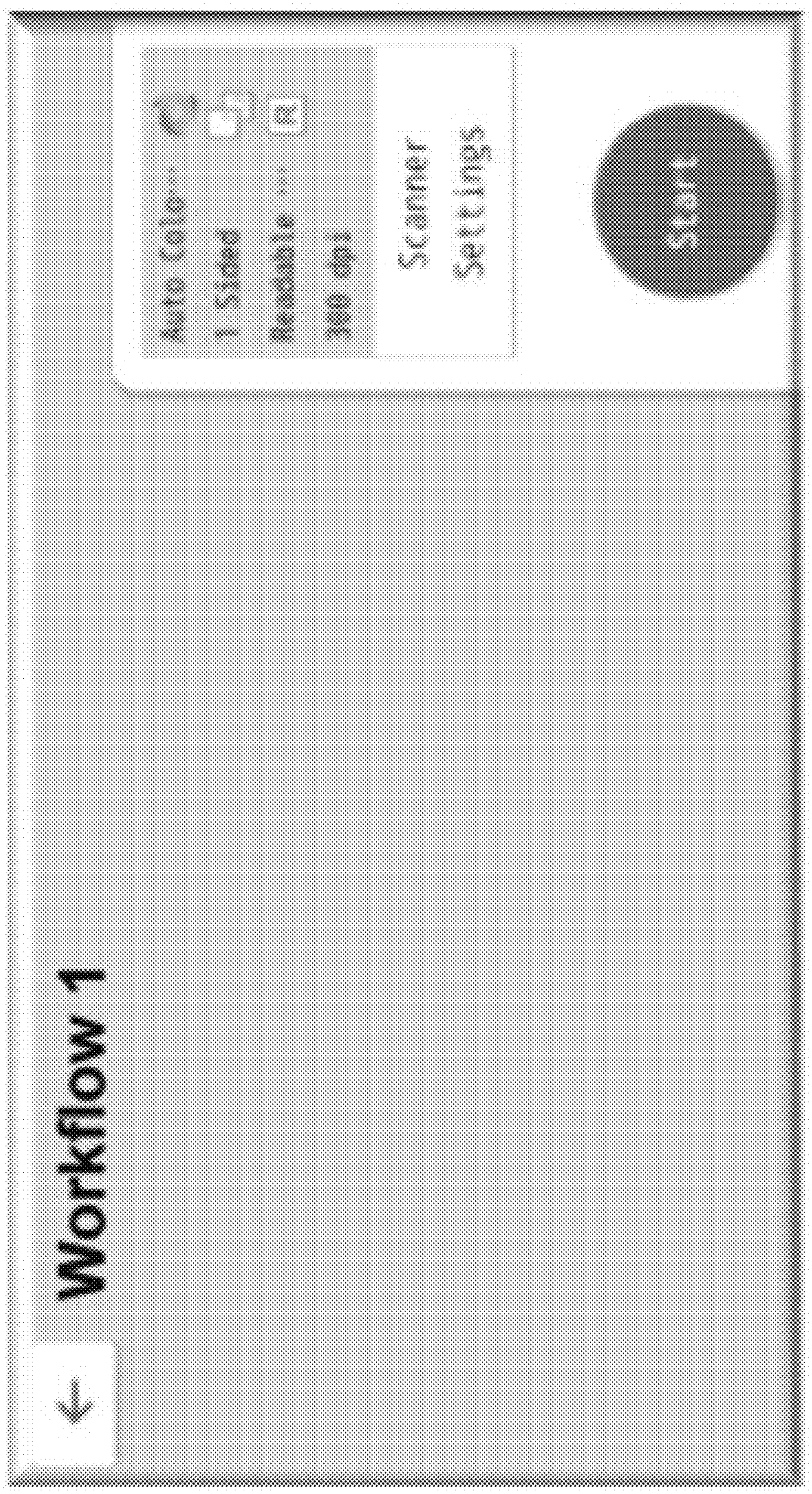
FIG. 12C is a block diagram that depicts an example user interface screen for "Workflow 1" depicted in FIG. 12B.

After the user has been verified, SI cloud manager 152 grants the user access to SI cloud functionality, including access to SI cloud 150 workflows via SI cloud manager 152. FIG. 12B is a block diagram that depicts an example user interface screen 1220 for an end-user device that displays icons for two SI cloud 150 workflows. In this example, the two SI cloud 150 workflows are implemented by SI cloud applications 160. A user may select an icon to view and update settings information for the corresponding workflow. FIG. 12C is a block diagram that depicts an example user interface screen 1240 for "Workflow 1" depicted in FIG. 12B. User interface screen 1240 allows a user to view and update settings for Workflow 1. The updated settings are saved by SI cloud 150 and used as defaults when the user next invokes Workflow 1. This allows a user to easily perform Workflow 1 repeatedly, any number of times, by simply selecting the "Start" icon displayed on end-user device 110.

Although embodiments are described in the context of providing direct access to SI cloud manager 152, embodiments are not limited to this example and the approach may be used to access SI cloud applications 160. For example, user interface screen 1200 (FIG. 12A) may provide icons for one or more SI cloud applications 160, where each icon points to one of the SI cloud applications 160. In this example, selecting a particular icon for a particular SI cloud application sends the corresponding token for that particular SI cloud application stored on the end-user device to that particular cloud application for authentication. Authentication may be performed by the particular SI cloud application that is invoked by selection of the link. Alternatively, icons for SI cloud applications may included an embedded link to SI cloud manager 152, and when the icon is selected, the request sent to SI cloud manager 152 includes data that identifies the SI cloud application that corresponds to the icon selected by the user. SI cloud manager 152 authenticates the information and if successful, either provides a user interface for the selected SI cloud application, or redirects control to the selected SI cloud application.

Figure 13:
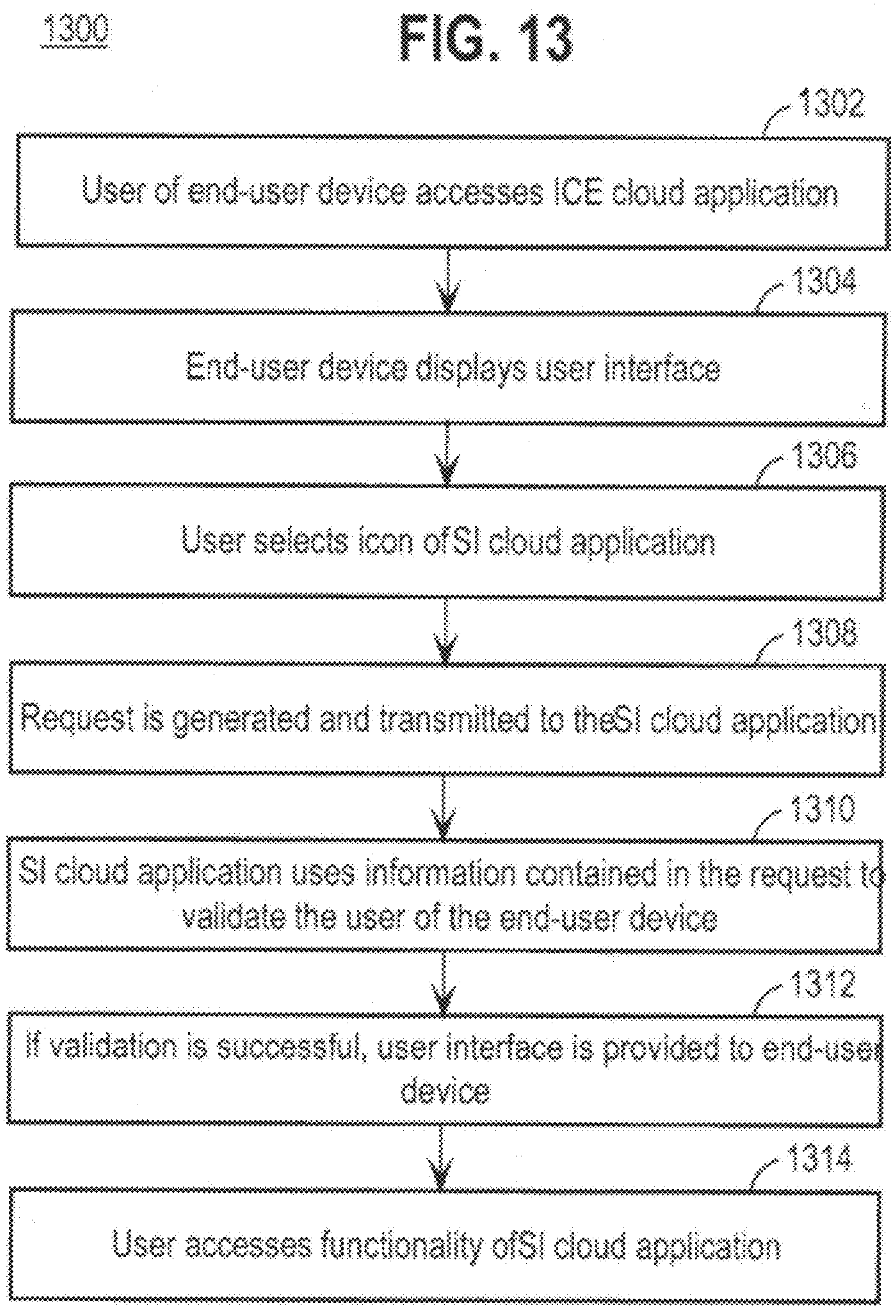
FIG. 13 is a flow diagram that depicts an approach for integrating the SI cloud and the ICE cloud using direct linking.

FIG. 13 is a flow diagram 1300 that depicts an approach for integrating the SI cloud and the ICE cloud using direct linking. In step 1302, a user of end-user device 110 accesses ICE cloud 120 via ICE client application 112 or Web browser 114, as previously described herein. For example, the display of end-user device 110 may automatically display user interface screen 1200 of FIG. 12A, or user interface screen 1200 may be displayed in response to the user selecting a user interface control on the display of end-user device 110. As in prior examples, this may include the user identifying themselves, e.g., by selecting a user from a drop-down menu, completing authentication, for example, by scanning an identification card via a scanner associated with end-user device 110, entering user credentials, such as a user ID and password, etc. Verification of user credentials may be done locally on end-user device 110, or may involve remote services, such as a user verification service, ICE cloud manager 122, an ICE cloud application 130, etc.

In step 1304, the end-user device displays a user interface. For example, end-user device 110 displays user interface screen 1200 of FIG. 12A that includes icons that correspond to ICE cloud applications 130. User interface screen 1200 also includes a particular icon 1202 that corresponds to SI cloud manager 152 and has an embedded URL that points to SI cloud manager 152.

In step 1306, a user selects the icon of the SI cloud application. For example, assuming that end-user device 110 includes a touch screen display, a user may select the particular icon 1202 that corresponds to SI cloud manager 152 using a finger or stylus.

In step 1308, in response to the selection of the particular icon 1202, a request is generated and transmitted to SI cloud manger 152 based upon the embedded link in the particular icon 1202. As previously described herein, the request may include information, such as a user ID, a device ID, and a token.

In step 1310, the SI cloud application uses the information contained in the request to validate the user of the end-user device. For example, SI cloud manager 152 validates the user by determining whether the token included in, or referenced by, the request, is a currently valid token by comparing the user ID, device ID, and token to information contained in user, authorization, and token data 144.

If in step 1310, the user was successfully validated, then in step 1312, a user interface is provided to the end-user device. For example, SI cloud manager 152 may generate and transmit one or more Web pages to end-user device 110 to provide the user interface screens 1220 and 1240 of FIGS. 12B and 12C, respectively. In step 1314, the user of the end-user device accesses the functionality of the SI cloud application via the user interface provided by the SI cloud application. For example, the user of end-user device 110 uses interface screens 1220 and 1240 of FIGS. 12B and 12C, respectively, to access the functionality provided by SI cloud manager 152, namely, access to Workflow 1 and Workflow 2.

The aforementioned approach provides direct user access to functionality in SI cloud 150 via an end-user device that satisfies the security requirements of SI cloud 150 in a user-friendly manner, e.g., without the user having to manually specify security information, which can be cumbersome and error prone. As with the other integration approaches, the approach avoids having to implement particular APIs of SI cloud 150 on end-user devices. In addition, the approach provides access to the functionality of SI cloud applications 160 without having to modify the SI cloud applications 160 to work with particular end-user devices, and without having to implement the functionality in ICE cloud 120, for example, by creating or revising an ICE cloud application 130 to operate with the SI cloud applications 160. This also reduces computational and storage resources by avoiding the execution of one or more ICE cloud applications 130 to access the functionality provided by the SI cloud applications 160.

IV. Provisioning Users and Subscriptions

ICE cloud 120 includes functionality for creating users and subscriptions, and according to one embodiment, automatically handles the creation of corresponding users and subscriptions in both ICE cloud 120 and SI cloud 150. This may also include registering devices in both ICE cloud 120 and SI cloud 150 to satisfy licensing requirements.

FIGS. 14A-14E depict user interface screens, also referred to herein as a "user provisioning user interface," which allow administrative users to provision users and subscriptions. According to one embodiment, the user interface screens are generated by ICE cloud manager 122. The user interface screens may be implemented as a Web-based user interface, i.e., implemented by one or more Web pages that are generated by ICE cloud manager 122 and transmitted to a client device, or end-user device 110. The user interface screens of FIGS. 14A-14E are accessed by a user selection of an add icon 202 in the organization list screen of FIG. 2A. In the examples depicted in FIGS. 14A-14E, each user interface screen is accessed by selecting a tab displayed on the user interface, similar to FIGS. 2A-2L.

Figure 14A:
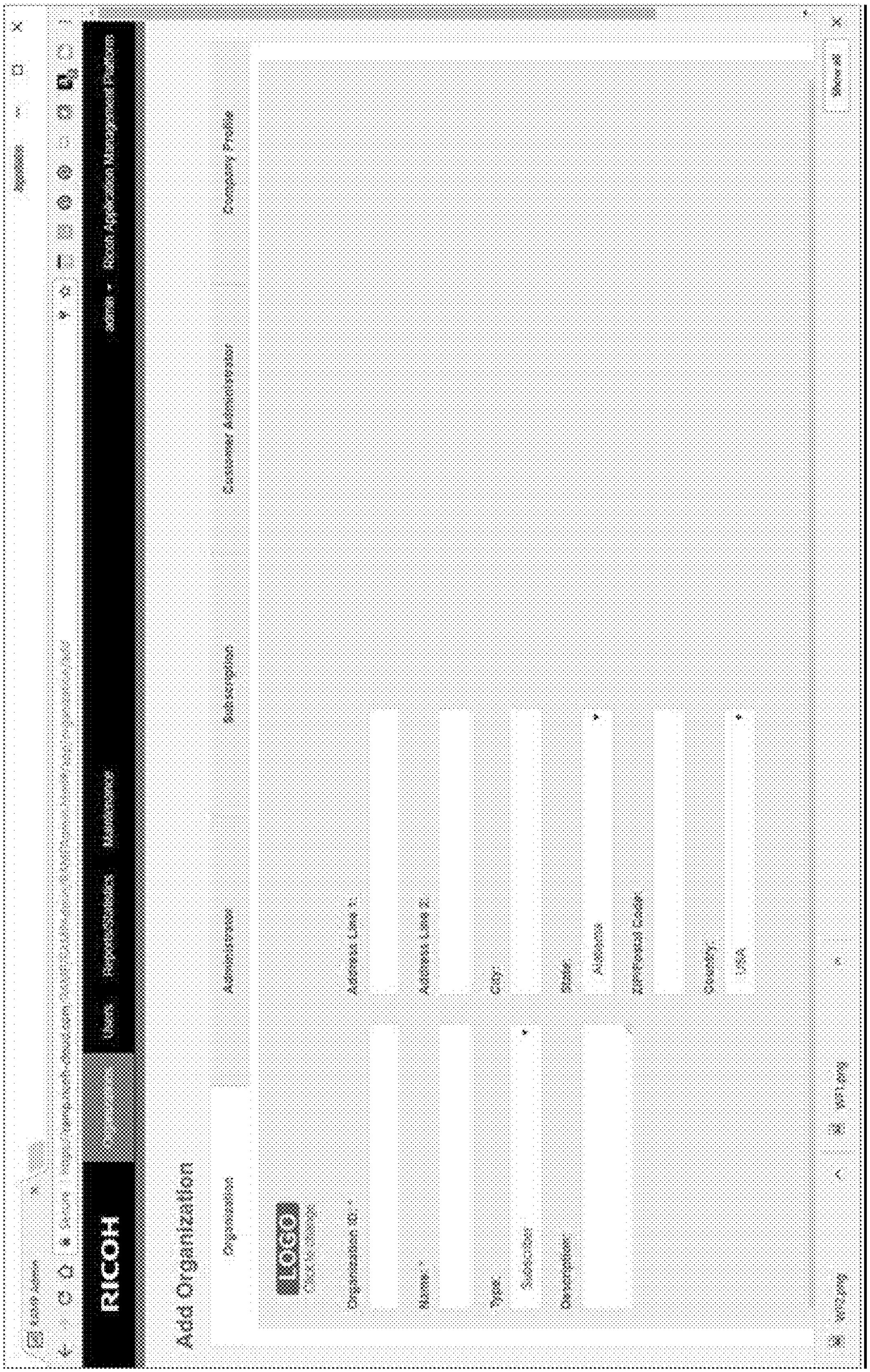
FIG. 14A depicts a user interface screen that allows an administrative user to add, i.e., create, a new user, referred to in FIG. 14A as an "organization."

FIG. 14A depicts a user interface screen 1400 that allows an administrative user to add, i.e., create, a new user, referred to in FIG. 14A as an "organization." Although embodiments are described herein in the context of organizations, embodiments are not limited to organizations and are applicable to any type of user. User interface screen 1400 allows the administrative user to specify various information for the new organization, including an organization ID, a name, a type of customer, e.g., subscriber, a description, and address information.

Figure 14B:
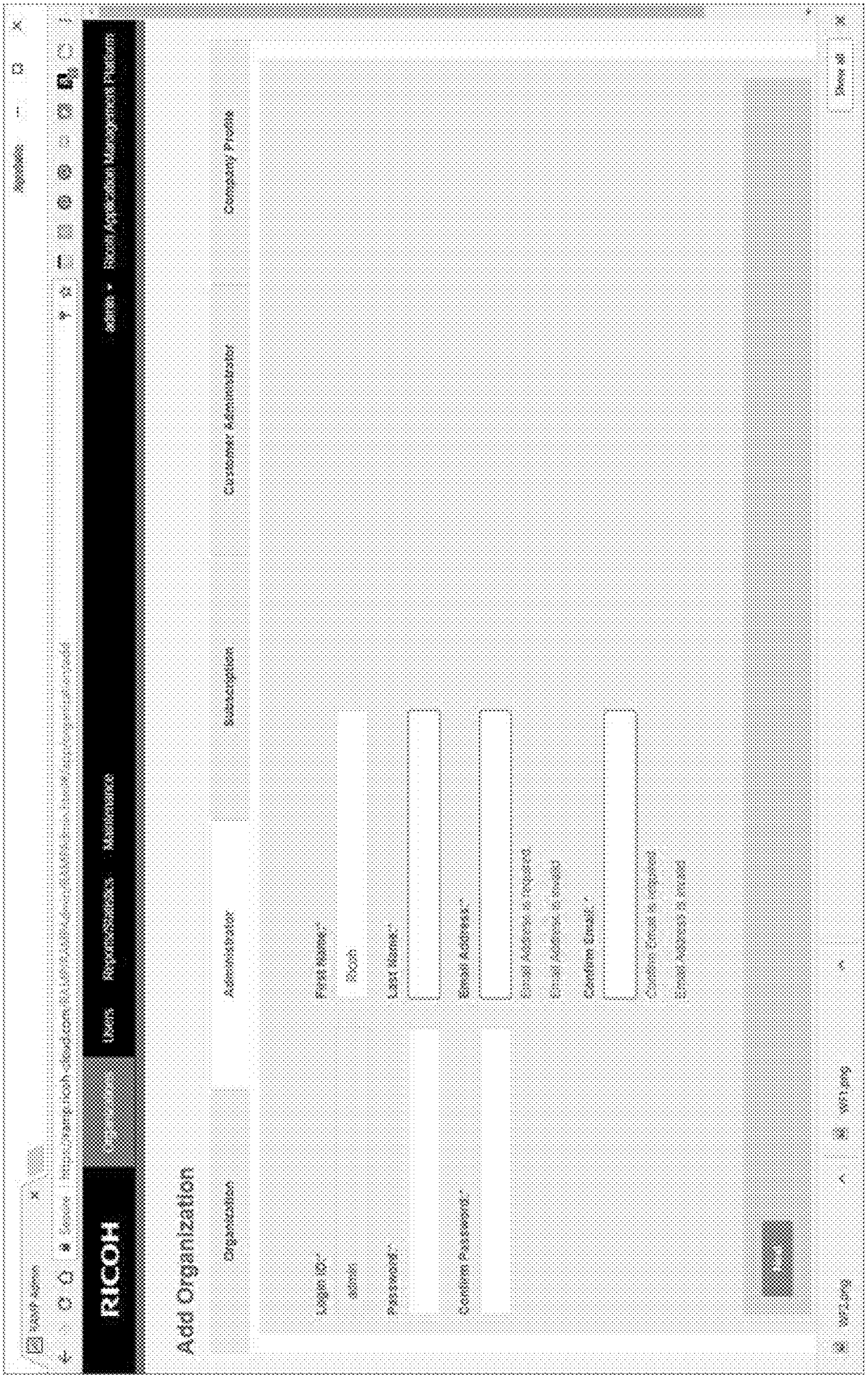
FIG. 14B depicts a user interface screen that allows an administrative user to create an administrative user for the new organization.

FIG. 14B depicts a user interface screen 1420 that allows an administrative user to create an administrative user for the new organization. User interface screen 1420 allows the administrative user to specify various information for the new administrative user, including a login ID, password, name, and email address.

Figure 14C:
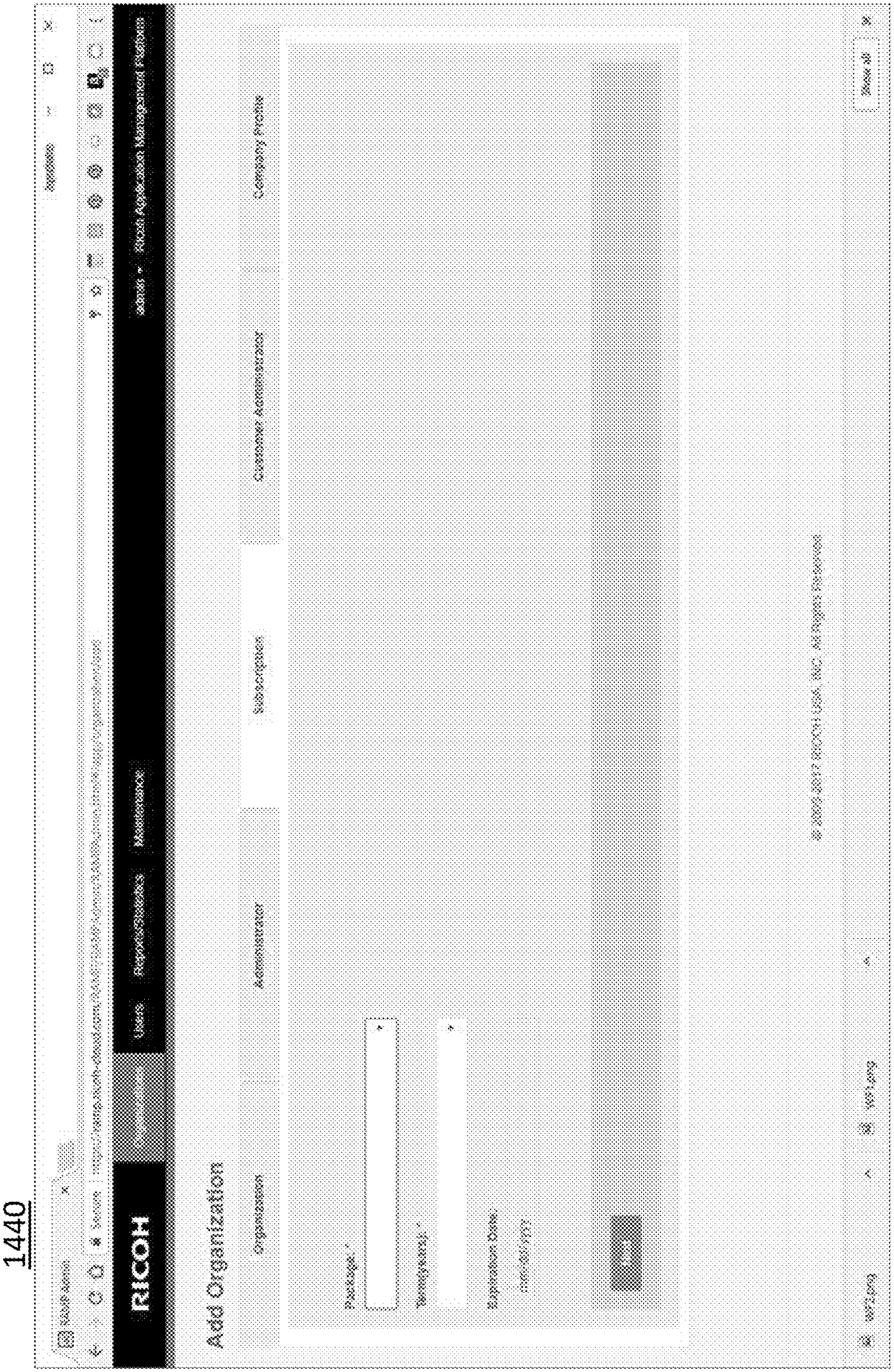
FIG. 14C depicts a user interface screen that allows an administrative user to create a subscription to one or more packages for the new organization.

FIG. 14C depicts a user interface screen 1440 that allows an administrative user to create a subscription to one or more packages for the new organization. As used herein, the term "package" refers to one or more ICE cloud applications 130 and the term "subscription" refers to a right of use. Thus, a subscription to a package is a right to use the ICE cloud applications 130 that belong to the package. User interface screen 1440 allows the administrative user to specify a term and/or expiration date for the package subscription.

Figure 14D:
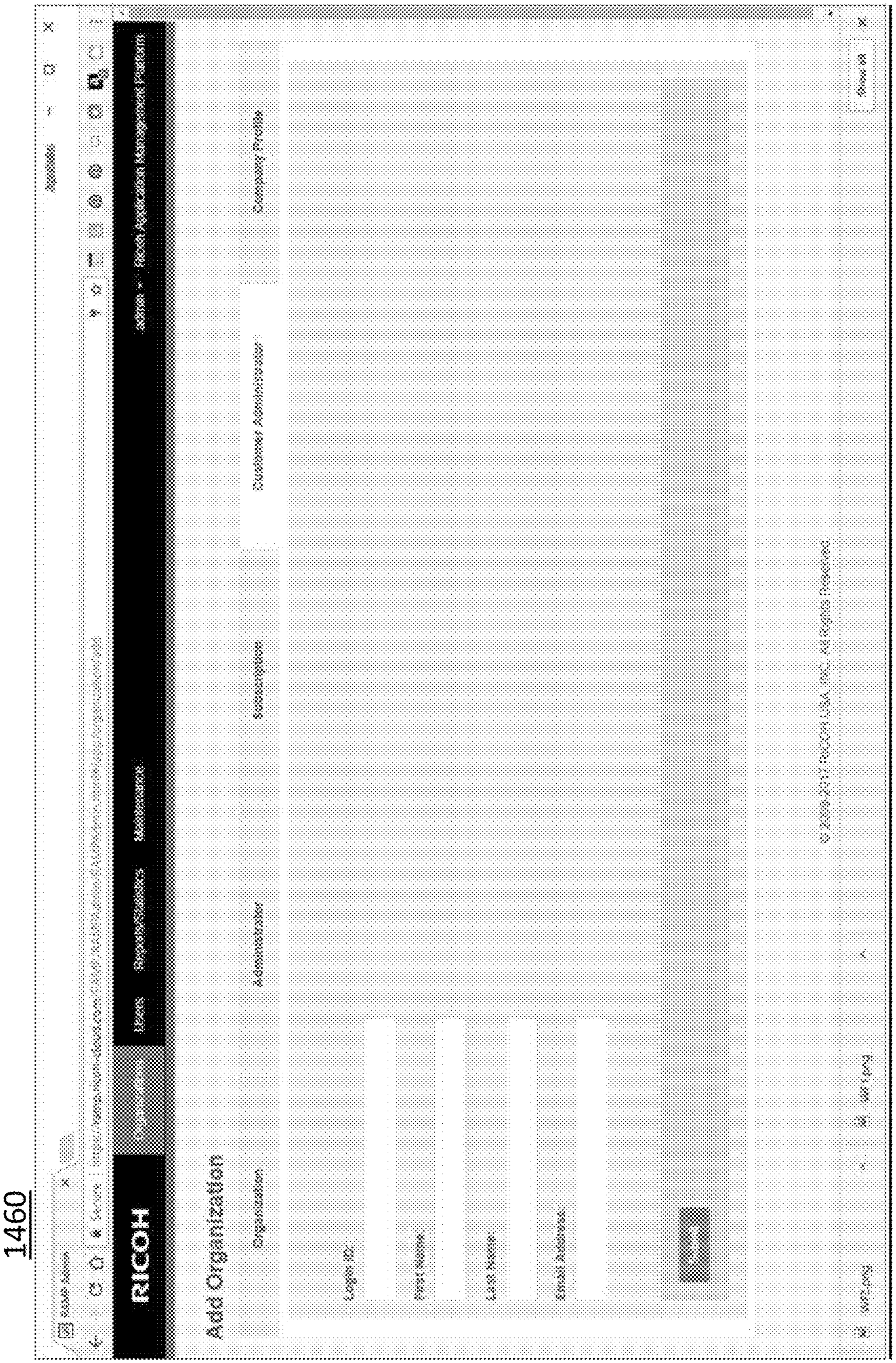
FIG. 14D depicts a user interface screen that allows an administrative user to specify administrator information for the new organization.

FIG. 14D depicts a user interface screen 1460 that allows an administrative user to specify administrator information for the new organization. The customer administrator information includes a login ID, name, and email address.

Figure 14E:
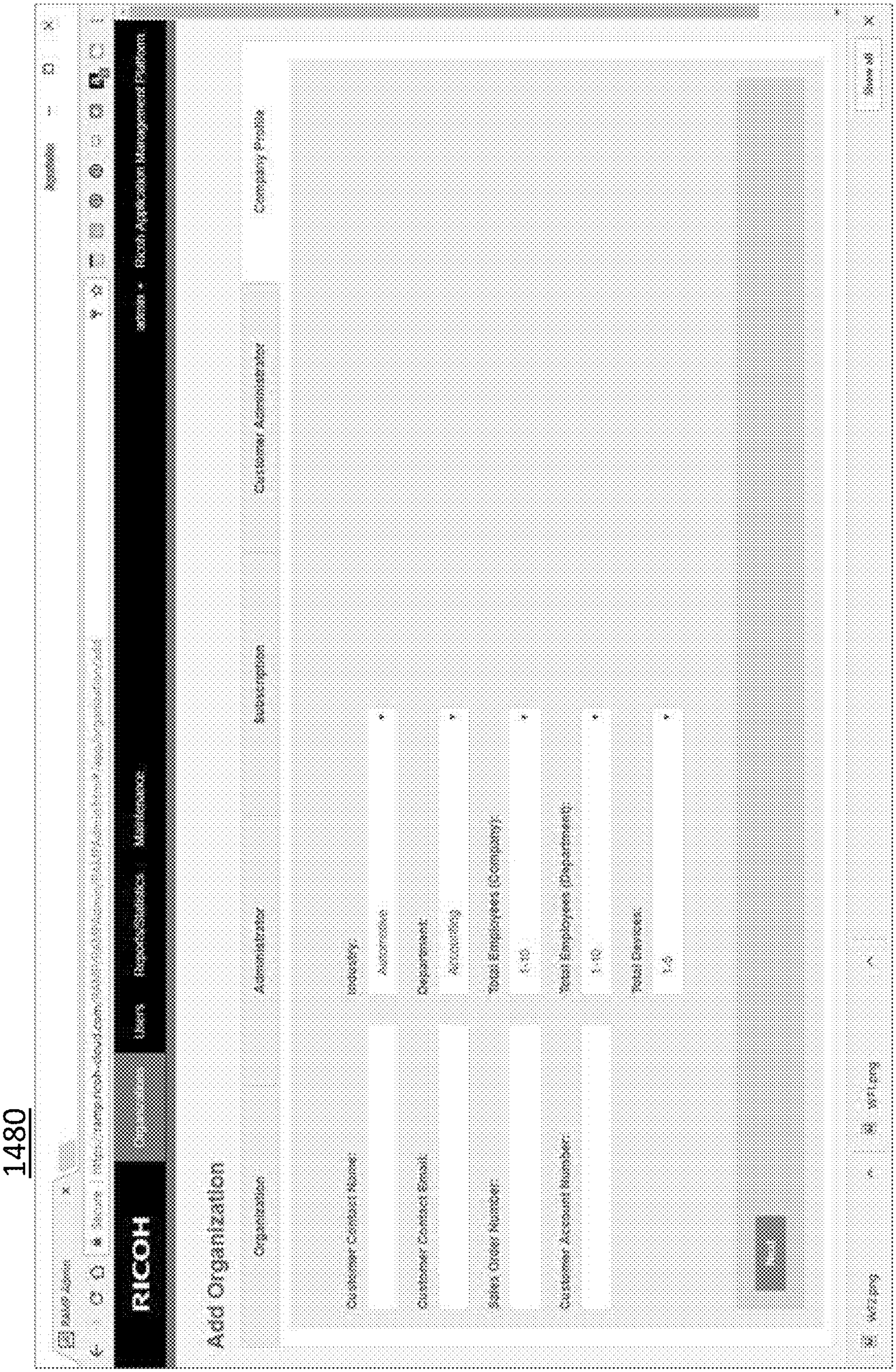
FIG. 14E depicts a user interface screen that allows an administrative user to specify a company profile for the organization.

FIG. 14E depicts a user interface screen 1480 that allows an administrative user to specify a company profile for the organization. User interface screen 1480 allows the administrative user to specify a customer contact name, customer contact email address, sales order number, customer account number, industry, department, number of employees by company/department, and the total number of devices.

Upon completion of the process for adding a new user or a new subscription, as previously described, user, authorization, and token data 144 is updated to specify the new user and/or subscription. For example, ICE cloud manager 122 may add a row in a user data table. According to one embodiment, when a new user and/or subscription is created in ICE cloud 120, a corresponding new user and/or subscription is created in SI cloud 150. This may be accomplished by ICE cloud manager 122 instructing SI cloud manager 152 to create a corresponding user and/or subscription, for example, by making one or more REST calls that comply with the API of SI cloud manager 152. The REST calls may specify one or more commands that instruct SI cloud manager 152 to create a user and/or a new subscription in SI cloud 150. In response to the calls, SI cloud manager 152 updates user, authorization, and token data to include the new user and/or subscription.

According to one embodiment, after a new user is created in both ICE cloud 120 and SI cloud 150, mapping data 192 is updated to specify a correspondence between the users to be used to integrate ICE cloud 120 and SI cloud 150 as previously described herein. For example, after SI cloud manager 152 creates a new user in response to a request from ICE cloud manager 122, SI cloud manager 152 provides the new user information back to ICE cloud manager 122 to allow ICE cloud manager 152 to update mapping data 192. This approach provides the benefit of allowing a user to create a new user and/or subscription using the user interface provided by ICE cloud manager 152, and then automatically creating a new user and/or subscription in SI cloud 150 that corresponds to a new user and/or subscription in ICE cloud 120. This is performed seamlessly and does not require that the user's client device implement the APIs of SI cloud 150 or require that the user learn a user interface of SI cloud 150.

V. Implementation Examples

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 15:
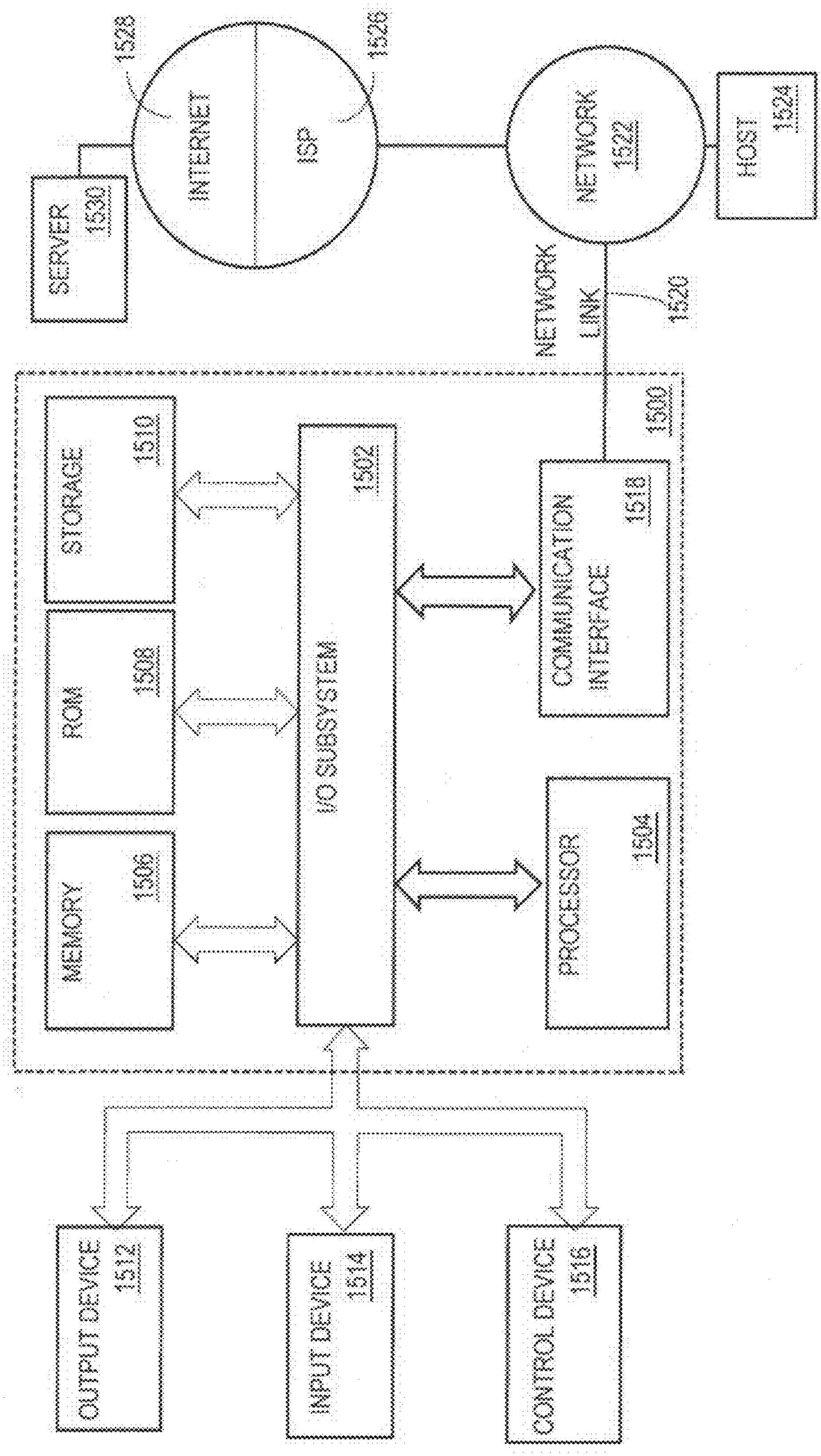
FIG. 15 is a block diagram of a computer system on which embodiments may be implemented.

FIG. 15 is a block diagram that illustrates an example computer system with which an embodiment may be implemented. In the example of FIG. 15, a computer system 1500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 1500 includes an input/output (I/O) subsystem 1502 which may include a bus and/or other communication mechanism(s) for communicating information and/or instructions between the components of the computer system 1500 over electronic signal paths. The I/O subsystem 1502 may include an I/O controller, a memory controller and at least one I/O port. The electronic signal paths are represented schematically in the drawings, for example as lines, unidirectional arrows, or bidirectional arrows.

At least one hardware processor 1504 is coupled to I/O subsystem 1502 for processing information and instructions. Hardware processor 1504 may include, for example, a general-purpose microprocessor or microcontroller and/or a special-purpose microprocessor such as an embedded system or a graphics processing unit (GPU) or a digital signal processor or ARM processor. Processor 1504 may comprise an integrated arithmetic logic unit (ALU) or may be coupled to a separate ALU.

Computer system 1500 includes one or more units of memory 1506, such as a main memory, which is coupled to I/O subsystem 1502 for electronically digitally storing data and instructions to be executed by processor 1504. Memory 1506 may include volatile memory such as various forms of random-access memory (RAM) or other dynamic storage device. Memory 1506 also may be used for storing temporary variables or other intermediate information during execution of instructions to be executed by processor 1504. Such instructions, when stored in non-transitory computer-readable storage media accessible to processor 1504, can render computer system 1500 into a special-purpose machine that is customized to perform the operations specified in the instructions.

Computer system 1500 further includes non-volatile memory such as read only memory (ROM) 1508 or other static storage device coupled to I/O subsystem 1502 for storing information and instructions for processor 1504. The ROM 1508 may include various forms of programmable ROM (PROM) such as erasable PROM (EPROM) or electrically erasable PROM (EEPROM). A unit of persistent storage 1510 may include various forms of non-volatile RAM (NVRAM), such as FLASH memory, or solid-state storage, magnetic disk or optical disk such as CD-ROM or DVD-ROM, and may be coupled to I/O subsystem 1502 for storing information and instructions. Storage 1510 is an example of a non-transitory computer-readable medium that may be used to store instructions and data which when executed by the processor 1504 cause performing computer-implemented methods to execute the techniques herein.

The instructions in memory 1506, ROM 1508 or storage 1510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 1500 may be coupled via I/O subsystem 1502 to at least one output device 1512. In one embodiment, output device 1512 is a digital computer display. Examples of a display that may be used in various embodiments include a touch screen display or a light-emitting diode (LED) display or a liquid crystal display (LCD) or an e-paper display. Computer system 1500 may include other type(s) of output devices 1512, alternatively or in addition to a display device. Examples of other output devices 1512 include printers, ticket printers, plotters, projectors, sound cards or video cards, speakers, buzzers or piezoelectric devices or other audible devices, lamps or LED or LCD indicators, haptic devices, actuators or servos.

At least one input device 1514 is coupled to I/O subsystem 1502 for communicating signals, data, command selections or gestures to processor 1504. Examples of input devices 1514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 1516, which may perform cursor control or other automated control functions such as navigation in a graphical interface on a display screen, alternatively or in addition to input functions. Control device 1516 may be a touchpad, a mouse, a trackball, or cursor direction keys for communicating direction information and command selections to processor 1504 and for controlling cursor movement on display 1512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 1514 may include a combination of multiple different input devices, such as a video camera and a depth sensor.

In another embodiment, computer system 1500 may comprise an internet of things (IoT) device in which one or more of the output device 1512, input device 1514, and control device 1516 are omitted. Or, in such an embodiment, the input device 1514 may comprise one or more cameras, motion detectors, thermometers, microphones, seismic detectors, other sensors or detectors, measurement devices or encoders and the output device 1512 may comprise a special-purpose display such as a single-line LED or LCD display, one or more indicators, a display panel, a meter, a valve, a solenoid, an actuator or a servo.

When computer system 1500 is a mobile computing device, input device 1514 may comprise a global positioning system (GPS) receiver coupled to a GPS module that is capable of triangulating to a plurality of GPS satellites, determining and generating geo-location or position data such as latitude-longitude values for a geophysical location of the computer system 1500. Output device 1512 may include hardware, software, firmware and interfaces for generating position reporting packets, notifications, pulse or heartbeat signals, or other recurring data transmissions that specify a position of the computer system 1500, alone or in combination with other application-specific data, directed toward host 1524 or server 1530.

Computer system 1500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 1500 in response to processor 1504 executing at least one sequence of at least one instruction contained in main memory 1506. Such instructions may be read into main memory 1506 from another storage medium, such as storage 1510. Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 1510. Volatile media includes dynamic memory, such as memory 1506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 1502. Transmission media can also take the form of acoustic or light waves, such as those generated during radio-wave and infra-red data communications.

Various forms of media may be involved in carrying at least one sequence of at least one instruction to processor 1504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 1500 can receive the data on the communication link and convert the data to a format that can be read by computer system 1500. For instance, a receiver such as a radio frequency antenna or an infrared detector can receive the data carried in a wireless or optical signal and appropriate circuitry can provide the data to I/O subsystem 1502 such as place the data on a bus. I/O subsystem 1502 carries the data to memory 1506, from which processor 1504 retrieves and executes the instructions. The instructions received by memory 1506 may optionally be stored on storage 1510 either before or after execution by processor 1504.

Computer system 1500 also includes a communication interface 1518 coupled to bus 1502. Communication interface 1518 provides a two-way data communication coupling to network link(s) 1520 that are directly or indirectly connected to at least one communication networks, such as a network 1522 or a public or private cloud on the Internet. For example, communication interface 1518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 1522 broadly represents a local area network (LAN), wide-area network (WAN), campus network, internetwork or any combination thereof. Communication interface 1518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 1518 sends and receives electrical, electromagnetic or optical signals over signal paths that carry digital data streams representing various types of information.

Network link 1520 typically provides electrical, electromagnetic, or optical data communication directly or through at least one network to other data devices, using, for example, satellite, cellular, Wi-Fi, or BLUETOOTH technology. For example, network link 1520 may provide a connection through a network 1522 to a host computer 1524.

Furthermore, network link 1520 may provide a connection through network 1522 or to other computing devices via internetworking devices and/or computers that are operated by an Internet Service Provider (ISP) 1526. ISP 1526 provides data communication services through a world-wide packet data communication network represented as internet 1528. A server computer 1530 may be coupled to internet 1528. Server 1530 broadly represents any computer, data center, virtual machine or virtual computing instance with or without a hypervisor, or computer executing a containerized program system such as DOCKER or KUBERNETES. Server 1530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 1500 and server 1530 may form elements of a distributed computing system that includes other computers, a processing cluster, server farm or other organization of computers that cooperate to perform tasks or execute applications or services. Server 1530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 1530 may comprise a web application server that hosts a presentation layer, application layer and data storage layer such as a relational database system using structured query language (SQL) or no SQL, an object store, a graph database, a flat file system or other data storage.

Computer system 1500 can send messages and receive data and instructions, including program code, through the network(s), network link 1520 and communication interface 1518. In the Internet example, a server 1530 might transmit a requested code for an application program through Internet 1528, ISP 1526, local network 1522 and communication interface 1518. The received code may be executed by processor 1504 as it is received, and/or stored in storage 1510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 1504. While each processor 1504 or core of the processor executes a single task at a time, computer system 1500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. An apparatus providing an improvement in accessing cloud services over computer networks from end-user devices, the apparatus comprising:

one or more processors, and a Web application executing on the apparatus, the Web application implementing a particular workflow and being configured to perform:

receiving, by the Web application via one or more computer networks from an end-user device, a request to access the Web application, providing, by the Web application to the end-user device, via the one or more computer networks, one or more Web pages which, when processed by the end-user device, provide a user interface that allows a user of the end-user device to specify a plurality of settings for processing data generated by the end-user device, receiving, by the Web application via the one or more computer networks from the end-user device, a request for the data generated by the end-user device to be processed by the Web application according to the particular workflow using the plurality of settings specified by the user of the end-user device, in response to receiving, by the Web application via the one or more computer networks from the end-user device, the request for the data generated by the end-user device to be processed by the Web application according to the particular workflow using the plurality of settings specified by the user of the end-user device:

generating and transmitting, by the Web application via the one or more computer networks, a first processing request to a first cloud application that implements a first portion of the particular workflow, wherein the first processing request specifies both the data generated by the end-user device and the settings specified by the user of the end-user device, and wherein the first processing request conforms to a first application program interface of the first cloud application, receiving, by the Web application from the first cloud application via the one or more computer networks, first processing results data that specifies first processing results from the first cloud application performing the first portion of the particular workflow on the data generated by the end-user device using the settings specified by the user of the end-user device, generating, by the Web application in response to the Web application receiving, from the first cloud application, the first processing results data that specifies the first processing results, a second processing request that includes both the first processing results data that specifies the first processing results and the settings specified by the user of the end-user device, wherein the second processing request conforms to a second application program interface of a second cloud application and is different than the first application program interface, transmitting, by the Web application via the one or more computer networks, to the second cloud application that implements a second portion of the particular workflow, the second processing request that includes both the first processing results data that specifies the first processing results received from the first cloud application and the settings specified by the user of the end-user device, receiving, by the Web application from the second cloud application via the one or more computer networks, second processing results data that specifies second processing results from the second cloud application performing the second portion of the particular workflow on the first processing results data using the settings specified by the user of the end-user device, generating, by the Web application in response to the Web application receiving, from the second cloud application, the second processing results data that specifies the second processing results, a third processing request that specifies the second processing results data received from the second cloud application, transmitting the third processing request to a third-party service that is different than the first cloud application and the second cloud application.

2. The apparatus as recited in claim 1, wherein each cloud application from a plurality of cloud applications implements a workflow.

3. The apparatus as recited in claim 1, wherein the user interface allows the user of the end-user device to create the particular workflow implemented by the Web application and select one or more functions, from a plurality of available functions, to be included in the particular workflow.

4. The apparatus as recited in claim 1, wherein the second cloud application generates results in response to processing the second processing request to process data using the plurality of settings specified by the user and provides the results to the third-party service for processing.

5. The apparatus as recited in claim 1, wherein the third processing request includes a token that is specific to both the user of the end-user device that made the request and the third-party service.

6. The apparatus as recited in claim 1, wherein the Web application is further configured to:

provide a user provisioning user interface that allows a user to create a new user in a first cloud environment that includes the Web application, in response to creation of the new user in the first cloud environment that includes the Web application, generate and transmit to a second cloud environment that includes the first cloud application and the second cloud application, one or more messages that conform to an application program interface of the second cloud environment and request the generation of a new user in the second cloud environment that corresponds to the new user in the first cloud environment.

7. The apparatus as recited in claim 6, wherein the Web application is further configured to:

in response to the creation of the new user in both the first cloud environment and the second cloud environment, generating and storing in mapping data, data that specifies a correspondence between the new user in the first cloud environment and the new user in the second cloud environment.

8. One or more non-transitory computer-readable media providing an improvement in accessing cloud services over computer networks from end-user devices, the one or more non-transitory computer-readable media storing instructions which, when processed by one or more processors, cause:

a Web application executing on an apparatus and implementing a particular workflow to perform:

receiving, by the Web application via one or more computer networks from an end-user device, a request to access the Web application, providing, by the Web application to the end-user device, via the one or more computer networks, one or more Web pages which, when processed by the end-user device, provide a user interface that allows a user of the end-user device to specify a plurality of settings for processing data generated by the end-user device, receiving, by the Web application via the one or more computer networks from the end-user device, a request for the data generated by the end-user device to be processed by the Web application according to the particular workflow using the plurality of settings specified by the user of the end-user device, in response to receiving, by the Web application via the one or more computer networks from the end-user device, the request for the data generated by the end-user device to be processed by the Web application according to the particular workflow using the plurality of settings specified by the user of the end-user device:

generating and transmitting, by the Web application via the one or more computer networks, a first processing request to a first cloud application that implements a first portion of the particular workflow, wherein the first processing request specifies both the data generated by the end-user device and the settings specified by the user of the end-user device, and wherein the first processing request conforms to a first application program interface of the first cloud application, receiving, by the Web application from the first cloud application via the one or more computer networks, first processing results data that specifies first processing results from the first cloud application performing the first portion of the particular workflow on the data generated by the end-user device using the settings specified by the user of the end-user device, generating, by the Web application in response to the Web application receiving, from the first cloud application, the first processing results data that specifies the first processing results, a second processing request that includes both the first processing results data that specifies the first processing results and the settings specified by the user of the end-user device, wherein the second processing request conforms to a second application program interface of a second cloud application and is different than the first application program interface, transmitting, by the Web application via the one or more computer networks, to the second cloud application that implements a second portion of the particular workflow, the second processing request that includes both the first processing results data that specifies the first processing results received from the first cloud application and the settings specified by the user of the end-user device, receiving, by the Web application from the second cloud application via the one or more computer networks, second processing results data that specifies second processing results from the second cloud application performing the second portion of the particular workflow on the first processing results data using the settings specified by the user of the end-user device, generating, by the Web application in response to the Web application receiving, from the second cloud application, the second processing results data that specifies the second processing results, a third processing request that specifies the second processing results data received from the second cloud application, transmitting the third processing request to a third-party service that is different than the first cloud application and the second cloud application.

9. The one or more non-transitory computer-readable media as recited in claim 8, wherein each cloud application from a plurality of cloud applications implements a workflow.

10. The one or more non-transitory computer-readable media as recited in claim 8, wherein the user interface allows the user of the end-user device to create the particular workflow implemented by the Web application and select one or more functions, from a plurality of available functions, to be included in the particular workflow.

11. The one or more non-transitory computer-readable media as recited in claim 8, wherein the second cloud application generates results in response to processing the second processing request to process data using the plurality of settings specified by the user and provides the results to the third-party service for processing.

12. The one or more non-transitory computer-readable media as recited in claim 8, wherein the third processing request includes a token that is specific to both the user of the end-user device that made the request and the third-party service.

13. The one or more non-transitory computer-readable media as recited in claim 8, further storing additional instructions which, when processed by the one or more processors, cause the Web application to perform:

provide a user provisioning user interface that allows a user to create a new user in a first cloud environment that includes the Web application, in response to creation of the new user in the first cloud environment that includes the Web application, generate and transmit to a second cloud environment that includes the first cloud application and the second cloud application, one or more messages that conform to an application program interface of the second cloud environment and request the generation of a new user in the second cloud environment that corresponds to the new user in the first cloud environment.

14. The one or more non-transitory computer-readable media as recited in claim 13, wherein the Web application is further configured to:

in response to the creation of the new user in both the first cloud environment and the second cloud environment, generating and storing in mapping data, data that specifies a correspondence between the new user in the first cloud environment and the new user in the second cloud environment.

15. A computer-implemented method comprising:

a Web application executing on an apparatus and implementing a particular workflow performing:

receiving, by the Web application via one or more computer networks from an end-user device, a request to access the Web application, providing, by the Web application to the end-user device, via the one or more computer networks, one or more Web pages which, when processed by the end-user device, provide a user interface that allows a user of the end-user device to specify a plurality of settings for processing data generated by the end-user device, receiving, by the Web application via the one or more computer networks from the end-user device, a request for the data generated by the end-user device to be processed by the Web application according to the particular workflow using the plurality of settings specified by the user of the end-user device, in response to receiving, by the Web application via the one or more computer networks from the end-user device, the request for the data generated by the end-user device to be processed by the Web application according to the particular workflow using the plurality of settings specified by the user of the end-user device:

generating and transmitting, by the Web application via the one or more computer networks, a first processing request to a first cloud application that implements a first portion of the particular workflow, wherein the first processing request specifies both the data generated by the end-user device and the settings specified by the user of the end-user device, and wherein the first processing request conforms to a first application program interface of the first cloud application, receiving, by the Web application from the first cloud application via the one or more computer networks, first processing results data that specifies first processing results from the first cloud application performing the first portion of the particular workflow on the data generated by the end-user device using the settings specified by the user of the end-user device, generating, by the Web application in response to the Web application receiving, from the first cloud application, the first processing results data that specifies the first processing results, a second processing request that includes both the first processing results data that specifies the first processing results and the settings specified by the user of the end-user device, wherein the second processing request conforms to a second application program interface of a second cloud application and is different than the first application program interface, transmitting, by the Web application via the one or more computer networks, to the second cloud application that implements a second portion of the particular workflow, the second processing request that includes both the first processing results data that specifies the first processing results received from the first cloud application and the settings specified by the user of the end-user device, receiving, by the Web application from the second cloud application via the one or more computer networks, second processing results data that specifies second processing results from the second cloud application performing the second portion of the particular workflow on the first processing results data using the settings specified by the user of the end-user device, generating, by the Web application in response to the Web application receiving, from the second cloud application, the second processing results data that specifies the second processing results, a third processing request that specifies the second processing results data received from the second cloud application, transmitting the third processing request to a third-party service that is different than the first cloud application and the second cloud application.

16. The computer-implemented method as recited in claim 15, wherein each cloud application from a plurality of cloud applications implements a workflow.

17. The computer-implemented method as recited in claim 15, wherein the user interface allows the user of the end-user device to create the particular workflow implemented by the Web application and select one or more functions, from a plurality of available functions, to be included in the particular workflow.

18. The computer-implemented method as recited in claim 15, wherein the second cloud application generates results in response to processing the second processing request to process data using the plurality of settings specified by the user and provides the results to the third-party service for processing.

19. The computer-implemented method as recited in claim 15, wherein the third processing request includes a token that is specific to both the user of the end-user device that made the request and the third-party service.

20. The computer-implemented method as recited in claim 15, further comprising the Web application performing:

provide a user provisioning user interface that allows a user to create a new user in a first cloud environment that includes the Web application, in response to creation of the new user in the first cloud environment that includes the Web application, generate and transmit to a second cloud environment that includes the first cloud application and the second cloud application, one or more messages that conform to an application program interface of the second cloud environment and request the generation of a new user in the second cloud environment that corresponds to the new user in the first cloud environment.

* * * * *